(12) United States Patent
Kobayashi et al.

(10) Patent No.: US 7,805,058 B2
(45) Date of Patent: Sep. 28, 2010

(54) REPRODUCTION DEVICE, REPRODUCTION METHOD, PROGRAM STORAGE MEDIUM, AND PROGRAM

(75) Inventors: Yoshiyuki Kobayashi, Shinagawa-ku (JP); Motoki Kato, Shinagawa-ku (JP)

(73) Assignee: Sony Corporation, Tokyo (JP)

( * ) Notice: Subject to any disclaimer, the term of this patent is extended or adjusted under 35 U.S.C. 154(b) by 968 days.

(21) Appl. No.: 10/589,192

(22) PCT Filed: Feb. 15, 2005

(86) PCT No.: PCT/JP2005/002232

§ 371 (c)(1),
(2), (4) Date: Aug. 11, 2006

(87) PCT Pub. No.: WO2005/079063

PCT Pub. Date: Aug. 25, 2005

(65) Prior Publication Data

US 2007/0172199 A1    Jul. 26, 2007

(30) Foreign Application Priority Data

Feb. 16, 2004    (JP) ............... 2004-038573
Jul. 12, 2004    (JP) ............... 2004-204875

(51) Int. Cl.
H04N 5/91 (2006.01)

(52) U.S. Cl. ............... 386/95; 386/112; 386/125; 386/126

(58) Field of Classification Search ............... 386/46, 386/95, 111, 112, 125, 126
See application file for complete search history.

(56) References Cited

U.S. PATENT DOCUMENTS

| 7,302,158 B1 * | 11/2007 | Asato et al. ............... 386/52 |
| 2004/0081434 A1 * | 4/2004 | Jung et al. ............... 386/95 |
| 2004/0146279 A1 * | 7/2004 | Seo et al. ............... 386/69 |

FOREIGN PATENT DOCUMENTS

| JP | 10 117332 | 5/1998 |
| JP | 2002 236479 | 8/2002 |
| JP | 2002 369154 | 12/2002 |
| JP | 2004 221765 | 8/2004 |
| JP | 2005-217816 | 8/2005 |

OTHER PUBLICATIONS

U.S. Appl. No. 11/629,082, filed Dec. 11, 2006, Uchimura, et al.

* cited by examiner

*Primary Examiner*—Huy T Nguyen
(74) *Attorney, Agent, or Firm*—Oblon, Spivak, McClelland, Maier & Neustadt, L.L.P.

(57) ABSTRACT

The present invention displays subtitles in a language desired by a user in a desired format. A text data decoder 121 decodes text subtitle data, supplies a character object to a character object buffer 122, and supplies attribute data to an attribute data buffer 123. The attribute data stored in the attribute data buffer 123 is changed on the basis of an operation input from the user. A font rasterizer 124 converts the character object into raster data on the basis of attribute specification read from the attribute data buffer 123 and acquired font data, and outputs the raster data. By detecting each character object bearing a bookmark on the basis of the attribute and using a bookmark buffer 125, character objects bearing the same bookmark ID are prevented from being repeatedly rasterized. The present invention is applicable to a playback apparatus.

13 Claims, 70 Drawing Sheets

FIG. 7
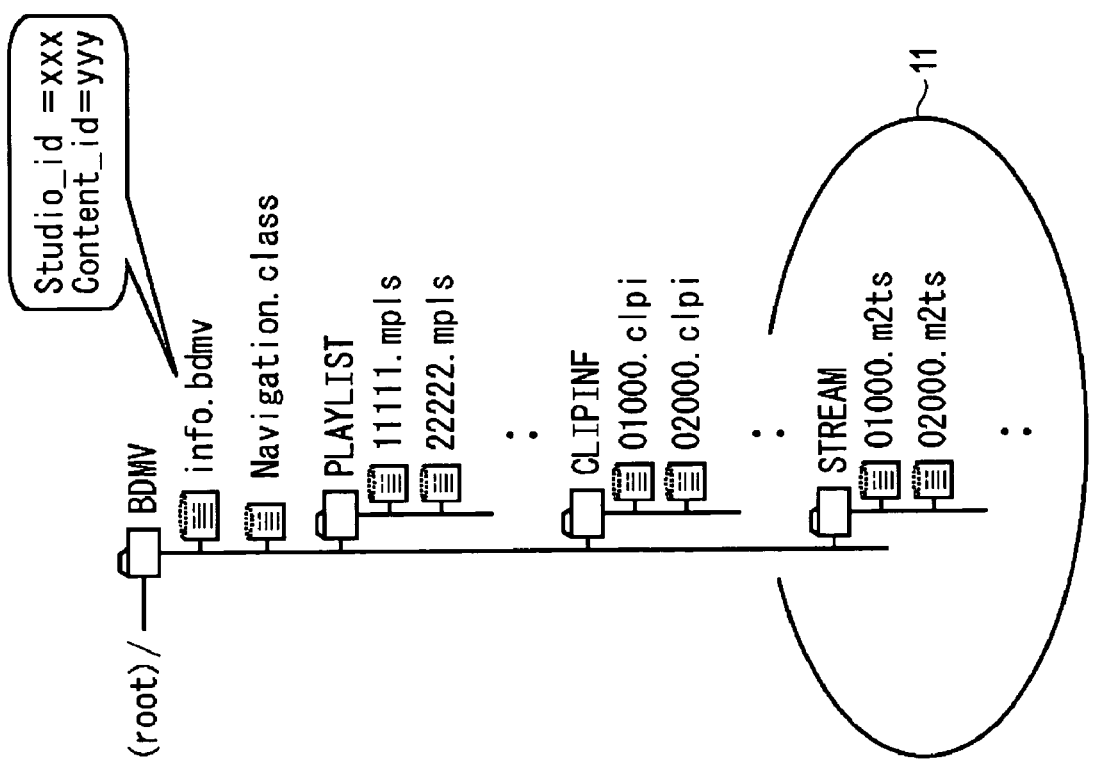
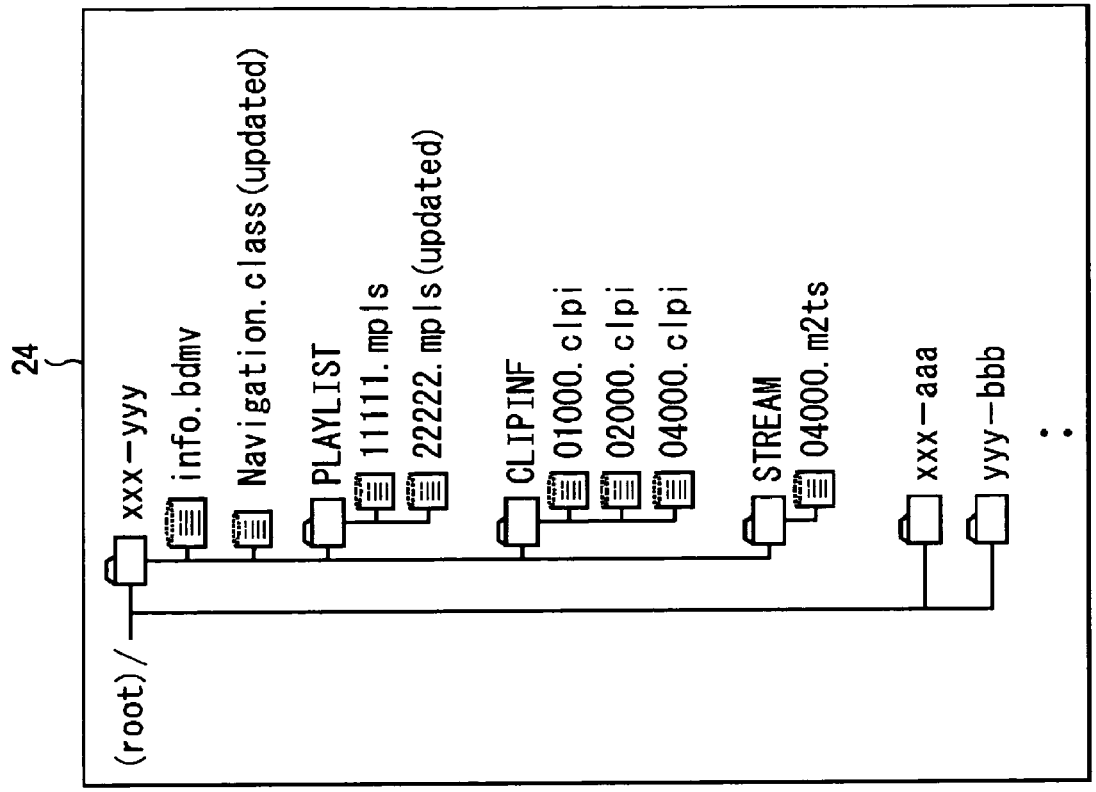

FIG. 10

| DATA STRUCTURE | NUMBER OF BITS | BIT STRING REPRESENTATION |
|---|---|---|
| TextSubtitleArchive () { | | |
| PlayList_file | X | uimsbf |
| number_of_TextSubtitle | 8 | uimsbf |
| for (i=0; i<number_of_TextSubtitle; i++) { | | |
| text_subtitle_file | Y | uimsbf |
| font_file | Z | uimsbf |
| } | | |
| } | | |

FIG. 11

| DATA STRUCTURE | NUMBER OF BITS | BIT STRING REPRESENTATION |
|---|---|---|
| SubPlayItem () { | | |
| Ref_to_STC_id | 8 | uimsbf |
| SubPlayItem_IN_time | 32 | uimsbf |
| SubPlayItem_OUT_time | 32 | uimsbf |
| number_of_ClipTextSubtitle | 8 | uimsbf |
| for (i=0; i<number_of_ClipTextSubtitle; i++) { | | |
| language_id | 8 | uimsbf |
| character_code_id | 8 | uimsbf |
| font_format_id | 8 | uimsbf |
| font_file_path_length | 16 | uimsbf |
| font_file_path | X | uimsbf |
| subtitle_file_path_length | 16 | uimsbf |
| subtitle_file_path | Y | uimsbf |
| comment_length | 16 | uimsbf |
| comment | Z | uimsbf |
| } | | |
| } | | |

FIG. 12

| DATA STRUCTURE | NUMBER OF BITS | BIT STRING REPRESENTATION |
|---|---|---|
| subtitle_file() { | | |
| version | 16 | uimsbf |
| markup_type | 8 | uimsbf |
| subtitle_count | 32 | uimsbf |
| for (i=0; i<subtitle_data_count; i++) { | | |
| start_PTS | 33 | uimsbf |
| end_PTS | 33 | uimsbf |
| subtitle_data_length | 32 | uimsbf |
| subtitle_data | x | |
| } | | |
| } | | |

FIG. 13

| REPRESENTATION | NAME |
|---|---|
| TAB | TAB |

FIG. 14

| REPRESENTATION | NAME |
|---|---|
| CR | Carriage Return |
| LF | Line Feed |
| CR + LF | Carriage Return+Line Feed |
| NEL | New Line |
| VT | Vertical Tabulation |
| FF | Form Feed |
| LS | Line Separator |
| PS | Paragraph Separator |

FIG. 15

| MARKUP FORMAT IDENTIFIER | MEANING |
|---|---|
| 0x00 | TLV ENCODING FORMAT |
| 0x01 | TAGGED LANGUAGE |

FIG. 16

| DATA STRUCTURE | NUMBER OF BITS | BIT STRING REPRESENTATION |
|---|---|---|
| subtitle_data() { | | |
|   for ( ; ; ) { | | |
|     escape_code | 8 | Uimsbf |
|     attribute_type | 8 | Uimsbf |
|     attribute_value_length | 16 | Uimsbf |
|     for (int i=0; i< attribute_data_length; i++) { | | |
|       attribute_value | 8 | uimsbf |
|     } | | |
|     char_data | X | uimsbf |
|   } | | |
| } | | |

FIG. 17

| VALUE | MEANING |
|---|---|
| 0x1B | ESCAPE |

FIG. 18

| attribute_type | MEANING |
|---|---|
| 0x01 | CLUT SETTING |
| 0x02 | SPECIFICATION OF REGION ORIGIN |
| 0x03 | SPECIFICATION OF LINE SPACE |
| 0x04 | SPECIFICATION OF RENDERING DIRECTION |
| 0x05 | SPECIFICATION OF FONT COLOR |
| 0x06 | SPECIFICATION OF BACKGROUND COLOR |
| 0x07 | SPECIFICATION OF FONT STYLE |
| 0x08 | SPECIFICATION OF FONT SIZE |
| 0x09 | SPECIFICATION OF ROTATIONAL ANGLE |
| 0x0A | START POSITION OF BOOKMARK |
| 0x0B | END POSITION OF BOOKMARK |
| 0x0C | SPECIFICATION OF REPETITION OF CHARACTER OBJECT SEQUENCE PROVIDED WITH BOOKMARK |

FIG. 19

| DATA STRUCTURE | NUMBER OF BITS | BIT STRING REPRESENTATION |
|---|---|---|
| CLUT() { | | |
| CLUT_size | 8 | uimsbf |
| for (i = 0; i<CLUT_size; i++) { | | |
| Y | 8 | uimsbf |
| Cb | 8 | uimsbf |
| Cr | 8 | uimsbf |
| T | 8 | uimsbf |
| } | | |
| } | | |

FIG. 20

| DATA STRUCTURE | NUMBER OF BITS | BIT STRING REPRESENTATION |
|---|---|---|
| origin_of_region() { | | |
| x_coordinate | 16 | uimsbf |
| y_coordinate | 16 | uimsbf |
| } | | |

FIG. 21

| VALUE | MEANING |
|---|---|
| 0x00 | LEFT TO RIGHT |
| 0x01 | RIGHT TO LEFT |
| 0x02 | UP TO DOWN |

FIG. 22

| VALUE | MEANING |
|---|---|
| 0x00 | STANDARD |
| 0x01 | BOLD |
| 0x02 | ITALIC |

FIG. 23

| DATA STRUCTURE | NUMBER OF BITS | BIT STRING REPRESENTATION |
|---|---|---|
| start_of_bookmark() { | | |
| bookmark_id | 8 | uimsbf |
| start_of_bookmark_indicator | 8 | uimsbf |
| } | | |

FIG. 24

| DATA STRUCTURE | NUMBER OF BITS | BIT STRING REPRESENTATION |
|---|---|---|
| end_of_bookmark() { | | |
| bookmark_id | 8 | uimsbf |
| end_of_bookmark_indicator | 8 | uimsbf |
| } | | |

FIG. 25

| DATA STRUCTURE | NUMBER OF BITS | BIT STRING REPRESENTATION |
|---|---|---|
| repeat_of_bookmark() { | | |
| bookmark_id | 8 | uimsbf |
| count | 8 | uimsbf |
| } | | |

FIG. 26

| DATA STRUCTURE | NUMBER OF BITS | BIT STRING REPRESENTATION |
|---|---|---|
| subtitle_data() { | | |
| for ( ; ; ) { | | |
| TaggedAttr | X | uimsbf |
| char_data | Y | uimsbf |
| } | | |

FIG. 27

```
TaggedAttr ::= '<' Name (S Attribute)* S? '>'
Name ::= (Letter | '_' | ':') (NameChar)*
NameChar ::= Letter | Digit | '.' | '-' | '_' | ':'
S ::= (#x20 | #x9 | #xD | #xA)+   ; space
Letter ::= #x41-5A / #x61-7A      ; A-Z / a-z
Digit ::= #x30-39                 ; 0-9
```

FIG. 28

```
<CLUT size= y= cb= cr= t= >
<region x= y=>
<linespace d=>
<textflow d=>
<fontcolor c=>
<backgroundcolor c=>
<fontstyle s=>
<fontsize s=>
<fontrotate a=>
<mark id=>
<repeat id= c=>
```

FIG. 43

| FILE TYPE | |
|---|---|
| PlayList FILE | ESSENTIAL |
| ClipInformation FILE | ESSENTIAL |
| TEXT SUBTITLE STREAM FILE | ESSENTIAL |
| FONT FILE | ESSENTIAL |

FIG. 44

| DATA STRUCTURE | NUMBER OF BITS | BIT STRING REPRESENTATION |
|---|---|---|
| TextSubtitleArchive() { | | |
|   compression_type | 8 | uimsbf |
|   for_type | 8 | uimsbf |
|   encription() { | | |
|     PlayList_file_name | 8*5 | bslbf |
|     PlayList_file_size | 32 | uimsbf |
|     for(j=0; j<PlayList_file_size; j++) { | | |
|       PlayList_file | 8 | bslbf |
|     } | | |
|   number_of_Files | 16 | uimsbf |
|   for(i=0; i<number_of_Files; i++) { | | |
|     TextSubtitle_MetaData() { | | |
|       author_id | 8 | uimsbf |
|       title_id | 8 | uimsbf |
|       disc_id | 8 | uimsbf |
|       version | 8 | uimsbf |
|       operation_type | 8 | uimsbf |
|       display_name | 8*128 | bslbf |
|       permission | 8 | uimsbf |
|     } | | |
|     clip_information_file_name | 8*5 | bslbf |
|     clip_information_file_size | 32 | uimsbf |
|     for(j=0; j<PlayList_file_size; j++) { | | |
|       clip_information_file | 8 | bslbf |
|     } | | |
|     text_subtitle_file_name | 8*5 | bslbf |
|     text_subtitle_file_size | 32 | uimsbf |
|     for(j=0; j<PlayList_file_size; j++) { | | |
|       text_subtitle_file | 8 | bslbf |
|     } | | |
|     font_file_name | 8*5 | bslbf |
|     font_file_size | 32 | uimsbf |
|     for(j=0; j<font_file_size; j++) { | | |
|       font_file | 8 | Bslbf |
|     } | | |
|   } | | |
|   } | | |
| } | | |

FIG. 46

| VALUE | MEANING |
|---|---|
| 0x01 | REPLACE PlayList FILE |
| 0x02 | EXTRACT AND ADD SubPath ELEMENT |
| 0x03 | EXTRACT AND ADD SubPlayItem ELEMENT |
| 0x04 | EXTRACT AND ADD Subclip_entry ELEMENT |

FIG. 53

| VALUE | MEANING |
|---|---|
| 0x00 | INVISIBLE ATTRIBUTE (FOR USER) |
| 0x01 | VISIBLE ATTRIBUTE (FOR USER) |
| 0x02 | OVERWRITING INHIBITION ATTRIBUTE |

FIG. 54

| DATA STRUCTURE | NUMBER OF BITS | BIT STRING REPRESENTATION |
|---|---|---|
| subtitle_file() { | | |
| markup_type | 8 | uimsbf |
| subtitle_count | 32 | uimsbf |
| for (i=0; i<subtitle_data_count; i++) { | | |
| reserved | 7 | bslbf |
| start_PTS | 33 | uimsbf |
| reserved | 7 | bslbf |
| end_PTS | 33 | uimsbf |
| subtitle_data_length | 32 | uimsbf |
| subtitle_data | 8 | bslbf |
| for (j=0; j<subtitle_data_length; j++) { | | |
| } | | |
| } | | |
| } | | |

FIG. 55

| DATA STRUCTURE | NUMBER OF BITS | BIT STRING REPRESENTATION |
|---|---|---|
| subtitle_data() { | | |
|   while(processing_bytes<subtitle_data_length) { | | |
|     escape_code | 8 | uimsbf |
|     data_type | 8 | uimsbf |
|     data_value_length | 16 | uimsbf |
|     for(i=0; i<attribute_data_length; i++) { | | |
|       data_value | 8 | bslbf |
|     } | | |
|   } | | |
| } | | |

FIG. 56

| data_type | MEANING |
|---|---|
| 0x01 | SUBTITLE CHARACTER STRING |
| 0x02 | CLUT SETTING |
| 0x03 | SPECIFICATION OF REGION ORIGIN |
| 0x04 | SPECIFICATION OF LINE SPACE |
| 0x05 | SPECIFICATION OF RENDERING DIRECTION |
| 0x06 | SPECIFICATION OF FONT COLOR |
| 0x07 | SPECIFICATION OF BACKGROUND COLOR |
| 0x08 | SPECIFICATION OF FONT STYLE |
| 0x09 | SPECIFICATION OF FONT SIZE |
| 0x0A | SPECIFICATION OF ROTATIONAL ANGLE |
| 0x0B | START POSITION OF BOOKMARK |
| 0x0C | END POSITION OF BOOKMARK |
| 0x0D | SPECIFICATION OF REPETITION OF CHARACTER OBJECT SEQUENCE PROVIDED WITH BOOKMARK |

FIG. 57

```
<CLUT size= y= cb= cr= t= >
<region x= y=>
<linespace d=>
<textflow d=>
<fontcolor c=>
</fontcolor>
<backgroundcolor c=>
<fontstyle s=>
</fontstyle>
<fontsize s=>
</fontsize>
<fontrotate a=>
</fontrotate>
<mark id=>
</mark>
<repeat id= c=>
```

FIG. 58

| DATA STRUCTURE | NUMBER OF BITS | BIT STRING REPRESENTATION |
|---|---|---|
| PES_PrivateStream2_packet() { | | |
| packet_start_code_prefix | 24 | bslbf |
| stream_id | 8 | uimsbf |
| PES_packet_length | 16 | uimsbf |
| for (i = 0; i<PES_packet_length; i++) { | | |
| PES_packet_data_byte | 8 | bslbf |
| } | | |
| } | | |

REPRODUCTION DEVICE, REPRODUCTION METHOD, PROGRAM STORAGE MEDIUM, AND PROGRAM

TECHNICAL FIELD

The present invention relates to playback apparatuses, playback methods, program storage media, and programs, and, in particular, to a playback apparatus, a playback method, a program storage medium, and a program that enable downloading of an update file for content recorded in a recording medium.

BACKGROUND ART

One of the DVD (Digital Versatile Disc) playback-only standards is the DVD video format. In this DVD format, content data, such as video and audio, is multiplexed with data of various subpictures such as subtitles, and is recorded as a program stream on a disc. Also navigation data for interactive playback of the stream is recorded on the disc.

Here, the interactive playback represents playback performed such that a user uses various DVD functions such as, in addition to playback from a preference position and playback in order of preference, a multi-angle function capable of playing back video captured at various angles, a multi-language function capable of playback in a language of preference among a plurality of languages, and a parental control function that prevents playback of a certain scene such as a violent scene.

In a program stream, a plurality of audio streams and a plurality of subtitle streams can also be multiplexed. This makes it possible to record subtitle data of a plurality of different languages on a single disc for, for example, a single piece of video content such as a movie, whereby the user can select audio and subtitles in a language of preference when playback of video is initiated and while video is being played back.

A system in which a user can easily download content such as effect sound, moving pictures and still images, which are used as materials of a video product, is disclosed in Patent Document 1. In addition, a technology that can replace data of a part of the entirety of music data by other data is disclosed in Patent Document 2.

[Patent Document 1] Japanese Unexamined Patent Application Publication No. 2003-140662

[Patent Document 2] Japanese Unexamined Patent Application Publication No. 2002-311967

DISCLOSURE OF INVENTION

Problems to be Solved by the Invention

However, there is a problem in that, obviously, the user can only play back content recorded on the disc when it is loaded into a player.

Accordingly, for example, when the user purchases a disc having movie content recorded thereon which is provided with only English subtitles, the user can display subtitles in English which is a language recorded on the disc beforehand. However, in order to view identical movie content in which subtitles in a desired language different from the language recorded beforehand can be displayed, the user must purchase a different disc on which subtitle information in the desired language is recorded beforehand.

In addition, for a disc seller, when the seller sells discs having movie content recorded thereon in a plurality of countries having different languages, the seller needs to prepare discs on which subtitle information in the languages is recorded or to prepare plural types of discs such as English-version discs and Japanese-version discs. Accordingly, it takes a lot of time to prepare such disks, so that a significant business opportunity may be lost depending on circumstances.

In addition, representations of subtitles of movie content or the like in a case of the related art are recorded image information such as a bit map. Thus, for example, after processing for translation into a predetermined language finishes, it is cumbersome to generate character image information in which, for example, color, size, character style, etc., are specified for each language, thus causing a problem in that release of content requires a time and costs.

Furthermore, the representations of the subtitles or the like in the case of the related art are recorded as image information such as a bit map. Thus, when video of movie content is displayed on a large screen, characters displayed as subtitles are also enlarged more than necessary, so that there is a possibility that display quality of the subtitles may remarkably deteriorate, such as deformation of outlines. In addition, the display size, color, font type, or the like, of the subtitles recorded as the image information such as a bit map cannot be changed on the basis of a user's operation input, and the user can only select between displaying the subtitles and hiding the subtitles.

The present invention has been made in view of the above circumstances and is intended to enable displaying subtitles in a form desired by a user for content recorded on a disc by enabling downloading of an update file for the content recorded on the disc.

Means for Solving the Problems

A playback apparatus of the present invention comprises reading control means for controlling reading of first information including a character object and attribute data for displaying subtitles from a recording medium or a storage unit within the playback apparatus, character object storing means for storing the character object included in the first information whose reading is controlled by the reading control means, attribute data storing means for storing the attribute data included in the first information whose reading is controlled by the reading control means, and conversion means for acquiring font data and converting the character object stored in the character object storing means into the subtitle data by using the attribute data stored in the attribute data storing means and font data.

The playback apparatus may further comprise operation input acquiring means for acquiring a user's operation input. On the basis of the user's operation input acquired by the operation input acquiring means, the reading control means may control the reading of the first information stored in the recording medium or the storage unit within the playback apparatus.

The playback apparatus may further comprise operation input acquiring means for acquiring a user's operation input and attribute-data-change control means for controlling change of the attribute data stored in the attribute data storing means on the basis of the user's operation input acquired by the operation input acquiring means. The conversion means may convert the character object into the subtitle data on the basis of the attribute data whose change is controlled by the attribute-data-change control means.

The playback apparatus may further comprise operation input acquiring means for acquiring a user's operation input.

The conversion means may change the acquired font data on the basis of the user's operation input acquired by the operation input acquiring means.

The playback apparatus may further comprise operation input acquiring means for acquiring a user's operation input. The reading control means may performs further controlling reading of second information which is stored in the storage unit and which is information for controlling the reading of the AV stream and the first information, and the AV stream recorded in the recording medium, controlling reading of the second information on the basis of the user's operation input acquired by the operation input acquiring means, and controlling reading of the AV stream and the first information on the basis of the read second information.

The playback apparatus may further comprise first decoding means for decoding the AV stream whose reading is controlled by the reading control means.

The playback apparatus may further comprise output means for combining the subtitle data generated by conversion by the conversion means and video data included in the AV stream decoded by the first decoding means, and outputting the combined data.

The playback apparatus may further comprise second decoding means for decoding the first information whose reading is controlled by the reading control means, counting means for obtaining a count value serving as a reference for processing timing for decoding of the AV stream by the first decoding means, and calculation means for calculating a reference for processing timing for decoding of the first information by the second decoding means on the basis of the count value obtained by the counting means.

The playback apparatus may further comprise decoding means for decoding the first information whose reading is controlled by the reading control means. The character object storing means may store the character object included in the first information decoded by the decoding means, and the attribute data storing means may store the attribute data included in the first information decoded by the decoding means.

The playback apparatus may further comprise communication means for exchanging information with a predetermined information processing apparatus via a network. The first information, which is received by the communication means, may be stored in the storage unit within the playback apparatus.

The playback apparatus may further comprise virtual-file-system generating means which, on the basis of a file system of a first group of data stored in the recording medium and a file system of a second group of data stored in the storage unit within the playback apparatus, generates a virtual file system including at least part of each of the first group of data and the second group of data.

The first information stored in the storage unit within the playback apparatus may include second information concerning the generation of the virtual file system. The reading control means may further control reading of the second information stored in the storage unit within the playback apparatus. The virtual-file-system generating means may generate the virtual file system on the basis of the second information whose reading is controlled by the reading control means.

The playback apparatus may further comprise storage means for storing the first information whose reading is controlled by the reading control means. The storage means may store the first information, in which reading of the entirety of the first information is collectively controlled by the reading control means.

The playback apparatus may further comprise table information generating means for generating table information representing relationships between information of decoding start points of the first information whose reading is controlled by the reading control means and time stamps at the decoding start points. The reading control means may control the reading of the first information by referring to the table information generated by the table information generating means.

A playback method of the present invention includes a reading control step of controlling reading of first information including a character object for displaying subtitles and attribute data from a recording medium or a storage unit within the playback apparatus, a character object storing step of storing the character object included in the first information whose reading is controlled in the reading control step, an attribute data storing step of storing the attribute data included in the first information whose reading is controlled in the reading control step, and a conversion step of acquiring font data and using the attribute data stored in the attribute data storing step and the font data to convert the character object stored in the character object storing step into subtitle data.

A program stored in a program storage medium of the present invention allows a computer to execute a process including a reading control step of controlling reading of first information including a character object for displaying subtitles and attribute data from a recording medium or a storage unit within the playback apparatus, a character object storing step of storing the character object included in the first information whose reading is controlled in the reading control step, an attribute data storing step of storing the attribute data included in the first information whose reading is controlled in the reading control step, and a conversion step of acquiring font data and using the attribute data stored in the attribute data storing step and the font data to convert the character object stored in the character object storing step into subtitle data.

A program of the present invention allows a computer to execute a process including a reading control step of controlling reading of first information including a character object for displaying subtitles and attribute data from a recording medium or a storage unit within the playback apparatus, a character object storing step of storing the character object included in the first information whose reading is controlled in the reading control step, an attribute data storing step of storing the attribute data included in the first information whose reading is controlled in the reading control step, and a conversion step of acquiring font data and using the attribute data stored in the attribute data storing step and the font data to convert the character object stored in the character object storing step into subtitle data.

In a playback apparatus, playback method, and program of the present invention, first information including a character object and attribute data for displaying subtitles is read from a recording medium or a storage medium within the playback apparatus, the character object included in the read first information is stored, and the attribute data included in the read first information is stored. After font data is acquired, the character object is converted into subtitle data by using the attribute data and the font data.

ADVANTAGES

According to the present invention, subtitle data corresponding to displayed subtitles, and, when an AV stream is played back, not by acquiring data corresponding to subtitles which is converted into image data beforehand, but by acquiring a character object and attribute data, the acquired data can be converted into subtitle data.

BRIEF DESCRIPTION OF THE DRAWINGS

FIG. 7 is an illustration of examples of a file system on an optical disc and a file system in a local storage.

FIG. 10 is an illustration of data to be distributed after being added.

FIG. 11 is an illustration of syntax of SubPlayItem.

FIG. 12 is an illustration of text subtitle file syntax.

FIG. 13 is an illustration of attribute setting based on a control character.

FIG. 14 is an illustration of attribute settings based on control characters.

FIG. 15 is an illustration of markup format identifiers and markup formats.

FIG. 16 is an illustration of a data structure of subtitle_data( ) in the case of attribute setting in the TLV encoding method.

FIG. 17 is an illustration of an escape code.

FIG. 18 is an illustration of codes representing attribute types described in attribute_type.

FIG. 19 is an illustration of a data structure of attribute_value when a described attribute_type is CLUT setting.

FIG. 20 is an illustration of a data structure of attribute_value when a described attribute type represents specification of the origin of a region.

FIG. 21 is an illustration of examples of codes representing rendering directions.

FIG. 22 is an illustration of codes described in attribute_value when a described attribute type represents specification of a font style.

FIG. 23 is an illustration of a data structure of attribute_value when a described attribute type represents specification of a bookmark start position.

FIG. 24 is an illustration of a data structure of attribute_value when a described attribute type represents specification of a bookmark end position.

FIG. 25 is an illustration of a data structure of attribute_value when a described attribute type represents specification of repetition of a character object sequence.

FIG. 26 is an illustration of a data structure of subtitle_data( ) in the case of attribute specification in a tagged language.

FIG. 27 is an illustration of a TaggedAttr format.

FIG. 28 is an illustration of elements and attribute types of attribute specification in tagged language.

FIG. 43 is an illustration of data to be distributed after being added.

FIG. 44 is an illustration of an archive of data to be distributed after being added.

FIG. 46 is an illustration of a list of values that can be specified in operation_type included in the metadata in FIG. 44.

FIG. 53 is an illustration of a list of values that can be specified in permission included in the metadata in FIG. 44.

FIG. 54 is an illustration of text subtitle file syntax.

FIG. 55 is an illustration of a data structure of subtitle_data( ) in the case of attribute specification based on the TLV encoding method.

FIG. 56 is an illustration of code representing attribute types written in data_type.

FIG. 57 is an illustration of elements and attribute types of attribute specification in tagged language.

FIG. 58 is an illustration of a container file storing a text subtitle stream.

REFERENCE NUMERALS

Figure 1:
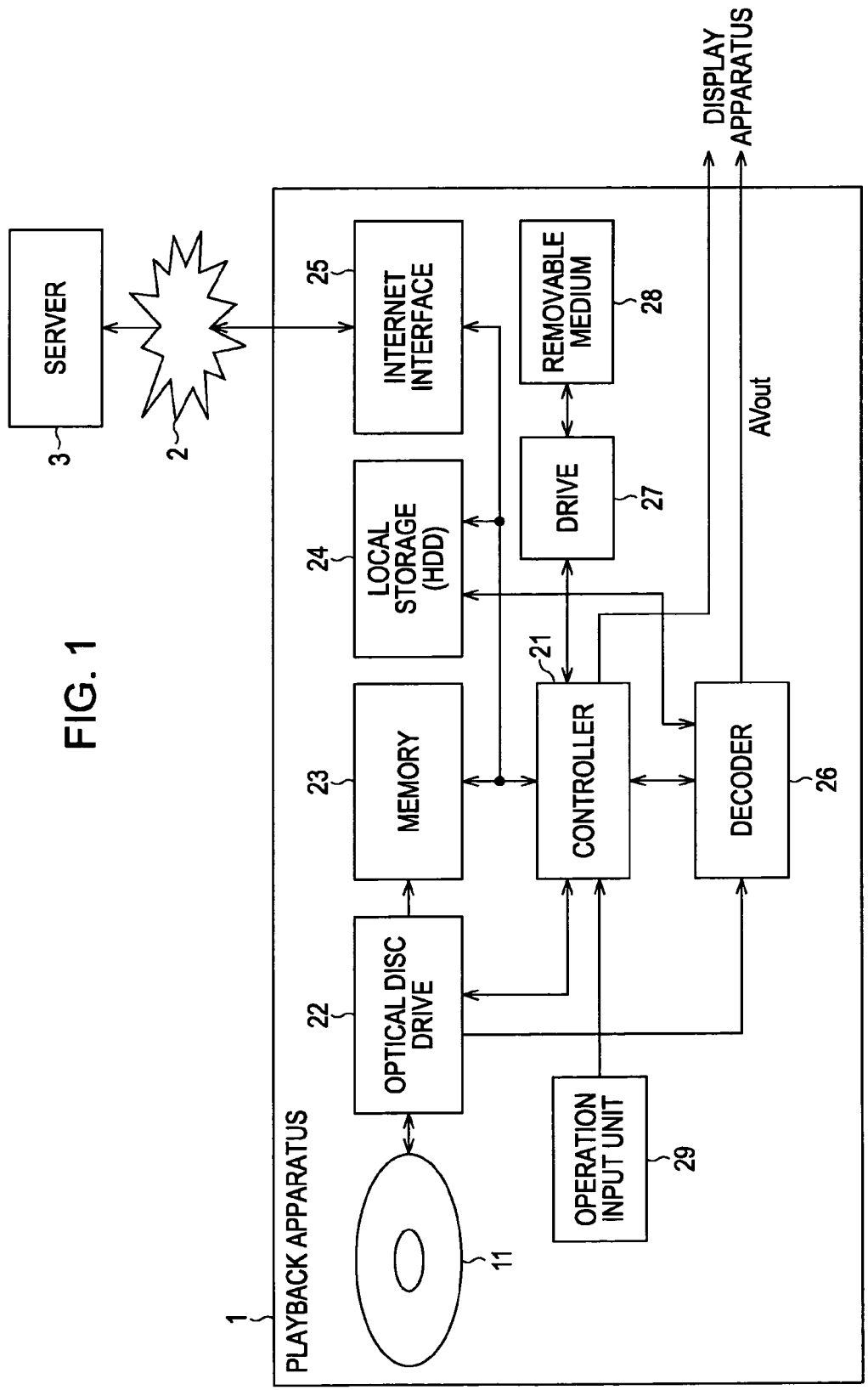
FIG. 1 is a block diagram showing the configuration of a playback apparatus according to a first embodiment to which the present invention is applied.

1 playback apparatus
11 optical disc
21 controller
22 optical disc drive
23 memory
24 local storage
26 decoder
31 menu-screen-display control section
32 operation input acquiring section
33 data acquiring section
34 local storage directory managing section
35 optical disc directory managing section
66 file system merging section
37 playback control section
81 control section
86 audio decoder
87 MPEG video decoder
92 text subtitle processor
93 text subtitle processor
94 synthesizer
121 text data decoder
122 character object buffer
123 attribute data buffer
124 font rasterizer
125 bookmark buffer
181 playback apparatus
191 controller
192 decoder
193 optical disc
201 local storage directory managing section
202 optical disc directory managing section
203 file system merging section
204 playback control section
211 STC counter
214 controller
215 disc data acquiring section
216 memory
217 buffer
218 storage data acquiring section
219 buffer
220 text subtitle processor
231 STC processor
232 text data decoder

BEST MODE FOR CARRYING OUT THE INVENTION

Embodiments of the present invention are described below with reference to the drawings.

FIG. 1 is a block diagram showing an example of the configuration a playback apparatus 1 according to a first embodiment to which the present invention is applied.

A controller 21 controls the operation of the entirety of the playback apparatus 1 by executing a prepared control program or by controlling a optical disc drive 22 to read a navigation program (described later) recorded on the optical disc 11 and executing the read program after loading it into a memory 23. For example, when the optical disc 11 is loaded, the controller 21 can control an external display apparatus to display a predetermined menu screen.

Under the control of the controller 21, the optical disc drive 22 reads data from the optical disc 11, and outputs the read data to the controller 21, the memory 23, or a decoder 26. When information read from the optical disc 11 is a navigation program, a PlayList, or the like, the read information is output to the controller 21 or the memory 23 by the optical disc drive 22. When the information read from the optical disc 11 is an AV stream or text data, the read information is output to the decoder 26 by the optical disc drive 22.

Figure 2:
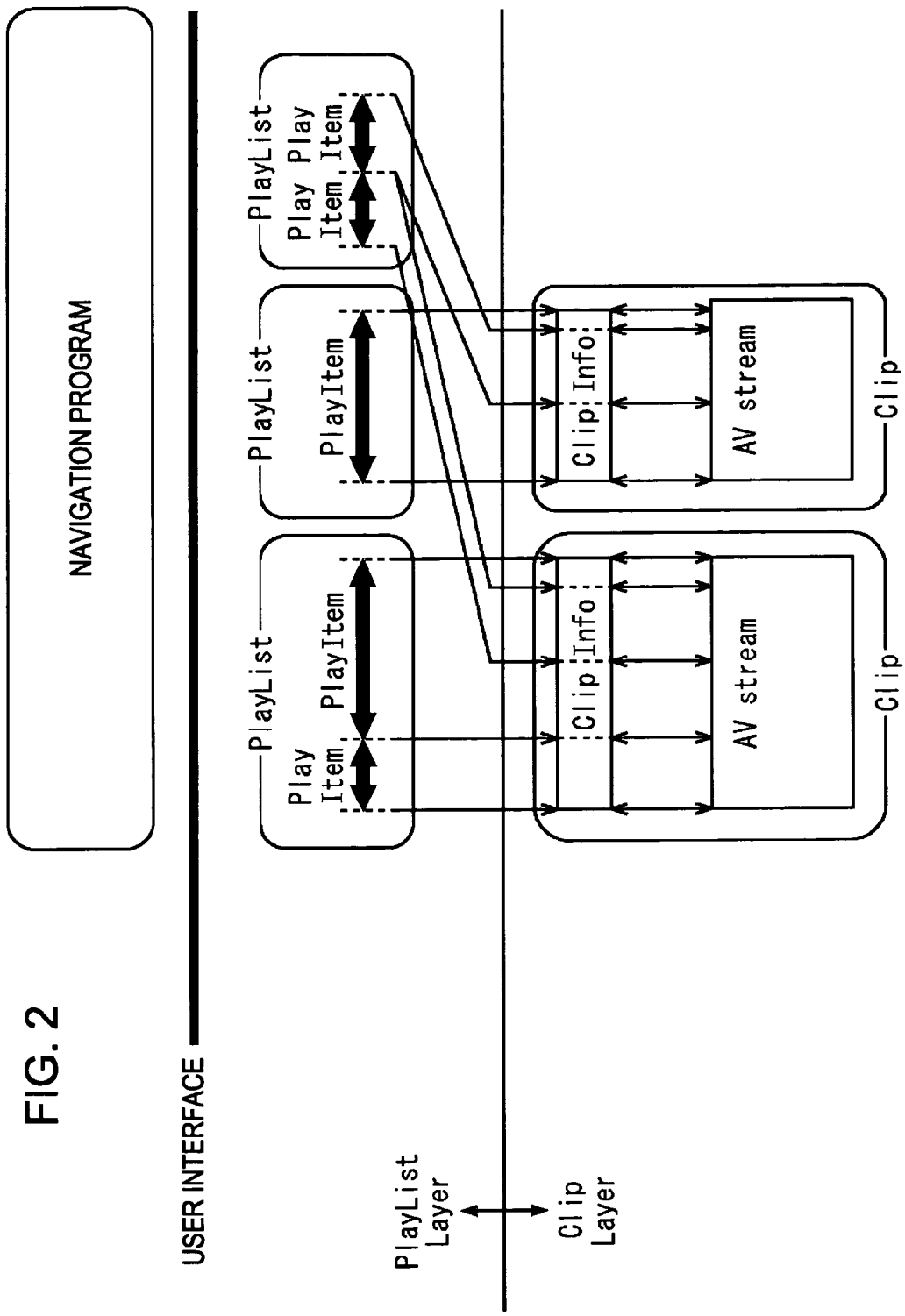
FIG. 2 is an illustration of an example of the format of an application in a recording medium loaded into the playback apparatus according to the first embodiment to which the present invention is applied.

FIG. 2 is an illustration of an example of an application format on the optical disc 11, which is loaded into the playback apparatus 1 to which the present invention is applied. The recording medium may be not only the optical disc 11 but also, for example, a magnetic disk or a semiconductor memory.

The application format has two layers, a PlayList and a Clip, for managing an AV (Audio Visual) stream. Here, a pair of one AV stream or text data and Clip Information that is information associated therewith is regarded as one object, and they are collectively referred to as a Clip. An AV stream data file is hereinafter referred to as an AV stream file. Also, a Clip Information data file is referred to as a Clip Information file.

In general, a file for use in a computer or the like is treated as a byte string. However, content on an AV stream file is expanded on a time base, and an access point in the Clip is mainly a time stamp and is specified by the PlayList.

When an access point in the Clip is a time stamp and is specified by the PlayList, the Clip Information file is used to find, from the time stamp, information of an address in the AV stream file at which decoding in the AV stream file is to be initiated.

The PlayList is a set of pieces of information representing AV stream playback intervals. Information representing one playback interval in an AV stream is called a PlayItem, and the PlayItem is represented by an IN point (playback start point) and OUT point (playback end point) in a playback interval on a time base. Accordingly, as shown in FIG. 2, PlayLists include one or more PlayItems.

A first PlayList, which is the first one from the left in FIG. 2, includes two PlayItems, and the two PlayItems refer to first and latter parts of an AV stream included in a first Clip on the left side in FIG. 2. Also, a second PlayList, which is the second one from the left in FIG. 2, is formed by a PlayItem, and the PlayItem refers to the entirety of an AV stream included in a second Clip on the right side in FIG. 2. In addition, a third PlayList, which is the third one from the left in FIG. 2, includes two PlayItems, and the two PlayItems refer to a predetermined part of the AV stream included in the first Clip on the left side in FIG. 2 and a predetermined part of the AV stream included in the second Clip on the right side in FIG. 2.

The navigation program allows the controller 21 to execute functions of controlling playback order of PlayLists and interactive PlayList playback. The navigation program also includes a function of displaying a menu screen for a user to direct execution of various types of playback. This navigation program is described in a programming language such as, for example, Java (registered trademark), and is recorded on a recording medium such as the optical disc 11. For example, when the navigation program is executed by the controller 21, and, as information representing a playback position at that time, a first PlayItem in the first PlayList at the first position from the left in FIG. 2 is specified, the first part, referred by the first PlayItem, of the AV stream included in the first Clip on the left side in FIG. 2 is played back.

Figure 3:
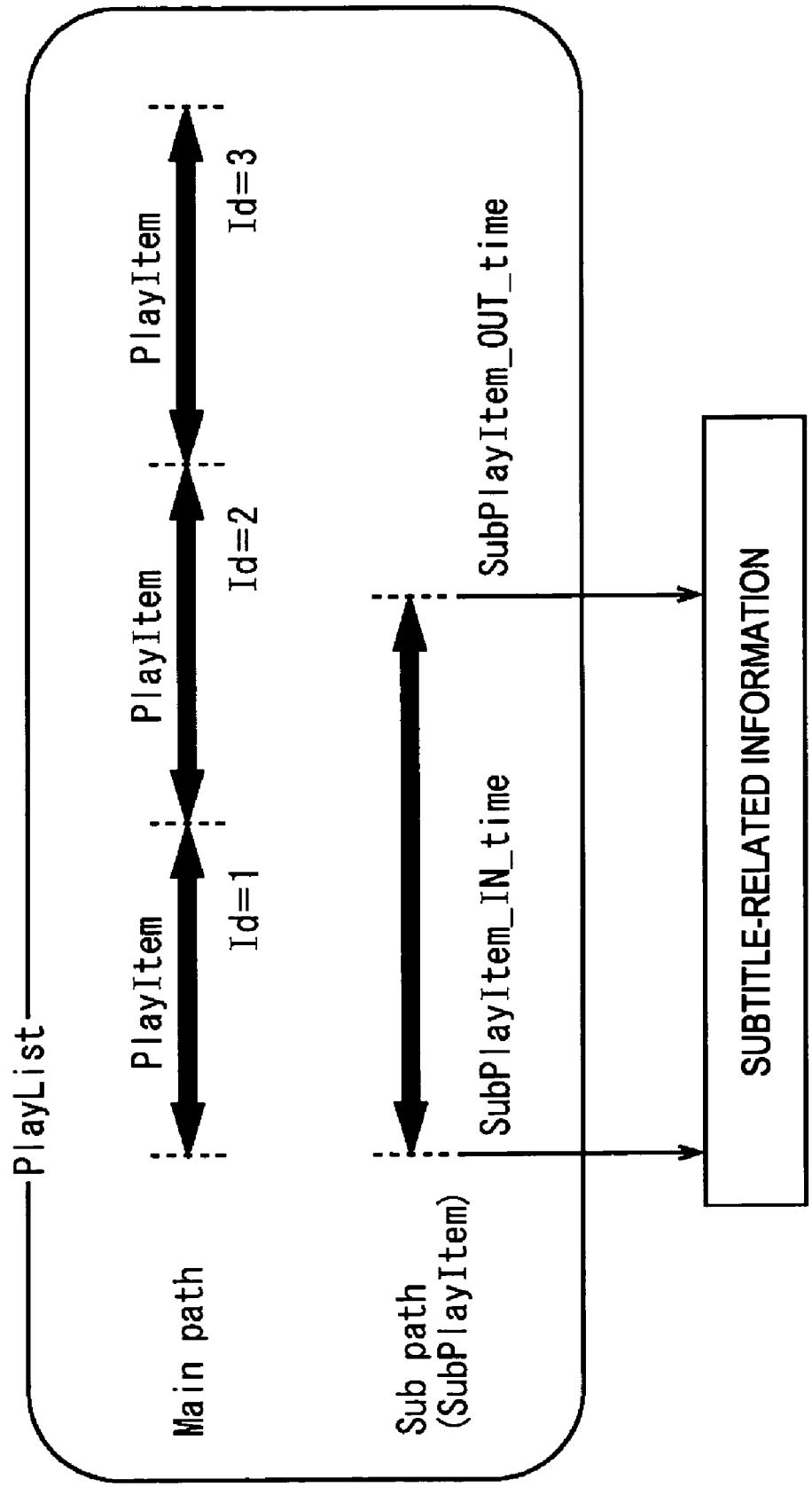
FIG. 3 is an illustration of a different example of the format of the application on the recording medium loaded into the playback apparatus to which the present invention is applied.

In addition, the PlayLists described by using FIG. 2 can include, in addition to main-paths specified by PlayItems, information of a sub-path specified by using the SubPlayItem shown in FIG. 3. By defining the SubPlayItem, for example, an independent data stream that is not multiplexed in a Clip (for example, an MPEG-2 transport stream) specified by a PlayItem can be played back in synchronization with AV stream playback.

For example, in a form corresponding to a Clip AV stream of a main path specified by a PlayItem, by preparing subtitle-related information including a text subtitle file and a font file necessary for rendering, and a SubPlayItem specifying a playback interval of the subtitle-related information, simultaneously with playback of the Clip AV stream, subtitles corresponding to data described in the text subtitle file can be displayed in a display font based on font data described in the font data.

The subtitle-related information including the text subtitle file and the font file necessary for rendering, and the SubPlayItem may be recorded on the optical disc 11 beforehand, may be downloaded from the server 3 through the network 2, or may be acquired by using a removable medium (for example, a removable medium 28, which is described later). Details of the case of downloading the subtitle-related information and the SubPlayItem from the server 3 are described later by using FIG. 4.

The description returns to FIG. 1 again.

The memory 23 stores data, etc., which are necessary for the controller 21 to execute various types of processing, if necessary. The local storage 24 is formed by, for example, an HDD (Hard Disk Drive).

An Internet interface 25 is connected to a network 2 in a wired or wireless manner, and is controlled by the controller 21 to perform communicating with the server 3 via the network 2 and supplying the local storage 24 with data downloaded from the server 3. From the server 3, for example, data that updates the data described by using FIG. 2, which is recorded on the optical disc 11, and which is loaded into the playback apparatus 1 at this time, is downloaded as content. In the local storage 24, the content downloaded from the server 3 through the network 2 can be recorded.

The decoder 26 decodes an AV stream or text data supplied from the optical disc drive 22 or the local storage 24, and outputs obtained video and audio signals to the external display apparatus. On the basis of the signals obtained by decoding in the decoder 26, the display apparatus outputs the content (video and audio) recorded on the optical disc 11.

An operation input unit 29 includes, for example, input devices such as buttons, a touch panel, a jog dial, and a mouse, and a receiving section for receiving signals such as an infrared signal transmitted from a predetermined remote commander. The operation input unit 29 acquires and supplies a user's operation input to the controller 21.

In addition, a drive 27 is also connected to the controller 21, if necessary. The removable medium 28, which is formed by, for example, a magnetic disk (including a flexible disk), an optical disc (including CD-ROM (Compact Disk-Read Only Memory) and a DVD), or a semiconductor memory, is loaded into the drive 27.

Next, a method that plays back data recorded on the optical disc 11 loaded into the playback apparatus 1 and data stored in the local storage 24 is described.

The playback apparatus 1 internally includes the local storage 24 including an HDD (Hard Disk Drive). The playback apparatus 1 is connected to the network 2 in a wired or wireless manner, and can record, in the local storage 24, content downloaded from the server 3 through the network 2. From the server 3, for example, data that updates content, such as a movie, recorded on the optical disc 11 in a state loaded into the playback apparatus 1 at that time, can be downloaded.

When, in a state with the downloaded content recorded in the local storage 24, playback of the content recorded on the optical disc 11 is directed by the operation input unit 29, the controller 21 executes a content playback process in a form in which the content recorded on the optical disc 11 and the content recorded in the local storage 24 are associated with each other.

Figure 4:
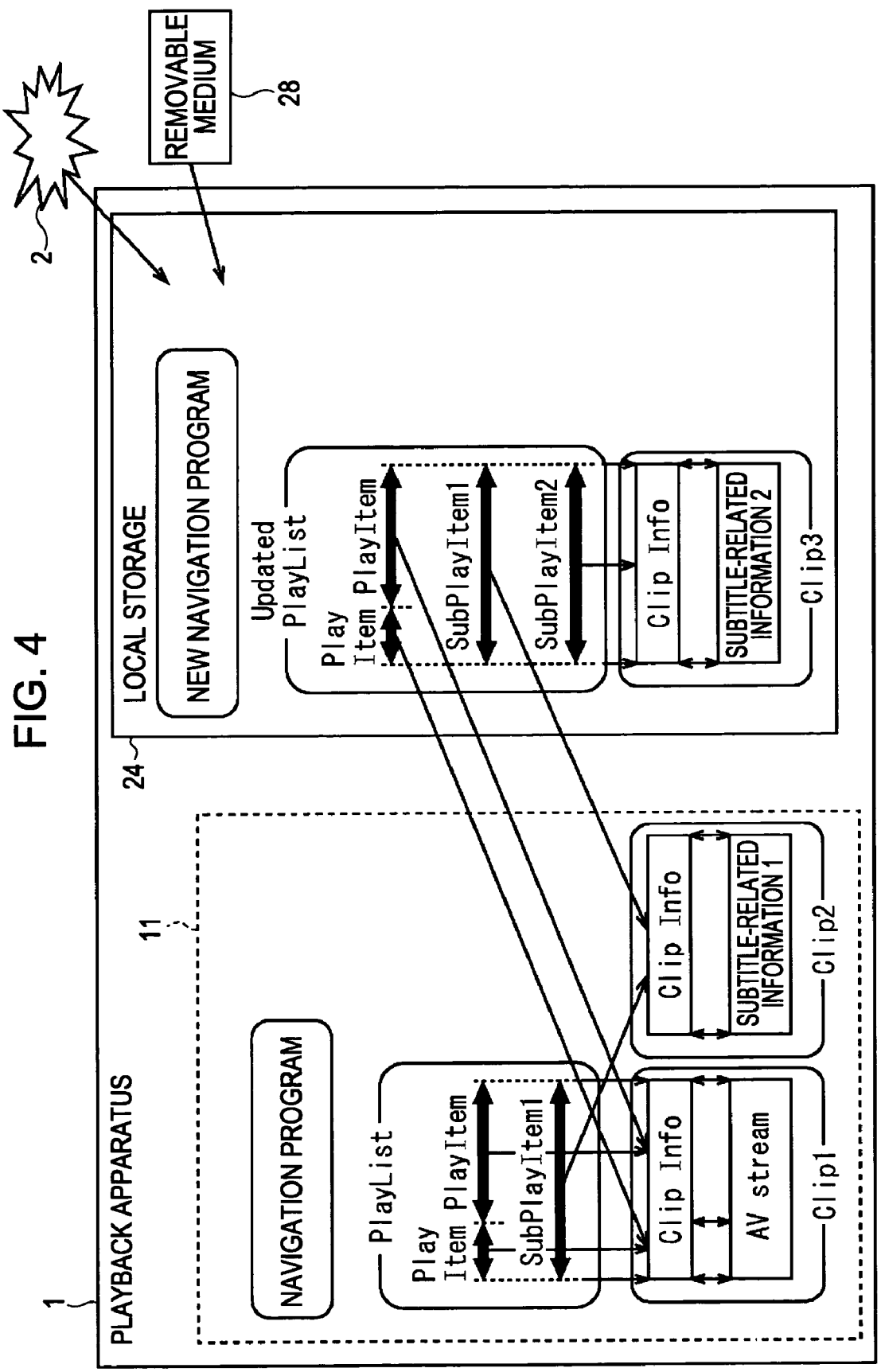
FIG. 4 is an illustration of a state in which downloading of a file is performed.

Here, a method of playback in a form in which the content recorded on the optical disc 11 and the content recorded in the local storage 24 are associated with each other is described by using FIG. 4.

For example, it is assumed that the optical disc 11 in FIG. 2 be a medium sold in package form, and it is assumed that content of a certain movie be recorded thereon. It is also assumed that only an English text subtitle file be recorded as a file of subtitle data that can be displayed so as to be superimposed on video of the movie content.

For example, in FIG. 4, the AV stream, recorded on the optical disc 11, of Clip 1 that is referred to by a PlayItem of a PlayList is a stream for displaying video of movie content and playing back corresponding audio. Subtitle-related information 1 of Clip 2 that is referred to by a SubPlayItem of the PlayList is a text subtitle file for displaying English subtitles together with displayed video.

When, in this state, the user wishes to view the movie content recorded on the optical disc 11 while displaying subtitles in a language different from English, since subtitle data in the language different from English are not recorded on the optical disc 11, in this situation, the user cannot view the movie while displaying the subtitle data in the language different from English.

Accordingly, the user uses the playback apparatus 1 to download (or to use the removable medium 28 to acquire) a text subtitle file in a desired language of the movie recorded on the optical disc 11 from the server 3 through the network 2. A state in which a text subtitle file is not recorded beforehand, for example, a state in which an Arabic text subtitle file has been downloaded (or in which the text subtitle file has been copied from the removable medium 28 to the removable medium 28), is described.

In other words, when the user directs downloading of the Arabic text subtitle file, which corresponds to a PlayList recorded on the optical disc 11 beforehand, the playback apparatus 1 accesses the server 3 and downloads a file prepared in the server 3 as a file that updates content recorded on the optical disc 11.

In the example in FIG. 4, the playback apparatus 1 downloads and records, in the local storage 24, Clip3 including an Arabic text subtitle file (subtitle-related information 2) and a Clip Information file associated therewith, data recorded on the optical disc 11 beforehand, for example, movie content video and audio Clips (AV stream data) and an English text subtitle file, a PlayList file (Updated PlayList file) capable of controlling playback display of corresponding Clip3 subtitle data, and a new navigation program updated compared with one recorded on the optical disc 11.

The Updated PlayList has SubPlayItem1 and SubPlayItem2 added thereto representing sub-paths in addition to the PlayItems representing main-paths. In the Updated PlayList, PlayItems refer to Clip1 including the AV stream recorded on the optical disc 11, SubPlayItem1 refers to Clip2 including the subtitle-related information 1 recorded on the optical disc 11, and SubPlayItem2 refers to subtitle-related information 2 including subtitle-related information 2 as an Arabic text subtitle file, which is downloaded from the server 3 with the Updated PlayList.

The new navigation program in FIG. 4 can specify the SubPlayItem1 or SubPlayItem2 as a playback interval as wells as the PlayItems of the Updated PlayList. This makes it possible to display, in a form associated with, for example, desired video and audio data, subtitles in a user-desired language between English subtitles defined in an English text subtitle file recorded on the optical disc 11 beforehand and Arabic subtitles defined in an Arabic text subtitle file.

As described above, downloading from the server 3 (or copying from the removable medium 28) is performed, whereby the playback apparatus 1 can play back and display, as movie subtitles, one of the Clip2 as the English text subtitle file and the Clip3 as the Arabic text subtitle file. In other words, by selecting a desired language from displayable subtitle languages on the menu screen displayed on the display apparatus, the user can view the movie in a desired language between English and Arabic.

Figure 5:
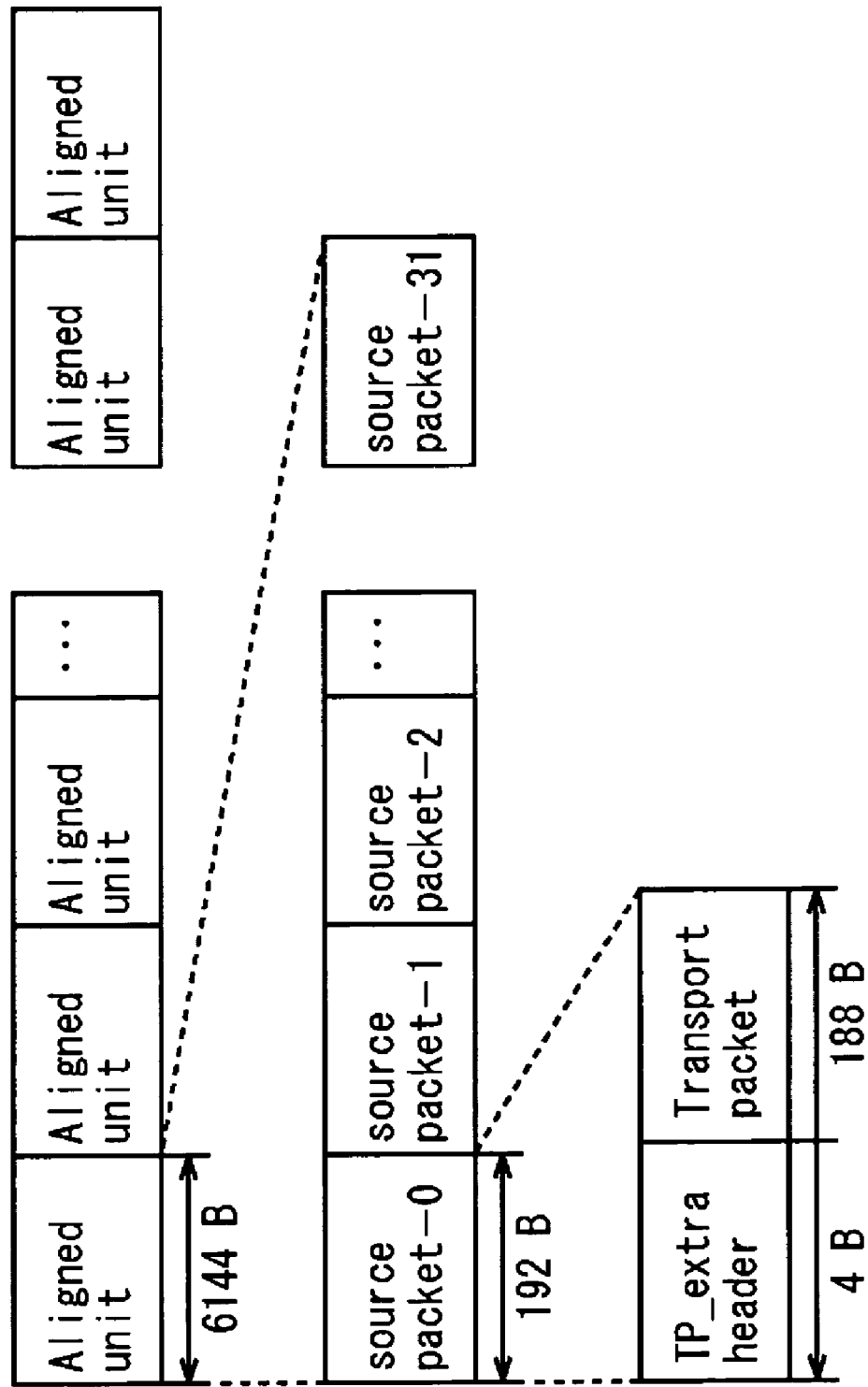
FIG. 5 is an illustration of an AV stream.

The AV stream recorded on the optical disc 11 has the MPEG-2 (Moving Picture Experts Group 2) transport stream shown in FIG. 5. The transport stream includes an integral number of Aligned units. The size of an Aligned unit is 6144 bytes (2048×3 bytes) and begins at the first byte of a source packet. A source packet has a length of 192 bytes. A source packet includes a TP_extra_header and a transport packet. A TP_extra_header has a length of 4 bytes, and a transport packet has a length of 188 bytes. An Aligned unit includes 32 source packets. Video stream and audio stream data are packetized into PES (Packetized Elementary Stream) packets, and a PES packet is packetized into transport packets.

Figure 6:
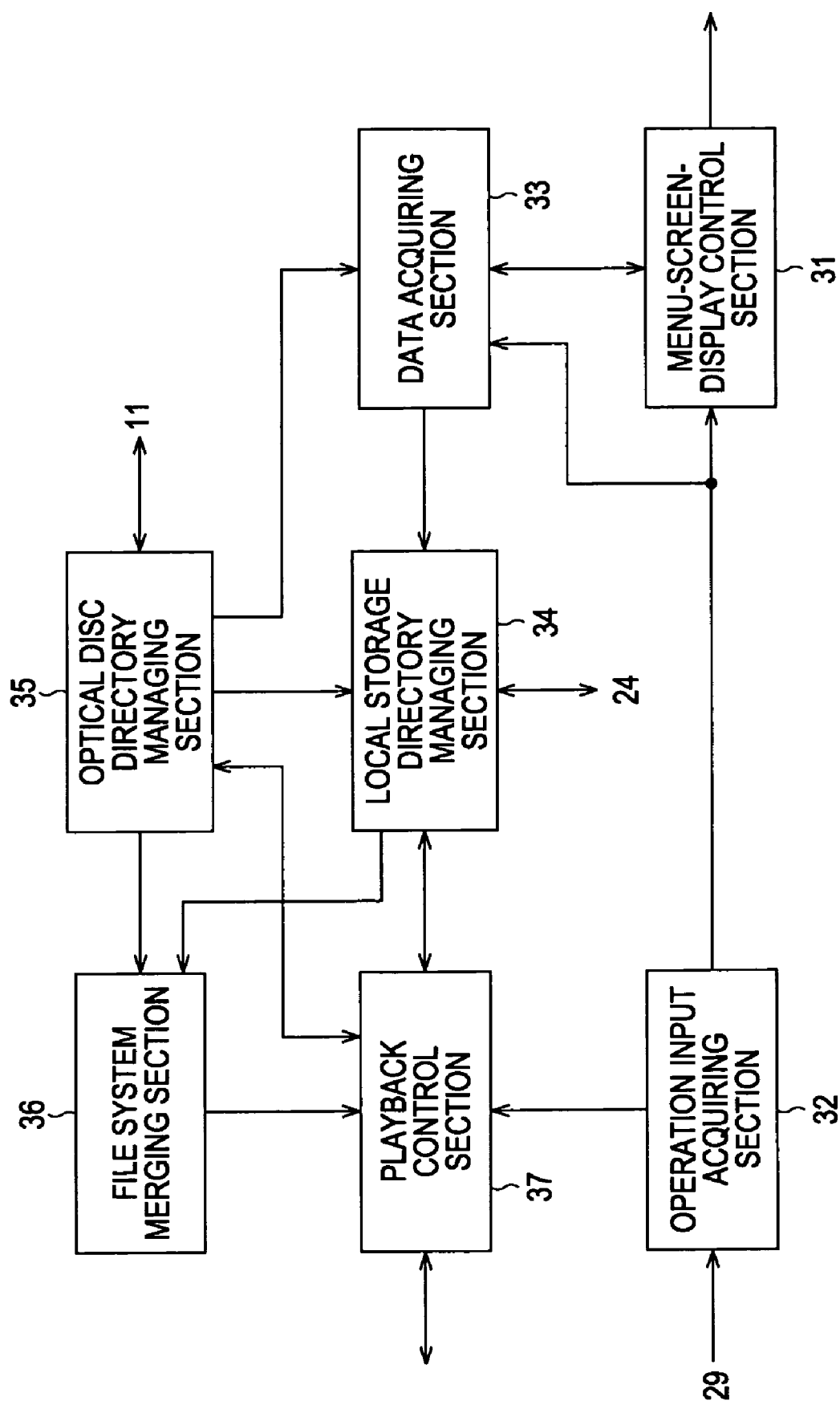
FIG. 6 is a functional block diagram illustrating functions of the controller in FIG. 1.

FIG. 6 is a block diagram showing an example of a functional configuration of the controller 21 in FIG. 1.

Each functional section in FIG. 6 is realized such that a prepared control program is executed by the controller 21, or the navigation program recorded on the optical disc 11 is executed by the controller 21.

A menu-screen-display control section 31 controls the external display apparatus to display a menu screen including audio of content recorded on the optical disc 11 or a subtitle language, buttons that are operated by the user when selecting a video angle, and buttons that are operated by the user when selecting an update file to be downloaded.

A operation input acquiring section 32 acquires a signal which is input from the operation input unit 29 and which represents an operation input from the user, and outputs the signal to a corresponding section among the menu-screen-display control section 31, a data acquiring section 33, and a playback control section 37.

The data acquiring section 33 controls communication performed by the Internet interface 25 in FIG. 1 or exchange of information by the drive 27 with the removable medium 28. For example, the data acquiring section 33 downloads and acquires an update file specified by the user from the server 3, and outputs the acquired file to a local storage directory managing section 34.

The local storage directory managing section 34 manages directories of the local storage 24, and controls data writing to the local storage 24 and data reading from the local storage 24. For example, a PlayList read from the local storage 24 under the control of the local storage directory managing section 34 is output to the memory 23, and audio data and video data of an AV stream and text data of a text subtitle file which are read from the local storage 24 are output to the decoder 26. In addition, when merging of a file system of the optical disc 11 and a file system of the local storage 24 is performed by a file system merging section 36, the local storage directory managing section 34 outputs file system information of the local storage 24 to the file system merging section 36.

An optical disc directory managing section 35 manages directories of the playback apparatus 1 and controls reading of each data item from the optical disc 11. The optical disc 11 has identification information Studio_id and Content_id set therein, and, under the control of the optical disc directory managing section 35, Studio_id and Content_id read from the optical disc 11 are output to the data acquiring section 33 and the local storage directory managing section 34. Also, under the control of the optical disc directory managing section 35, the PlayList read from the optical disc 11 is output to the memory 23, and the audio data and video data of the AV stream and the text data of the text subtitle file which are read from the optical disc 11 are output to the decoder 26. When, as described above, merging of the file system of the optical disc 11 and the file system of the local storage 24 is performed by the file system merging section 36, the optical disc directory managing section 35 outputs the file system information of the optical disc 11 to the file system merging section 36.

The file system merging section 36 generates a virtual file system by merging the file system of the optical disc 11 supplied from the optical disc directory managing section 35 and the file system of the local storage 24 supplied from the local storage directory managing section 34. The file system merging section 36 outputs, to the playback control section 37, the virtual file system generated by merging. The file system generated by merging in the file system merging section 36 in the first embodiment is hereinafter referred to as the first virtual file system, if necessary.

The playback control section 37 controls content playback by executing a navigation program specified by the first virtual file system supplied from the file system merging section 36. Specifically, by referring to the PlayList supplied and stored in the memory 23, and the playback control section 37 controls the local storage directory managing section 34 or the optical disc directory managing section 35 to read the AV-stream audio data and video data recorded on the optical disc 11 or in the local storage 24, and, in addition, the text data of the text subtitle file. The playback control section 37 also controls the decoder 26 in FIG. 1 to decode (play back) the AV-stream audio data and video data recorded on the optical disc 11 or in the local storage 24, and, in addition, the text data of the text subtitle file.

Merging, performed by the file system merging section 36, of the file system of the optical disc 11 and a file system recorded in the local storage 24 in a manner such as downloading from the server 3 is described below. For example, the merging is performed when playback of the content recorded on the optical disc 11 is directed.

FIG. 7 is an illustration of examples of the file system (left side) of the optical disc 11 and the file system (right side) of the local storage 24. As shown in FIG. 7, each file system has a directory structure.

Below "root" on the optical disc 11, a folder bearing the name "BDMV" is provided, and the folder contains a file bearing the name "info.bdmv" and a file bearing the name "Navigation.class". These files are hereinafter referred to as the info.bdmv file and the Navigation.class file, respectively. Similarly, other files and folders are referred to in a form with the word "file" added to a "file name" and in a form with the word "folder" added to a "folder name".

In the info.bdmv file, Studio_id that is identification information of a maker of the optical disc 11 and Content_id that is identification information of content are written.

In other words, on the Studio_id and the Content_id, the content recorded on the optical disc 11 is identified from the entirety of distributed content. In the example in FIG. 7, the Studio_id is "xxx", and the Content_id is "yyy". The Studio_id and the Content_id are also used to identify an update file to be downloaded.

The Navigation.class file is a navigation program described in a predetermined programming language.

The BDMV folder contains a folder bearing the name "PLAYLIST" (PLAYLIST folder), a folder bearing the name "CLIPINF" (CLIPINF folder), and a folder bearing the name "STREAM" (STREAM folder).

In FIG. 7, the PLAYLIST folder includes a file bearing the name "11111.mpls" and a file bearing the name "22222.mpls". These files include PlayLists that use time stamps to represent playback intervals such as AV stream files.

The CLIPINF folder includes a file bearing the name "01000.clip" and a file bearing the name "02000.clipi". These files include Clip information representing corresponding between a time stamp and address information of the AV stream file or the subtitle-related information 1 (FIG. 4).

The STREAM folder includes a file bearing the name "01000.m2ts" and a file bearing the name "02000.m2ts". These files include the AV stream and subtitle-related information 1 in FIG. 4.

In addition, below "root" in the local storage 24, a folder bearing the name "xxx-yyy" is provided. The folder name indicates that data in this folder corresponds to content which are recorded on the optical disc 11 and which can be identified by Studio_id "xxx" and Content_id "yyy". As is described later, an xxx-yyy folder is created in a case in which, after the optical disc 11 when it has Studio_id "xxx" and Content_id "yyy" is loaded into the playback apparatus 1, an update file (each file stored in the xxx-yyy folder) is downloaded.

The xxx-yyy folder includes an info.bdmv file and a Navigation.class file. This info.bdmv file is identical to that of the optical disc 11, and the Navigation.class file is a file obtained by updating the Navigation.class file of the optical disc 11. In other words, the Navigation.class file in the local storage 24 is a file describing a navigation program having a higher version compared with one recorded on the optical disc 11.

The xxx-yyy folder further includes a PLAYLIST folder, a CLIPINF folder, and a STREAM folder.

In FIG. 7, the PLAYLIST folder in the local storage 24 contains a file bearing the name "11111.mpls" and a file bearing the name "22222.mpls". The file bearing the name "22222.mpls" between both is a file obtained by updating a file of the optical disc 11 which bears the same name. For example, the file bearing the name "22222.mpls" in the local storage 24 represents the downloaded Updated PlayList (FIG. 4), and, in this file, data in which SubPlayItems are added to the PlayList is written.

The CLIPINF folder in the local storage 24 contains a file bearing the name "04000.clipi" other than a file bearing the name "01000.clipi" and a file bearing the name "02000.clipi" which are recorded also recorded on the optical disc 11. In other words, the file bearing the name "04000.clipi" is newly acquired by downloading, and is, for example, the Clip Information of Clip3 in FIG. 4.

The STREAM folder in the local storage 24 contains a file bearing the name "04000.m2ts". This file is newly acquired by downloaded, and is, for example, subtitle-related information 2 of Clip3.

Similarly, in the example in FIG. 7, below "root" in the local storage 24, a file bearing the name "xxx-aaa" and a file bearing the name "yyy-bbb" are provided. Each is created when each of an optical disc identified by Studio_id "xxx" and Content_id "aaa" and an optical disc identified by Studio_id "yyy" and Content_id "bbb" is loaded into the playback apparatus 1, and include a file corresponding to each content.

When there is the file system of the optical disc 11 and the file system of the local storage 24, the file system merging section 36 in the controller 21 generates the first virtual file system by merging, in the memory 23, the file system of the optical disc 11 and the file system of the local storage 24.

Specifically, when both the optical disc 11 and the local storage 24 have files having the same name, the file system merging section 36 performs merging based on time stamps (creation dates and times) and versions described in the files so that a file acquired by downloaded is used as a file that is referred to when content is played back. The file system merging section 36 also performs merging so that a file which is not on the optical disc 11 and which exists only in the local storage 24 is used as a file that is referred to when content is played back.

Figure 8:
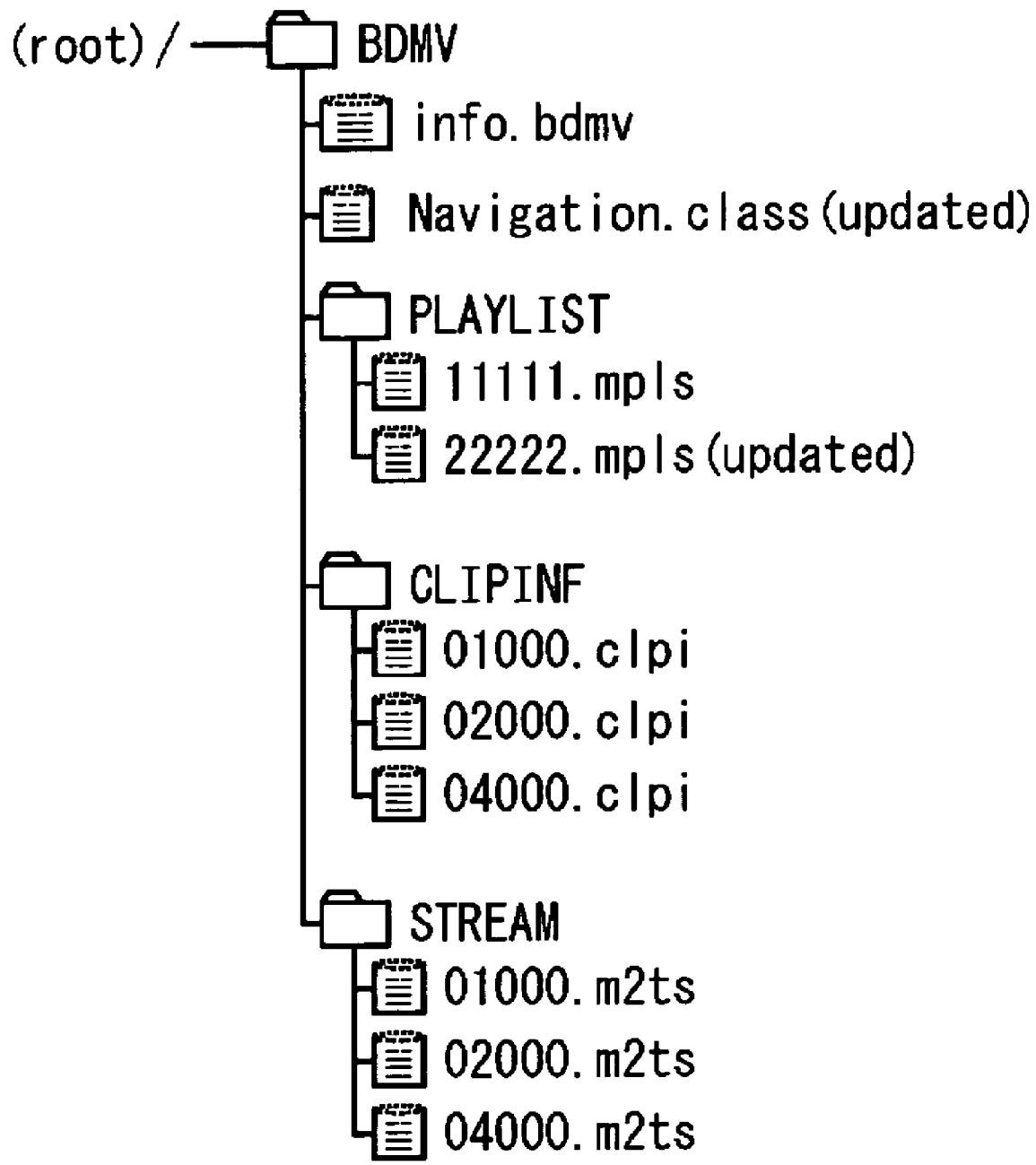
FIG. 8 is an illustration of an example of a file system obtained by merging the two file systems in FIG. 7.

FIG. 8 is an illustration of an example of the first virtual file system obtained from the two file systems in FIG. 7.

In FIG. 8, among the files recorded on the optical disc 11, the Navigation.class file and the file bearing the name "22222.mpls" are updated (replaced) by downloaded files. In addition, a file bearing the name 04000.clpi and a file bearing the name 04000.m2ts which are not recorded on the optical disc 11 are added.

In other words, when a downloaded file includes an updated navigation program or PlayList, the file updates (replaces) a file on the optical disc 11 which has an identical name. In addition, when a Clip file (Clip Information file or AV stream file) that does not exist on the optical disc 11 is downloaded, it is added to the file system.

An AV stream is accessed on the basis of the navigation program through the first virtual file system generated as described above (the optical disc 11 and the local storage 24 are not directly accessed).

Figure 9:
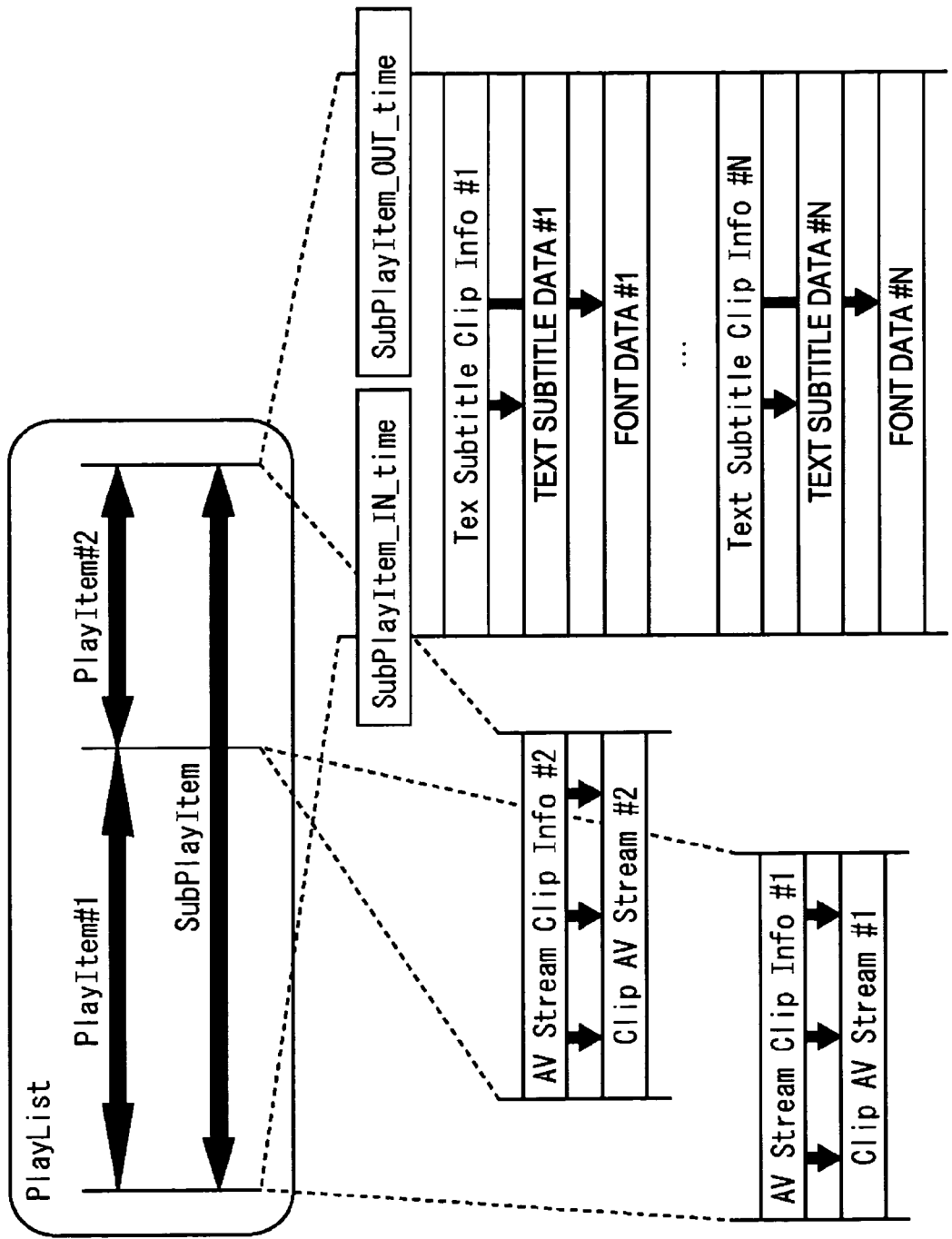
FIG. 9 is an illustration of a playlist and data that can be referred to by the play list.

Accordingly, in processing by the newly downloaded or copied new navigation program, data stored in the optical disc 11 beforehand, and data stored in the local storage 24 after being newly downloaded or copied are processed without being distinguished. As shown in FIG. 9, when subtitle-related information for displaying subtitles correspondingly to an AV stream in a predetermined interval includes text subtitle data forming text subtitle files corresponding to a plurality of languages and font data forming a font file, on the basis of a user's operation input, among subtitles in a plurality of languages that can be displayed on the basis of subtitle-related information stored in the optical disc 11 beforehand, and subtitle-related information stored in the local storage 24 after being newly downloaded and copied, subtitle data in a language desired by the user are processed and displayed in a form associated with the AV stream stored in the optical disc 11 beforehand.

In addition, an optical disc seller side (a seller and a maker) can later provide, for example, Arabic subtitle information through the network 2. Accordingly, the optical disc 11, with the movie recorded thereon, can be sold in a state in which English subtitles are displayable. In other words, the optical disc seller can sell discs with earlier timing without perform multilanguage translation at a time, and can additionally provide subtitle-related information corresponding to a different language, if necessary. Also, optical discs can be initially sold in an area corresponding to a main language, and, after translation into a different language finishes, an optical disc selling area can be later added. In addition, starting of a downward service of a text subtitle file in a corresponding language, etc., can be performed.

In order to enable displaying subtitle data in a form associated with the AV stream stored in the optical disc 11 beforehand, the optical disc seller side (seller and maker) needs to distribute at least the updated new playlist file and a text subtitle file, and, in addition, may distribute a font file for defining a display format of subtitles corresponding to text data written in the text subtitle file. It is assumed that basic font data be stored in the memory 23 or the like in the playback apparatus 1.

An archive (i.e., corresponding to the data stored in the local storage 24 described by using FIG. 4) of data to be added and distributed is shown in FIG. 10.

The data to be added and distributed includes a playlist file (PlayList_file), eight-bit number information (number_of_TextSubTitle) representing a text subtitle file, and a text subtitle file (text_subtitle_file) corresponding to the above text subtitle file, and may further include a font file (font_file).

FIG. 11 is an illustration a syntax of a SubPlayItem.

An eight-bit ref_to_STC_id field specifies an identifier of an STC sequence that is referred to by a Clip. A SubPlayItem_IN_time specifies a playback-start time of the SubPlayItem. A SubPlayItem_OUT_time specifies a playback-end time of the SubPlayItem. In other words, by using the SubPlayItem_IN_time and the SubPlayItem_OUT_time, a playback interval of the SubPlayItem can be specified. Time information written in the SubPlayItem_IN_time and the SubPlayItem_OUT_time is represented on the basis of a 45-kHz clock used in the STC.

An eight-bit number_of_ClipTextSubtitle field specifies a total number of subtitle text items defined in the SubPlayItem. An eight-bit language_id field specifies an identifier of a language used for subtitles. Data in a language_id field complies with the ISO/IEC 639-1 standard. An eight-bit character_code_id field specifies an identifier of a character data encoding method. An eight-bit font_format_id specifies a font format identifier.

A 16-bit font_file_path_length field specifies the number of bytes of a path name of a font file written in a font_file_path. In this field, zero is specified as the number of bytes of the font_file_path. When zero is specified, an internal font stored in the playback apparatus 1 beforehand is specified for processing. The font_file_path specifies a path name of a font file for use in drawing subtitle data. When a null character string is specified in the font_file_path field, the internal font stored in the playback apparatus 1 beforehand is specified for processing. A value in the font_file_path is encoded in the ISO/IEC 646 standard.

A 16-bit subtitle_file_path_length field specifies the number of bytes of a path name of a text subtitle file written in a subtitle_file_path. The subtitle_file_path specifies a path name of the text subtitle file. A value in the subtitle_file_path field is encoded in the ISO/IEC 646 standard.

A 16-bit comment_length field specifies the number of bytes of information written in a "comment". In the "comment", a text subtitle-related comment is written. The comment written in the "comment" is written in character set ISO/IEC 646.

The text subtitle file is written in accordance with the syntax shown in FIG. 12.

A "version" is 16-bit information specifying a text subtitle file version. A markup_type is eight-bit information specifying a markup format. A subtitle_count is 32-bit information specifying a total number of items of subtitle data. (the subtitle_count does not represent a total number of line feed codes) A start_PTS is 32-bit information specifying a subtitle-display-start time with a PTS of a Clip AV stream. An end_PTS is 33-bit information specifying a subtitle-display-end time with a PTS of the Clip AV stream. A subtitle_data_length is 32-bit information specifying the number of bytes (not the number of subtitle characters) of a subtitle_data. The subtitle_data is information specifying subtitle data.

The subtitle data includes a "character object" representing characters themselves which form subtitles and "attribute data". Setting the attribute data is described.

Regarding attribute data of subtitle data, there are two attribute setting techniques, attribute setting based on control characters and markup-based inline attribute setting.

At first, the attribute setting based on control characters is described by using FIGS. 13 and 14.

The character string "Tab" shown in FIG. 13 is treated as a null character string. Obviously, a plurality of character strings that can be treated as null character strings.

In addition, all the character strings shown in FIG. 14 are treated as line feed character strings. "CR" is treated as a line feed character string although it is a return symbol. "LF" is treated as a line feed character string. "CR+LF" is treated as a line feed character string although is a return and line feed symbol. "NEL" is treated as a return and line feed character string. "VT" is treated as a line feed character string although it is a vertical tab symbol. "FF" is treated as a line feed character string although it is a form feed symbol. "LS" is treated as a line feed character string although it is a line separation symbol. "PS" is treated as a line feed character string although it is a paragraph separation symbol.

Next, the markup-based inline attribute setting is described.

For attributes that can be specified, markups are defined. Markup formats include two types, markup in the TLV (Type-Length-Value) encoding format, and markup based on elements and attributes of a tagged language. As shown in FIG. 15, when a markup format identifier is 0x00, the markup format is defined as the TLV encoding format. When the markup format identifier is 0x01, the markup format is defined as a tagged language. In any of the formats, the scope of markup is all characters following a start marker, and, in order to enable unidirectional scanning of a decoder that decodes text data, an end marker is not defined. Accordingly, when the user wishes to locally an attribute, an immediately preceding attribute needs to be explicitly re-specified.

At first, a case in which attribute specification in the TLV encoding format is performed is described. In the case of attribute specification in the TLV encoding format, character encoding of subtitle data complies with specification of the character_code_id in the SubPlayItem.

A data structure of subtitle_data( ) in the case of attribute specification in the TLV encoding format is described by using FIG. 16.

An eight-bit escape_code field specifies the escape code 0x1B indicating that an attribute is later written, as shown in FIG. 17. An eight-bit attribute_type field specifies an attribute type. A code written in the attribute_type is described later by using FIG. 18. A 16-bit attribute_value_length field specifies the number of bytes of attribute data that follows thereafter. An attribute_value specifies attribute data. Char_data specifies a byte sequence of a character object.

Next, the attribute type code written in the attribute_type is described by using FIG. 18.

When the eight-bit attribute_type field of the subtitle_data( ) has 0x01, the attribute type represents a setting of a CLUT (Color Look Up Table) that is a conversion table between index data and model color data. The CLUT is a conversion table stored in a subtitle graphics plane processor, which is described later by using FIG. 33. When the eight-bit attribute_type of the subtitle_data( ) has 0x02, the attribute type specifies an origin of a region. When the eight-bit attribute_type of the subtitle_data( ) has 0x03, the attribute type specifies a line space. When the eight-bit attribute_type of the subtitle_data( ) has 0x04, the attribute type specifies a rendering direction. When the eight-bit attribute_type of the subtitle_data( ) has 0x05, the attribute type specifies a font color. When the eight-bit attribute_type of the subtitle_data( ) has 0x06, the attribute type specifies a background color. When the eight-bit attribute_type of the subtitle_data( ) has 0x07, the attribute type specifies a font style. When the eight-bit attribute_type of the subtitle_data( ) has 0x08, the attribute type specifies a font size.

When the eight-bit attribute_type of the subtitle_data( ) has 0x09, the attribute type specifies a font rotational angle. When the eight-bit attribute_type of the subtitle_data( ) has 0x0A, the attribute type represents a bookmark start position. When the eight-bit attribute_type of the subtitle_data( ) has 0x0B, the attribute_type represents a bookmark end position. When the eight-bit attribute_type of the subtitle_data( ) has 0x0C, the attribute type specifies repetition of a character object sequence bearing a book mark.

When the attribute type in the eight-bit attribute_type of the subtitle_data( ) is a CLUT setting, the attribute_value sets a CLUT index in the subtitle graphics plane processor, which is described later by using FIG. 33. A data structure of the attribute_value when the attribute type in the eight-bit attribute_type of the subtitle_data( ) is the CLUT setting is shown in FIG. 19.

An eight-bit CLUT_size has a CLUT size. Y represents eight-bit information setting luminance data, Cb and Cr each represent eight-bit information setting color-difference data, and T represents eight-bit information setting a transparency.

When the attribute type in the eight-bit attribute_type of the subtitle_data( ) specifies an origin of a region, the attribute_value specifies region origin coordinates (x, y). A data structure of the attribute_value when the attribute type in the eight-bit attribute_type specifies an origin of a region is shown in FIG. 20.

An x_coordinate is 16-bit information representing the x-coordinate of the region origin. A y_coordinate is 16-bit information representing the y-coordinate of the region origin.

Also, when the attribute type in the attribute_type of the subtitle_data( ) is line space specification, the attribute_value specifies a line space in units of pixels. Line space specification by default may be a "font height".

When the attribute type in the attribute_type of the subtitle_data( ) is rendering direction specification, the attribute_value has a rendering direction specifying code for specifying a rendering direction when a character object is drawn. Examples of the rendering direction specifying code are shown in FIG. 21.

In other words, in a case in which the attribute type in the attribute_type of the subtitle_data( ) is the rendering direction specification, when the attribute_value has 0x00, the rendering direction in drawing the character object is specified as from left to right, when the attribute_value has 0x01, the rendering direction in drawing the character object is specified as from right to left, and, when the attribute_value has 0x02, the rendering direction in drawing the character object is specified as from up to down.

Figure 33:
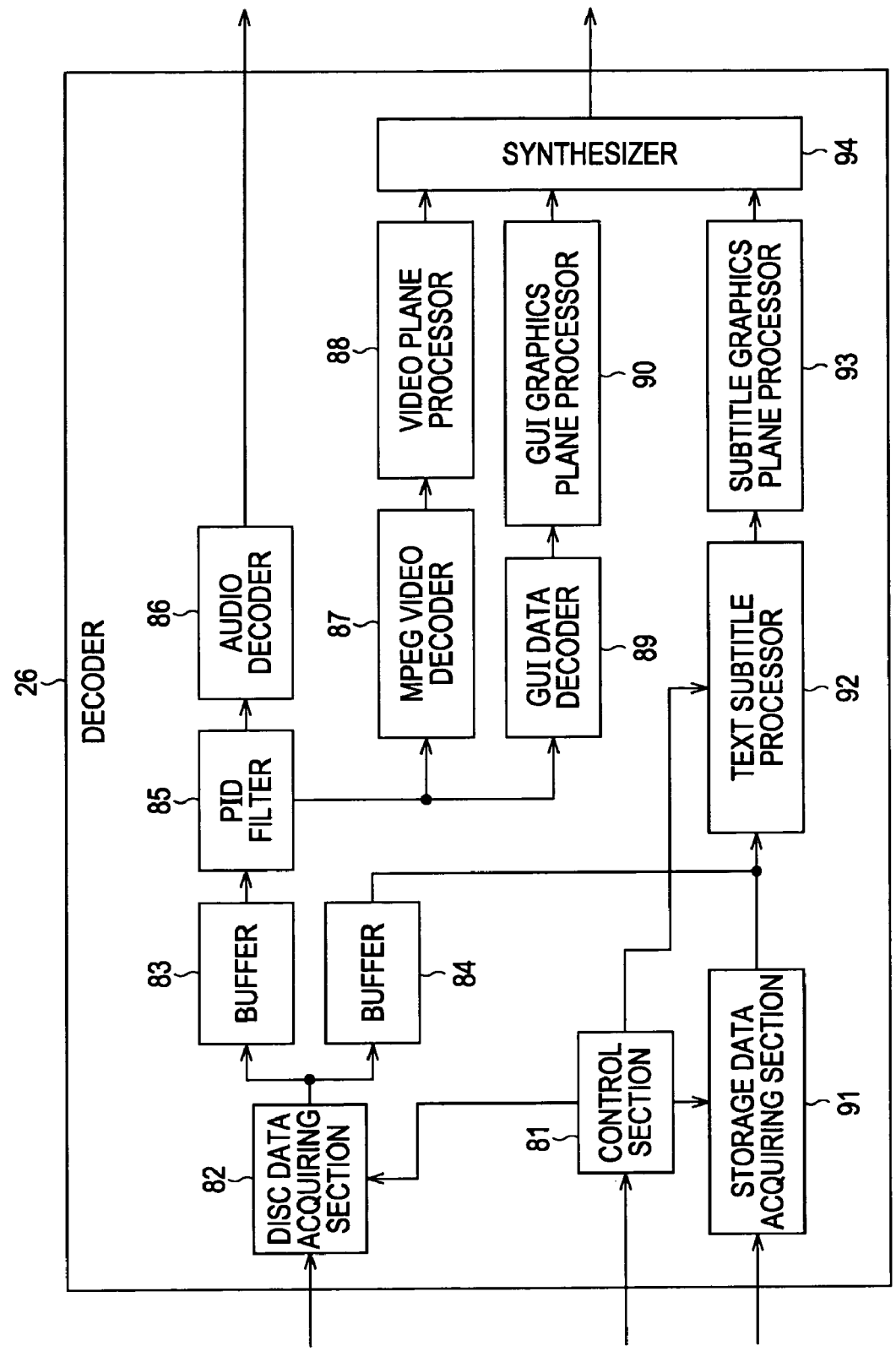
FIG. 33 is a block diagram illustrating a detailed configuration of the decoder in FIG. 1.

When the attribute type in the attribute_type of the subtitle_data( ) is the font color specification, in the attribute_value, a color specification index for the CLUT in the subtitle graphics plane processor, which is described later by using FIG. 33, is specified. The value by default of the attribute_value for setting the font color may be "zero".

When the attribute type in the attribute_type of the subtitle_data( ) is the background color specification, in the attribute_value, a background color index for the CLUT in the subtitle graphics plane processor, which is described later by using FIG. 33, is specified. Regions in the display screen that are covered by the specified background color have region units, and, for a default background color, no specification (transparency) is possible.

When the attribute type in the attribute_type of the subtitle_data( ) is font style specification, the attribute_value has one of the codes shown in FIG. 22, whereby the font style is specified. When the attribute_value has 0x00, the font style is specified to be standard. When the attribute_value has 0x01, the font style is specified to be bold. When the attribute_value has 0x02, the font style is specified to be italic. The font style may be "standard" by default.

When the attribute type in the attribute_type of the subtitle_data( ) is font size specification, in the attribute_value, a font size value that is not less than 8 and not greater than 72 is specified. The font size value may be "32" by default.

When the attribute type in the attribute_type of the subtitle_data( ) is font rotational angle specification, in the attribute_value, a value which is not less than 0 and not greater than 360 and which corresponds to the font rotational angle is specified. Regarding the rotational direction, for example, anticlockwise rotation is forward, and the rotational direction may be represented by "zero" by default.

When the attribute type in the attribute_type of the subtitle_data( ) is bookmark start position specification, in the attribute_value, a bookmark start position is specified. The bookmark is information that is given by a supplier of a text subtitle file so that, when the same character is displayed a plurality of times, rendering can be omitted. A data structure of the attribute_value when the attribute type in the attribute_type of the subtitle_data( ) is bookmark start position specification is shown in FIG. 23.

An eight-bit bookmark_id field has ID that can uniquely identify a bookmark. Here, a maximum of 256 bookmarks can be specified. An eight-bit start_of_bookmark_indicator field specifies a bookmark start position.

When the attribute type in the attribute_type of the subtitle_data( ) is bookmark end position specification, the attribute type specifies a bookmark end position. A data structure of the attribute_value when the attribute type in the attribute_type of the subtitle_data( ) is bookmark end position specification is shown in FIG. 24.

An eight-bit bookmark_id field has ID that can uniquely identify a book mark. An eight-bit end_of_bookmark_indicator field specifies a bookmark end position.

When the attribute type in the attribute_type of the subtitle_ data( ) is specification of character object sequence repetition, the attribute_value specifies a number of times a sequence of the character object bearing the bookmark is repeated. A data structure of the attribute_value when the attribute type in the attribute_type of the subtitle_data( ) is specification of character object sequence repetition is shown in FIG. 25.

An eight-bit bookmark_id field has ID that can uniquely identify a bookmark. An eight-bit count field specifies a number of times a bookmark is repeated.

Next, the case of attribute specification in tagged language is described. In the case of attribute specification in tagged language, the subtitle character encoding shall be ISO/IEC 646 encoding, ignoring the specification in the character_code_id of the SubPlayItem.

A data structure of the subtitle_data( ) in the case of attribute specification in tagged language is described by using FIG. 26.

The field TaggedAttr specifies a representation of attribute data in tagged language. The TaggedAttr complies with a predetermined format as shown in FIG. 27. Char_data specifies a byte sequence of a character object. In the byte sequence, ISO/IEC 646 encoding is performed in BASE64 encoding format. Then "<" and ">" escape on the basis of "0x1B".

Next, elements and attribute type in tagged language are described with reference to FIG. 28.

The CLUT setting is written as <CLUT size=y=cb=cr=t=>, and the size of the CLUT is specified in the attribute "size". The attributes "y", "cb", "cr", and "t" specify CLUT index columns in the subtitle graphics plane processor, which is described by using FIG. 33.

The region origin specification is written as <region x=y=>, and the attributes "x" and "y" specify region origin coordinated (x, y).

The line space specification is written as <linespace d=>, and the attribute "d" specifies a line space in units of pixels. a default line space may be a "font height".

The rendering direction specification is written as <textflow d=>, and the attribute "d" specifies a direction in which a character object is drawn. A default rendering direction may be set to "from left to right".

The font color specification is written as <fontcolor c=>. The attribute "c" specifies an index for the CLUT in the subtitle graphics plane processor, which is described by using FIG. 33. A default index corresponding to the font color may be "zero".

The background color specification is written as <backgroundcolor c=>, and the attribute "c" specifies an index for the CLUT in the subtitle graphics plane processor, which is described by using FIG. 33. Areas that are covered by the background color have region units, and, for a default background color, no specification (transparency) is possible.

The font style specification is written as <fontstyle s=>, and the attribute "s" specifies a font style such as a bold, italic, or standard. A default font style may be the "standard".

The font size specification is written as <fontsize s=>, and the attribute "s" specifies a value which is not less than 8 and not greater than 72, and which corresponds to the font size. The font size value may be "32" by default.

The font rotational angle specification is written as <fontrotate a=>, and the attribute "a" specifies a value which is not less than 0 and not greater than 360, and which corresponds to the font rotational angle. Regarding the rotational direction, for example, anticlockwise rotation is forward, and a default value corresponding to the font rotational angle may be set to "zero".

The bookmark specification is written as <mark id=>, and the attribute "id" specifies a value which is not less than 0 and not greater than 255 and which can uniquely identify a bookmark. This indicates that a bookmark is given to subtitle data in a scope of the element. A maximum of 256 bookmarks can be specified.

The character object repetition specification is written as <repeat id=c=>. The attribute "id" specifies a value which is not less than 0 and not greater than 255 and which can uniquely identify a bookmark, and the attribute "c" specifies a number of times of repetition. On the basis of this specification, subtitle data bearing the bookmark corresponding to the attribute value in the attribute "id" is repeated the number of times specified by the attribute "c".

Figure 29:
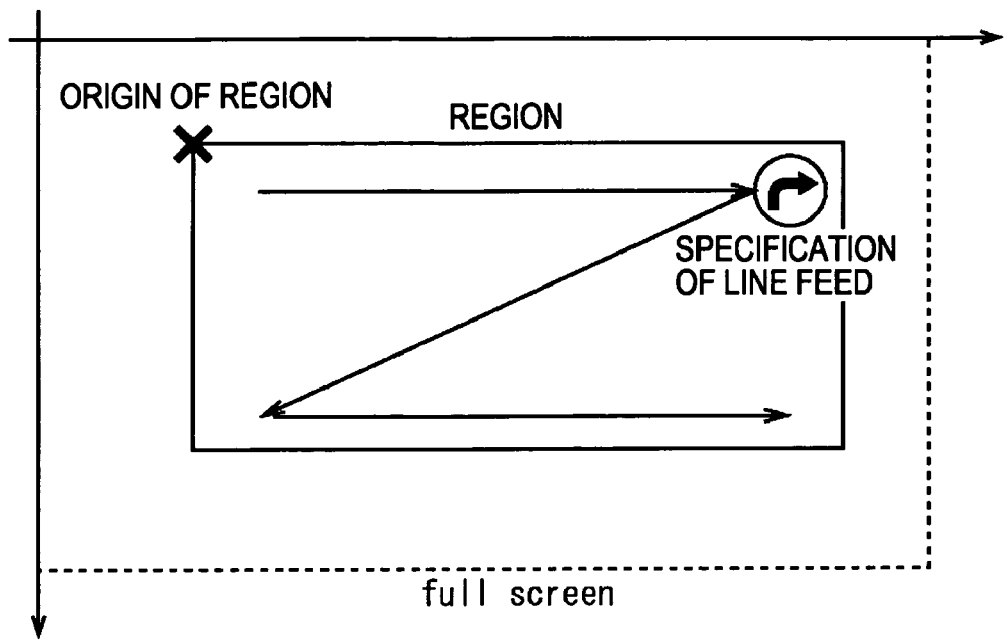
FIG. 29 is an illustration of a rendering direction.
Figure 30:
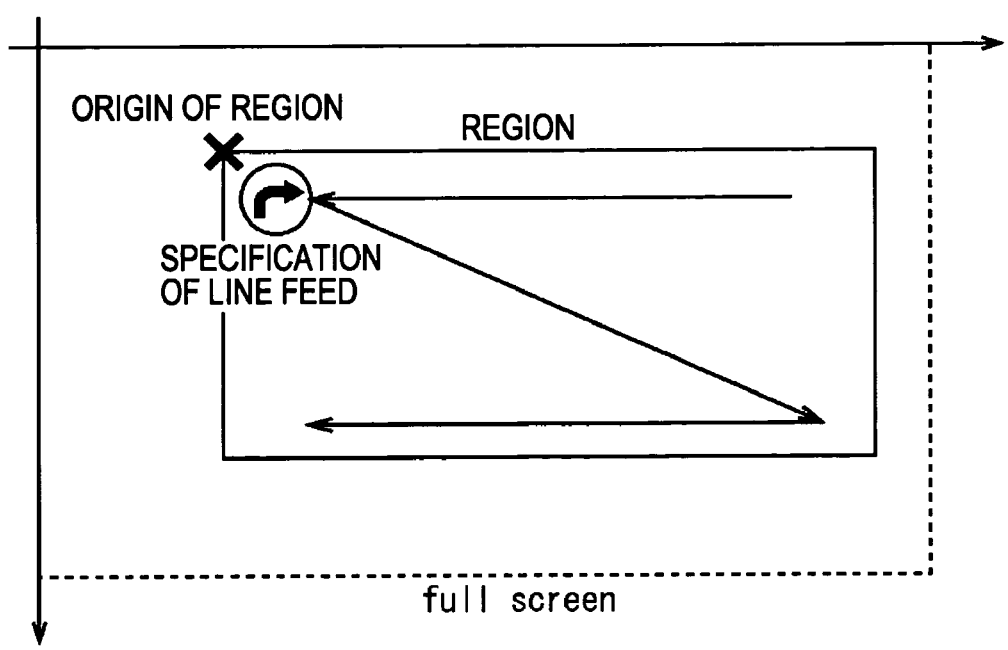
FIG. 30 is an illustration of a rendering direction.
Figure 31:
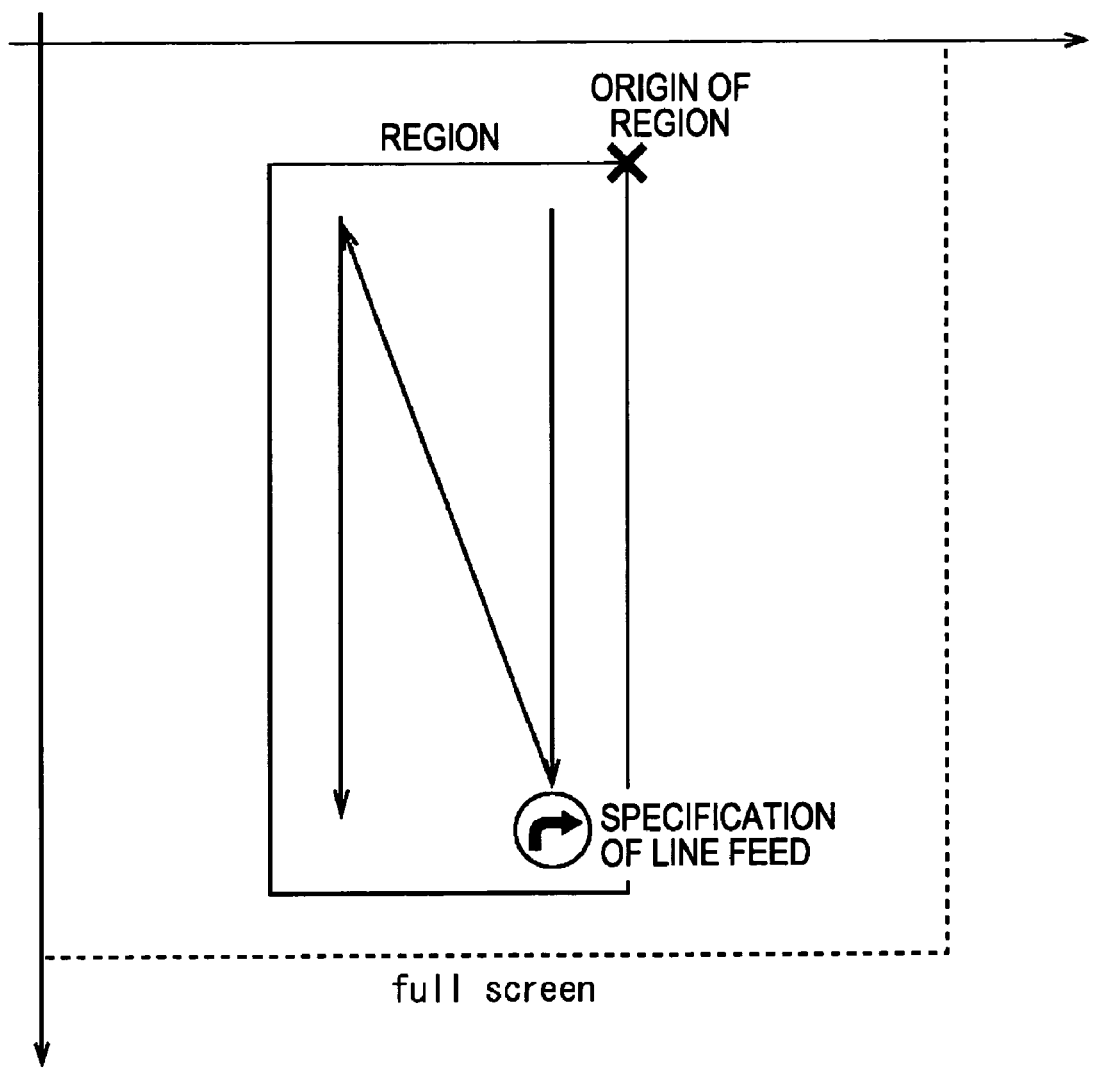
FIG. 31 is an illustration of a rendering direction.

On the basis of settings of the attributes, for example, the text data of the text subtitle file whose attributes are specified in the above manner is displayed as shown in FIG. 29, so that the rendering direction is specified from left to right and downward line feeding is performed at a set line feed position. As shown in FIG. 30, the text data is displayed so that the rendering direction is specified from right to left and downward line feeding is performed at a set line feed position, and is displayed as shown in FIG. 31 so that the rendering direction is specified from up to down and left-direction line feeding is performed at a set line feed position.

In addition, for example, when fade-in or fade-out is specified for displayed subtitles, by changing a T value in the subtitle graphics plane processor, which is described by using FIG. 33, character object sequence repetition may be specified while changing the character transparency.

Figure 32:
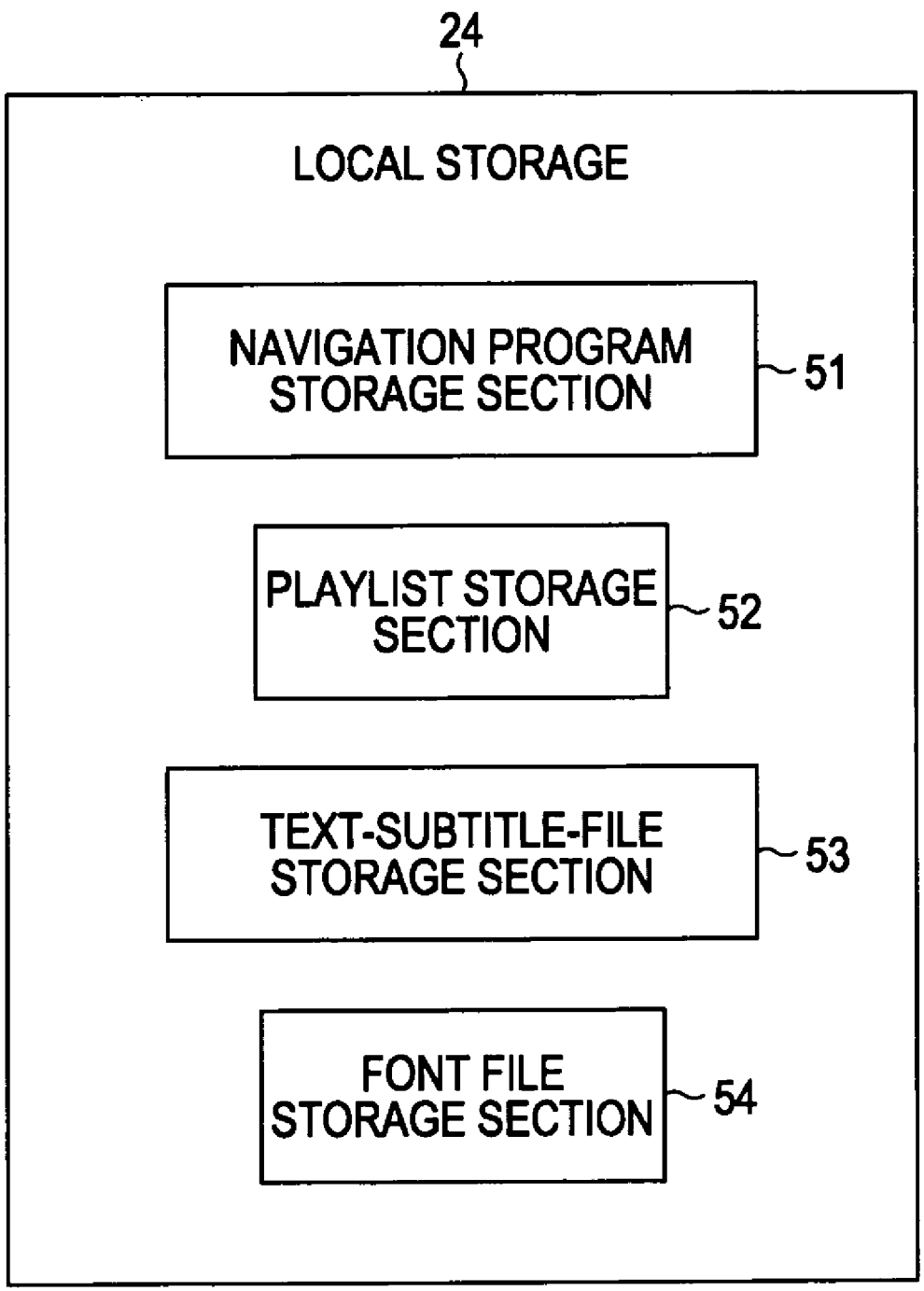
FIG. 32 is a block diagram showing virtual storage areas of the local storage in FIG. 1.

Next, FIG. 32 is a block diagram showing virtual storage areas of the local storage 24.

As shown in FIG. 4, the local storage 24 stores downloaded or copied information of various types in the file format described by using FIG. 7. In order to store these files, the local storage 24 can include, as virtual storage areas, a navigation program storage section 51 that is an area for storing the downloaded navigation program, a playlist storage section 52 that is an area for storing the downloaded play list, a text-subtitle-file storage section 53 that is an area for storing the downloaded text subtitle file, and a font file storage section 54 that is an area for storing the downloaded font file. Data files stored in the navigation program storage section 51 and the playlist storage section 52 are read and supplied to the memory 23 under the control of the local storage directory managing section 34 described by using FIG. 6. Data files stored in the text-subtitle-file storage section 53 and the font file storage section 54 are read and supplied to the decoder 26 under the control of the local storage directory managing section 34 described by using FIG. 6.

Since the storage areas as the navigation program storage section 51, playlist storage section 52, text-subtitle-file storage section 53, and font file storage section 54 of the local storage 24 shown in FIG. 32 are virtual, obviously, the storage areas of the local storage 24 do not need to be physically divided depending on the type of stored information, as shown in FIG. 32.

The data read from the optical disc 11 or the local storage 24 under the control of the controller 21 is demodulated by a demodulation and ECC decoding unit, which is not shown, whereby the data is subject to error correction before being supplied to the decoder 26. FIG. 33 is a block diagram illustrating a detailed configuration of the decoder 26.

The decoder 26 includes a control section 81, a disc data acquiring section 82, a buffer 83, a PID (packet ID) filter 85, an audio decoder 86, an MPEG (Moving Picture Experts Group) video decoder 87, a video plane processor 88, a GUI (Graphic User Interface) data decoder 89, a GUI graphics plane processor 90, a storage data acquiring section 91, a text subtitle processor 92, a subtitle graphics plane processor 93, and a synthesizer 94.

The control section 81 controls processing of each portion of the decoder 26 under the control of the playback control section 37. The disc data acquiring section 82 acquires data supplied to the decoder 26 among the data read from the optical disc 11, supplies the multiplexed stream, such as the AV stream specified by the PlayItem described by using FIG. 9, to the buffer 83 as a read-buffer for the data specified by the PlayItem forming the main path, and supplies data (font file data may not be specified) of the text subtitle file or font file which is specified by the SubPlayItem to the buffer 84 as a read-buffer for the data specified by the SubPlayItem.

The stream data read from the buffer 83 is output to a PID filter 55 in a post stage with predetermined timing. The PID filter 85 outputs and sorts the input multiplexed stream in accordance with the PID into the audio decoder 86, MPEG video decoder 87, and GUI data decoder 89, which are elementary stream decoders in a subsequent stage. Specifically, the PID filter 55 supplies the audio stream to the audio decoder 86, supplies the video stream to the MPEG video decoder 87, and supplies user-interface-related image data to the GUI data decoder 89.

The audio decoder 86 decodes the audio stream and outputs data of the decoded audio stream. The MPEG video decoder 87 decodes the video stream and outputs the decoded video data to the video plane processor 88. On the basis of the decoded video data, the video plane processor 88 generates and outputs, to the synthesizer 94, a video plane corresponding to an image (image forming video as a moving picture) displayed on one page (or one frame).

The GUI data decoder 89 decodes the interactive graphics stream and supplies the decoded GUI data to the GUI graphics plane processor 90. The GUI graphics plane processor 90 generates and outputs, to the synthesizer 94, a graphics plane corresponding to a GUI displayed on one screen.

The storage data acquiring section 91 acquires the data (i.e., data of the text subtitle file or font file) supplied to the decoder 26 from the data read from the local storage 24, and supplies the acquired data to the text subtitle processor 92. Under the control of the control section 81, the text subtitle processor 92 decodes the text data supplied from the text subtitle processor 92 or read from the buffer 84, converts (rasterizes) the decoded data into raster data, such as bitmap form, on the basis of predetermined font data, and supplies the raster data to the subtitle graphics plane processor 93. Details of the text subtitle processor 92 are described below by using FIG. 34. The subtitle graphics plane processor 93 generates a subtitle graphics plane corresponding to one page (or one frame) on the basis of the decoded and rendered text data, and outputs the plane to the synthesizer 94.

The synthesizer 94 combines a video plane supplied from the video plane processor 88, a graphics plane, corresponding to the GUI, supplied from the GUI graphics plane processor 90, and a subtitle graphics plane supplied from the subtitle graphics plane processor 93 into a video signal, and outputs the video signal.

Figure 34:
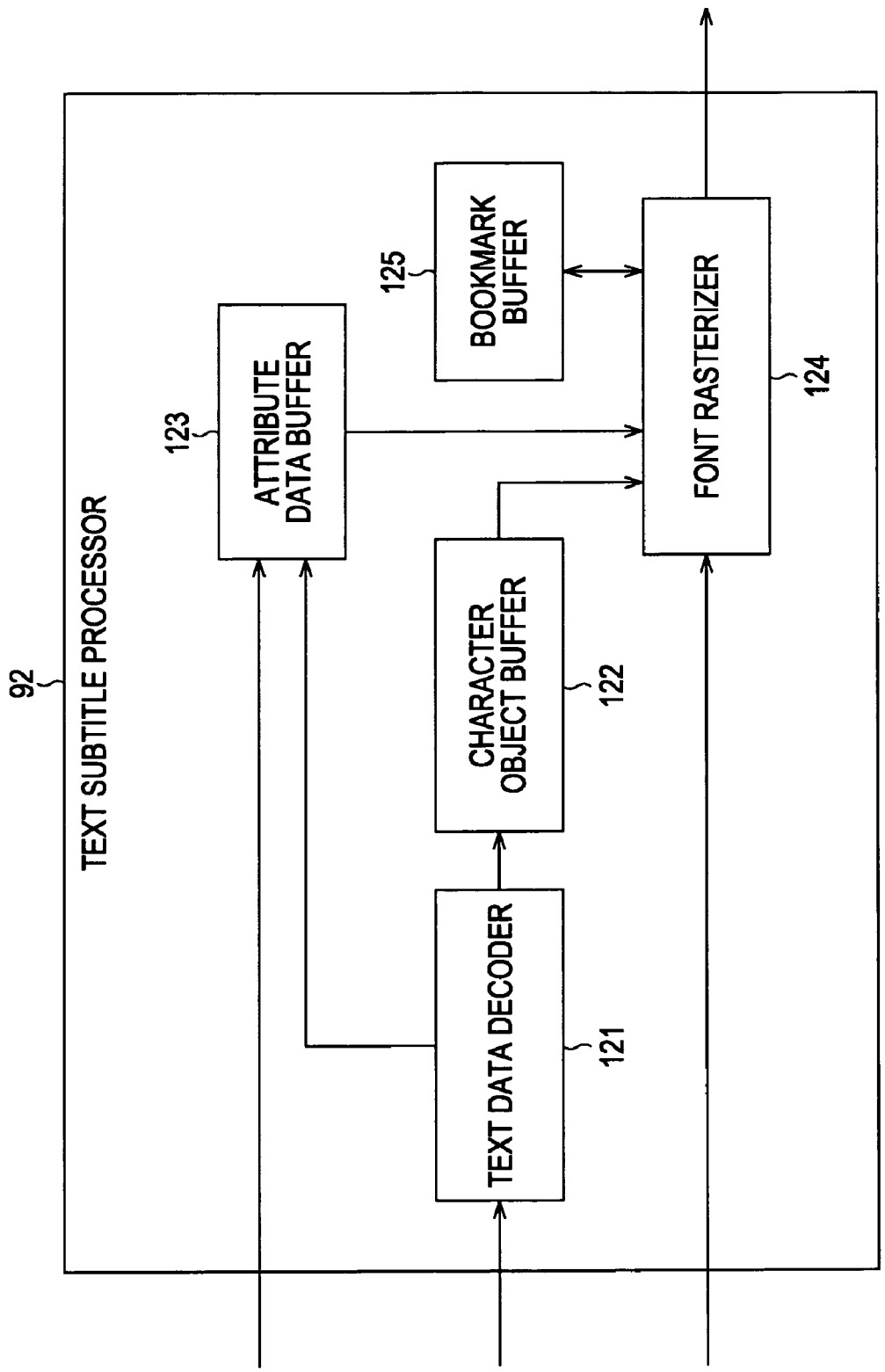
FIG. 34 is a block diagram illustrating a detailed configuration of the text subtitle processor in FIG. 33.

FIG. 34 is a block diagram illustrating a detailed configuration of the text subtitle processor 92.

After decoding the text subtitle file data, the text data decoder 121 supplies a character object to a character object buffer 122 and supplies an attribute to the attribute data buffer 123.

The attribute data stored in the attribute data buffer 123 is changed under the control of the control section 81 on the basis of a user's operation input. For example, when the user directs changing a font size or character color, under the control of the control section 81, in the attribute data stored in the attribute data buffer 123, corresponding code is rewritten.

On the basis of the attribute specification read from the attribute data buffer 123, the font data supplied from the buffer 84 or the storage data acquiring section 91, or the internal font data stored beforehand in the playback apparatus 1, the font rasterizer 124 converts the character object read from the character object buffer 122 into raster data such as bitmap form, and outputs the data to the subtitle graphics plane processor 93. For example, the font rasterizer 124 expands a scalable font in bitmap form on the basis of the attribute specification, converts (rasterizes) the font into raster data, and outputs the raster data.

The font rasterizer 124 further detects bookmarked character objects on the attribute read from the attribute data buffer 123, and uses the bookmark buffer 125 to prevent character objects bearing the same bookmark ID from being repeatedly rasterized.

Processing by the font rasterizer 124 allows the bookmark buffer 125 to store bookmarked character object raster data, and the raster data is read by the font rasterizer 124.

Figure 35:
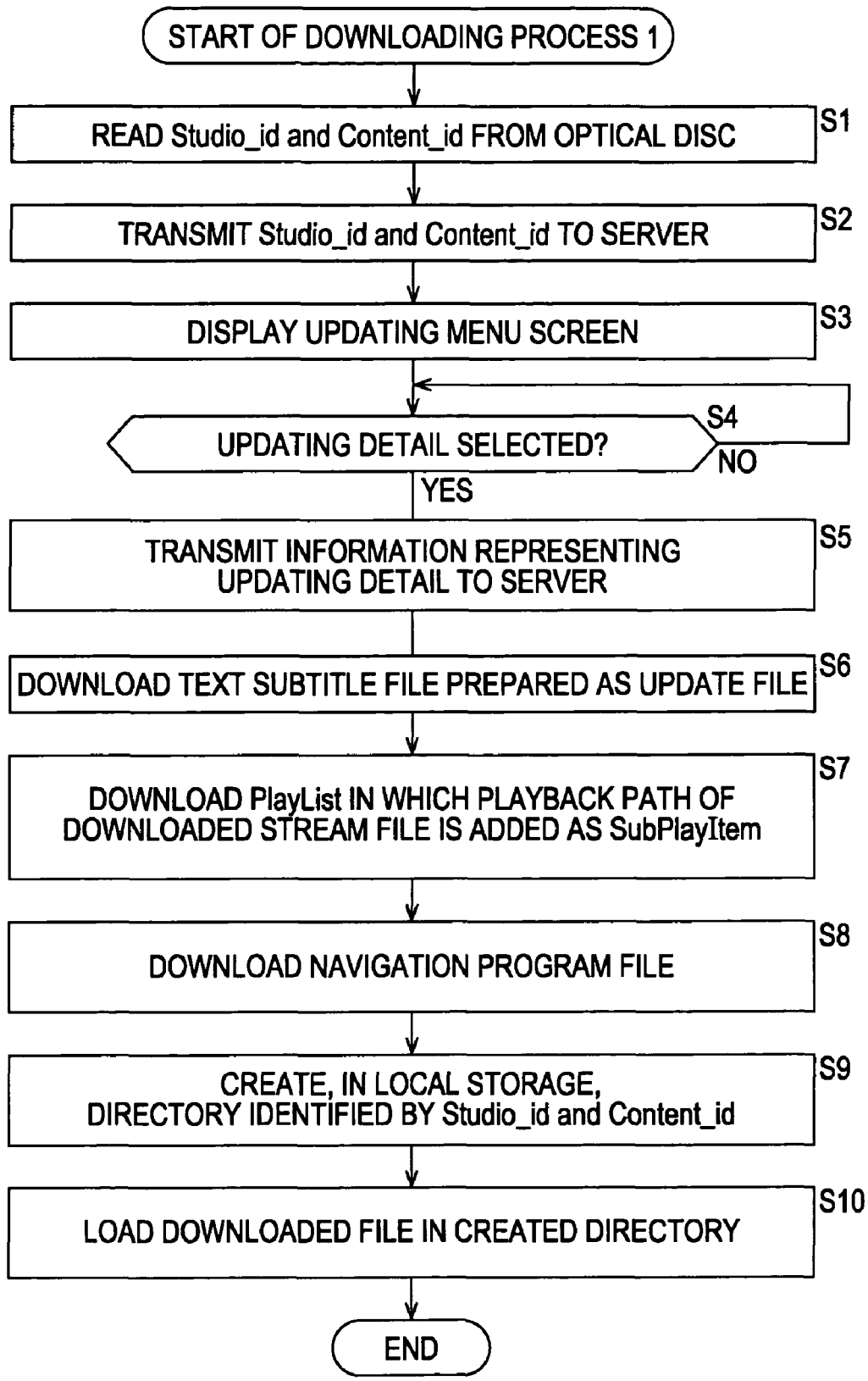
FIG. 35 is a flowchart illustrating downloading process 1.

Next, download process 1 that is a process of the controller 21 in the playback apparatus 1 for downloading the update file from the server 3 is described with reference to the flowchart in FIG. 35.

This process is executed when, after the optical disc 11 is loaded into the playback apparatus 1, for example, a menu screen is used to direct downloading an Arabic text subtitle file corresponding to movie content which has English subtitles and which is recorded on the optical disc 11.

In step S1, the optical disc directory managing section 35 of the controller 21 controls the optical disc drive 22 to read the Studio_id and Content_id recorded on the optical disc 11. As described with reference to FIG. 7, the Studio_id and Content_id are written in an info.bdmv file. The optical disc directory managing section 35 outputs the Studio_id and Content_id read from the optical disc 11 to the data acquiring section 33 and the local storage directory managing section 34.

In step S2, the data acquiring section 33 controls the local storage 24 to transmit the Studio_id and Content_id supplied from the optical disc directory managing section 35 to the server 3 through the network 2. After receiving the transmitted Studio_id and Content_id, the server 3 identifies content of the optical disc 11 in a state loaded into the playback apparatus 1. At this time, for example, a list of updatable files is reported from the server 3 to the playback apparatus 1. The data acquiring section 33 acquires and supplies, to the menu-screen-display control section 31, the list of updatable files transmitted from the server 3 and received by the local storage 24.

In step S3, the menu-screen-display control section 31 displays an updating menu screen on the display apparatus. Proceeding to step S4, on the basis of a signal supplied from the operation input acquiring section 32, the menu-screen-display control section 31 determines whether or not an updating detail has been selected by a user's operation on a button on the menu screen.

In step S4, the menu-screen-display control section 31 is on standby until it has determined that the updating detail has been selected, and, when it has determined that the updating detail has been selected, it proceeds to step S5. Information representing the updating detail selected by the user is output from the menu-screen-display control section 31 to the data acquiring section 33.

In step S5, the data acquiring section 33 controls the local storage 24 to transmit information representing the updating detail to the server 3, and requests downloading of an update file designated by the user.

In step S6, the data acquiring section 33 controls the local storage 24 to download a text subtitle file prepared as an update file by the server 3, and reports, to the local storage directory managing section 34, that the text subtitle file has been downloaded.

In step S7, the data acquiring section 33 controls the local storage 24 to download a PlayList a SubPlayItem representing a playback path of the text subtitle file downloaded in step S6 is added to main PlayItems, and reports, to the local storage directory managing section 34, that the PlayList has been downloaded. On the basis of the SubPlayItem of the thus downloaded PlayList, for example, a text subtitle file for displaying Arabic subtitles is referred to.

In step S8, the data acquiring section 33 controls the local storage 24 to download a file of the updated navigation program, and reports, to the local storage directory managing section 34, that the navigation program has been downloaded.

In step S9, on the basis of the Studio_id and Content_id supplied from the optical disc directory managing section 35, the local storage directory managing section 34 creates a directory identified by the IDs in the local storage 24. Accordingly, as shown in, for example, FIG. 7, in the local storage 24, a folder (directory) bearing the name "xxx-yyy" is created as a directory corresponding to the optical disc 11, which has "xxx" as a Studio_id and "yyy" as a Content_id.

In step S10, the local storage directory managing section 34 loads and stores each file downloaded from the server 3 in the directory created in step S9.

In this process, the update file is downloaded from the server 3. Thus, for example, the user, who purchases the optical disc 11 having content, such as a movie, recorded thereon, can acquire a file necessary for displaying subtitles in a language that is not recorded on the optical disc 11 beforehand. Therefore, the user can view and listen to content in a state with subtitles displayed in a desired language.

The downloaded update file is continuously stored in the local storage 24. when the same optical disc 11 is loaded again, the stored text subtitle file is used to play back the AV stream file. For example, in a case in which a text subtitle file necessary for displaying Arabic subtitles has already been downloaded, when the user plays back the movie content on the optical disc 11 next time, the Arabic subtitles can be displayed without allowing the playback apparatus 1 to perform processing again such as downloading.

In addition, the update file downloading as described above may be performed for a fee and without a fee.

Furthermore, when the user directs, on the menu screen, text subtitle file downloading necessary for displaying subtitles in a plurality of languages, text subtitle files necessary for displaying the subtitles in the languages are not separately provided but may be combined into a text subtitle file by the server 3. The combined text subtitle file may be provided. In this case, storage locations of text subtitle files in languages are specified on the PlayList.

Playback process 1 of the controller 21 is described with reference to the flowchart in FIG. 36.

When playback of content recorded on the optical disc 11 is directed in a state in which the update file downloaded in the above manner is recorded in the local storage 24, in step S31, the optical disc directory managing section 35 reads the Studio_id and the Content_id from the optical disc 11 and outputs the Studio_id and the Content_id to the local storage directory managing section 34.

In step S32, on the basis of the Studio_id and Content_id supplied from the optical disc directory managing section 35, the local storage directory managing section 34 searches for a file system of the local storage 24 which corresponds to the file system of the optical disc 11 and supplies the file system to the file system merging section 36. As described above, the file system corresponding to the file system of the optical disc 11 is stored in a directory bearing a name including a Studio_id and a Content_id in the local storage 24 (FIG. 7).

In this case, the optical disc directory managing section 35 outputs the file system of the optical disc 11 to the file system merging section 36.

In step S33, the file system merging section 36 generates a first virtual file system by merging the file system of the optical disc 11 and the file system of the local storage 24, as described with reference to FIGS. 7 and 8. The generated first virtual file system is output to the playback control section 37 and is used for playback.

In step S34, the playback control section 37 specifies and executes a navigation program from the supplied first virtual file system. Accordingly, as shown in FIG. 8, when an updated navigation program lies in the first virtual file system, the navigation program (the navigation program recorded in the local storage 24) is executed.

In step S35, the playback control section 37 acquires a PlayList and SubPlayItem specified as a playback interval by the navigation program. Proceeding to step S36, the playback control section 37 controls the local storage directory managing section 34 and the optical disc directory managing section 35 to read files (an AV file, a text subtitle file, a font file, etc.) which are referred to by the acquired PlayList and SubPlayItem, and supplies the read files to the decoder 26. Here, time stamps represented by the PlayList and SubPlayItem are converted into addresses on the basis of Clip Information, and the AV stream, etc., are accessed.

In other words, when the local storage 24 includes an AV stream file which is referred to by the PlayItem and the SubPlayItem, the AV stream file is read from the local storage 24. When the local storage 24 does not include the AV stream file, an AV stream file is read from the optical disc 11.

For example, when the playback control section 37 controls the local storage directory managing section 34 and the optical disc directory managing section 35 in accordance with the file system in FIG. 8 to read AV stream files, an AV stream file bearing the file name "01000.m2ts", and an AV stream file bearing the file name "02000.m2ts", both prepared on the optical disc 11, are read from the optical disc 11, an AV stream file, added by downloading, bearing the name "04000.m2ts" is read from the local storage 24.

Figure 37:
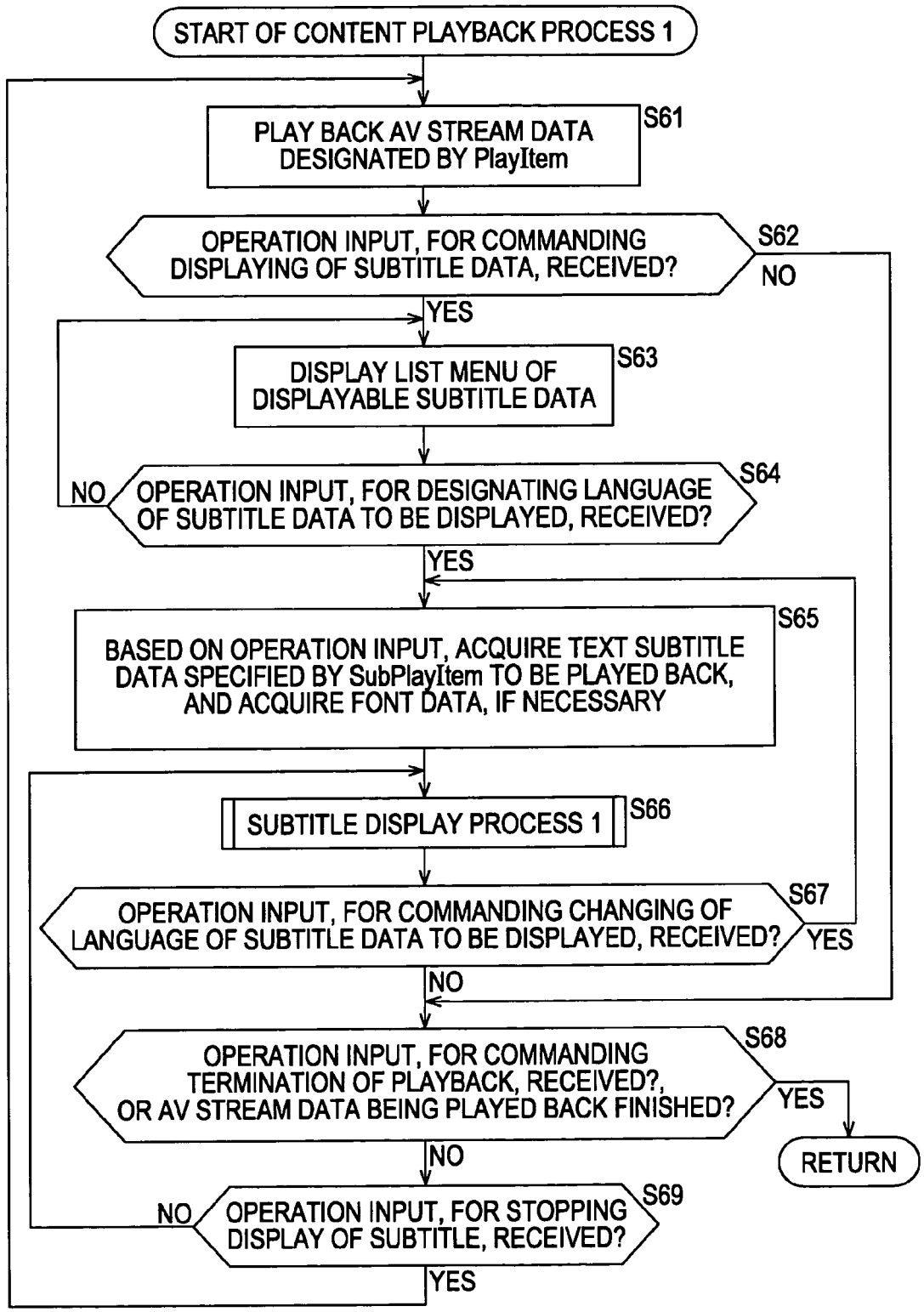
FIG. 37 is a flowchart illustrating content playback process 1.

In step S37, content playback process 1 described later by using FIG. 37 is executed, whereby, after the read AV stream files and text subtitle stream file, etc., are decoded, video and audio, or subtitles are output from the display apparatus before the process ends.

As described above, a first virtual file system is generated and is used in content playback, whereby, for example, text subtitle file data to be referred to by the SubPlayItem is played back after being read simultaneously with an AV stream.

Figure 36:
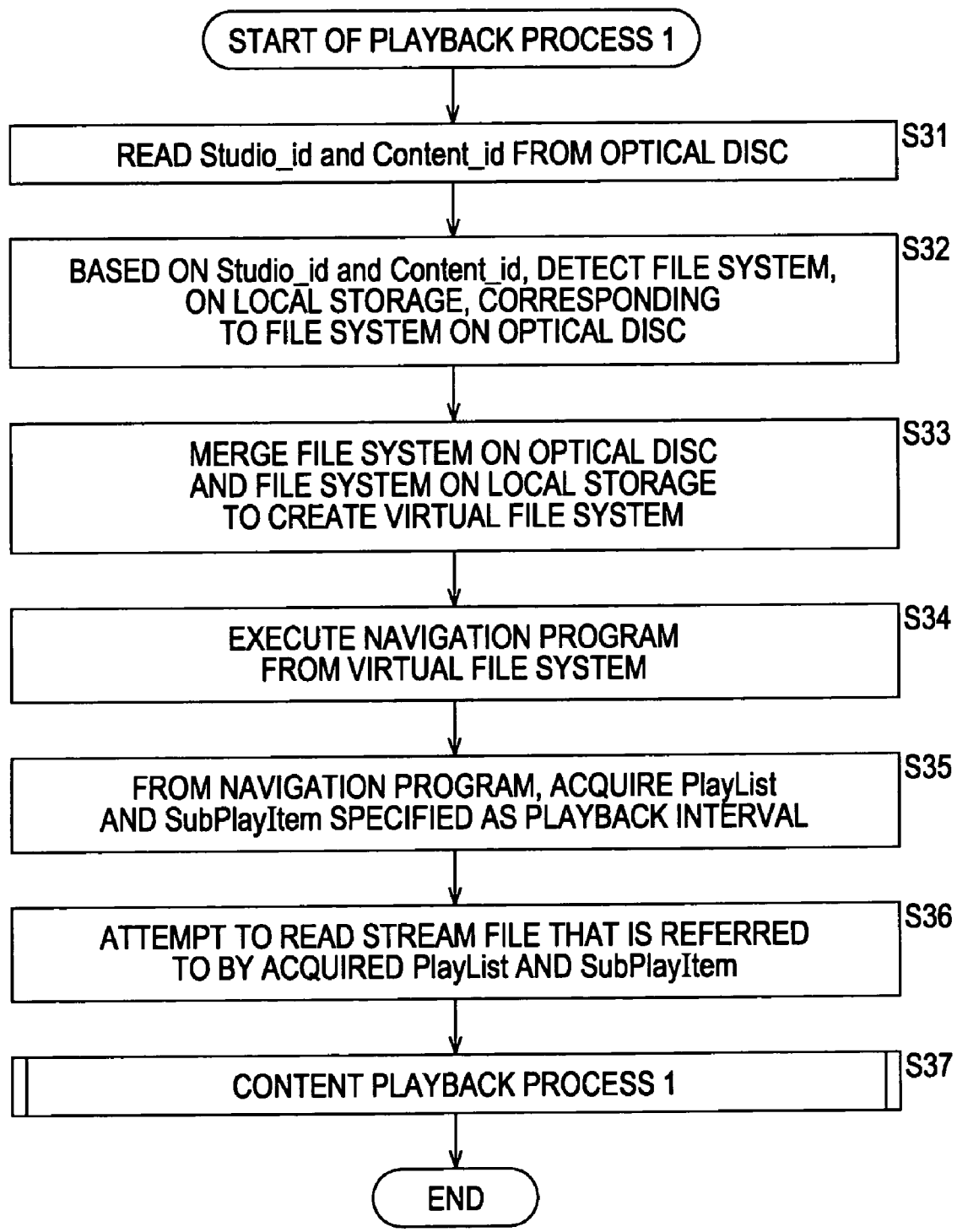
FIG. 36 is a flowchart illustrating playback process 1.

Next, content playback process 1 that is executed in step S37 in FIG. 36 is described with reference to the flowchart in FIG. 37.

In step S61, the playback control section 37 controls the decoder 26 to play back AV stream data specified by the PlayItem.

In step S62, the operation input acquiring section 32 determines whether or not an operation input for directing displaying of subtitle data has been received. If, in step S62, it is determined that the operation input for directing display of subtitle data has not been received, the process proceeds to step S68, which is described later.

If, in step S62, it is determined that the operation input for directing displaying of subtitle data has been received, in step S63, the operation input acquiring section 32 supplies the menu-screen-display control section 31 with a signal corresponding to the operation input from the user. The menu-screen-display control section 31 controls the display apparatus to display a menu of a displayable subtitle data list.

If, in step S64, the operation input acquiring section 32 determines whether or not an operation input for specifying a language for subtitle data to be displayed has been received. If, in step S64, it is determined that the operation input for specifying the language for subtitle data to be displayed has not been received, the process returns to step S63 and the subsequent steps are repeatedly performed.

If, in step S64, it is determined that the operation input for specifying the language for subtitle data to be displayed has been received, in step S65, the operation input acquiring section 32 supplies the playback control section 37 with a signal corresponding to the operation input from the user. The playback control section 37 controls the local storage directory managing section 34 to perform reading text data to be referred to by a SubPlayItem specified on the basis of the operation input from the user, supplying the text data to the text subtitle processor 92 of the decoder 26, and, in addition, reading font data corresponding to a font specified by the user and supplying the data to the storage data acquiring section 91 of the decoder 26, if necessary.

In step S66, the decoder 26 executes subtitle display process 1, which is described later by using FIGS. 38 and 39.

In step S67, the operation input acquiring section 32 determines whether or not an operation input for directing change of the language for subtitle data to be displayed has been received. If, in step S67, it is determined that the operation input for directing change of the language for subtitle data to be displayed has been received, the process returns to step S65 and the subsequent steps are repeatedly performed.

If, in step S62, it is determined that the operation input for directing change of the language for subtitle data to be displayed has not been received, or if, in step S67, it is determined that the operation input for directing change of the language for subtitle data to be displayed has not been received, in step S68, the operation input acquiring section 32 determines whether or not an operation input for directing termination of content playback has been received, or whether AV stream data being played back has finished.

If, in step S68, it is determined that the operation input for directing termination of content playback has not been received, and the AV stream data being played back has not finished, in step S69, the operation input acquiring section 32 determines whether or not an operation input for stopping display of subtitles has been received.

If, in step S69, it is determined that the operation input for stopping display of the subtitles has not been received, the process returns to step S66 and the subsequent steps are repeatedly performed. If, in step S69, it is determined that the operation input for stopping display of the subtitles not been received, the process returns to step S61 and the subsequent steps are repeatedly performed.

If, in step S68, it is determined that the operation input for directing the termination of the content playback has been received, or the AV stream being played back finishes, the process ends.

In the above process, by using a text subtitle file that is recorded on the optical disc 11 beforehand or stored in the local storage 24 after being downloaded from the server 3, subtitles in a language desired by the user are displayed with video and audio of content, and, on the basis of an operation input from the user, the text subtitle file, which is to be read, is changed in order to change the language for the displayed subtitles.

Next, subtitle display process 1 that is executed in step S66 in FIG. 37 is described with reference to the flowcharts in FIGS. 38 and 39.

In step S91, the text data decoder 121 of the text subtitle processor 92 in the decoder 26 decodes the text subtitle data acquired by the storage data acquiring section 91.

In step S92, since the text data decoder 121 of the text subtitle processor 92 supplies the character object included in the decode text subtitle data to the character object buffer 122 of the text subtitle processor 92, the character object is buffered in the character object buffer 122.

In step S93, since the text data decoder 121 supplies the attribute data included in the decoded text subtitle data to the attribute data buffer 123, the attribute data is buffered in the attribute data buffer 123.

In step S94, the control section 81 determines whether or not an input signal representing an operation input for directing change of a subtitle attribute, for example, a font size or the like, has been received from the playback control section 37 (the controller 21).

If, in step S94, it is determined that the input signal representing the operation input for directing the change of the subtitle attribute has been received, in step S95, the control section 81 changes the attribute data stored in the attribute data buffer 123.

If, in step S94, it is determined that the input signal representing the operation input for directing the change of the subtitle attribute has not been received, or after processing in step S95 finishes, in step S96, the font rasterizer 124 of the text subtitle processor 92 acquires a character object and attribute data from the character object buffer 122 and the attribute data buffer 123.

In step S97, the control section 81 determines whether or not an input signal representing an operation input for directing change of a font type has been received from the playback control section 37 (the controller 21).

If, in step S97, it is determined that the input signal representing the operation input for directing the change of the font type has been received, different font data items are read from the local storage 24 on the basis of the operation input in processing by the local storage directory managing section 34 (the controller 21), which is controlled by the playback control section 37. Thus, in step S98, the font rasterizer 124 of the text subtitle processor 92 acquires different font data items based on the operation input.

If, in step S97, it is determined that the input signal representing the operation input for directing the change of the font type has not been received, or after processing in step S98 finishes, in step S99, by referring to the attribute acquired in step S96 and the bookmark buffer 125, the font rasterizer 124 determines whether or not subtitle data to be rasterized has already been bookmarked and buffered in the bookmark buffer 125.

If, in step S99, it is determined that the subtitle data to be rasterized has been bookmarked and buffered, in step S100, stored subtitle image data (raster data) to be bookmarked is read from the bookmark buffer 125 and is output by the font rasterizer 124, and the process proceeds to step S104.

If, in step S99, it is determined that the subtitle data has not already been bookmarked, in step S101, the font rasterizer 124 executes rasterization and outputs the rasterized data to the subtitle graphics plane processor 93 on the basis of the acquired character object and attribute data. The synthesizer 94 generates a subtitle graphics plane on the basis of the supplied raster data and supplies the generated data to the synthesizer 94.

In step S102, on the basis of attribute data of the rasterized subtitle data in step S101, the font rasterizer 124 determines whether or not the attribute data bears a new bookmark.

If, in step S102, it is determined that the attribute data bears the bookmark, in step S103, the font rasterizer 124 stores the rasterized subtitle data in the bookmark buffer 125.

In a case in which, after processing in step S100 finishes, in step S102, it is determined that the attribute data bears the bookmark, or after processing in step S103 finishes, in step S104, the synthesizer 94 combines the subtitle image data with the video data and outputs the combined data. The process proceeds to step S67 in FIG. 37.

In the above processing, reading of the text subtitle file and the font file is controlled so that subtitle data in a language desired by the user can be displayed in a font desired by the user with an attribute desired by the user, whereby the buffered attribute data is changed, if necessary, and is rasterized.

Moreover, in a playback apparatus to which the present invention is applied, in addition to the above case, the following method can play back content recorded on an optical disc and content recorded in a local storage in a form in which both are associated with each other. A second embodiment for playing back content recorded on an optical disc and content recorded in a local storage in a form in which both are associated with each other is described below.

Figure 40:
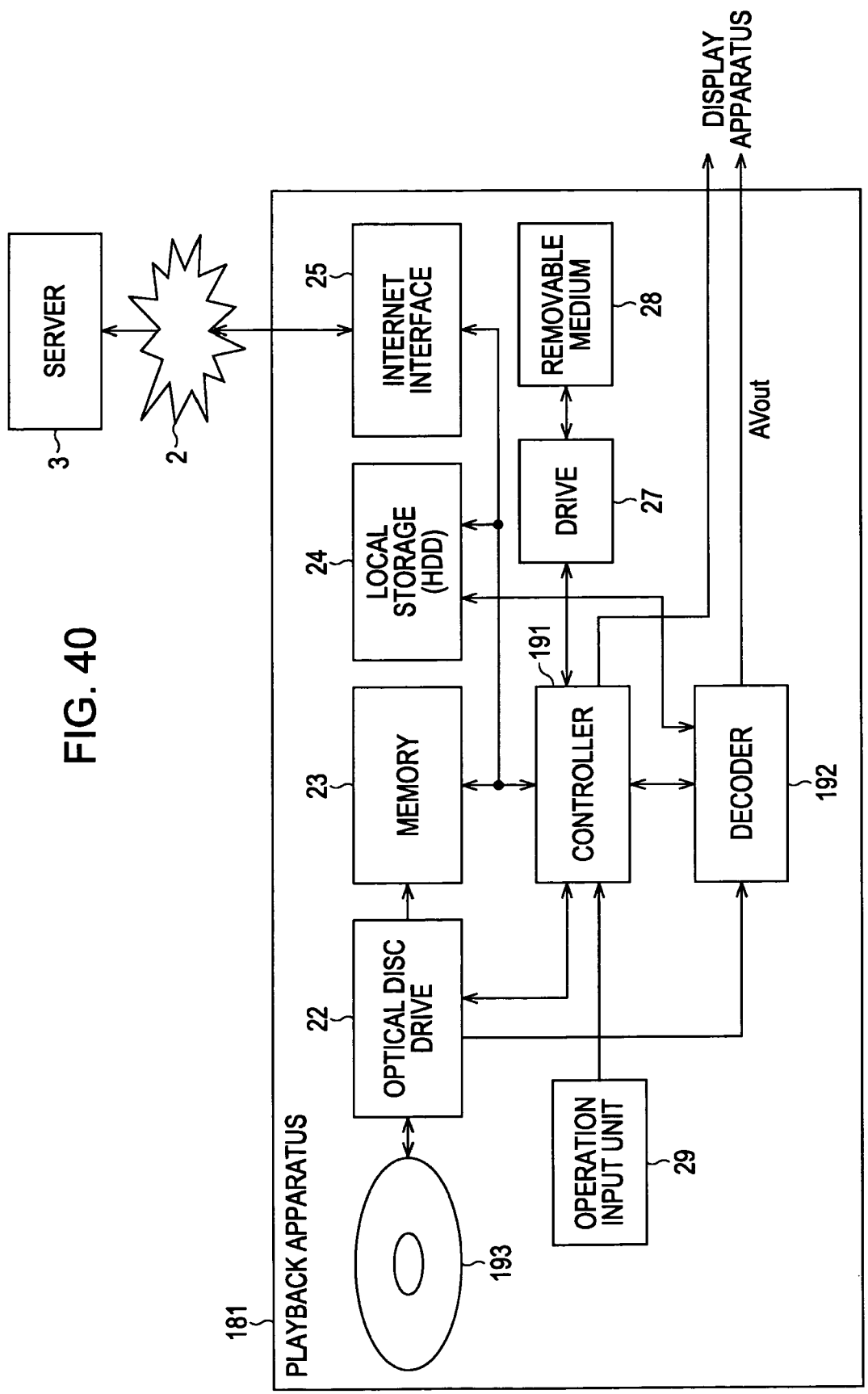
FIG. 40 is a block diagram showing the configuration of a playback apparatus according to a second embodiment to which the present invention is applied.

FIG. 40 is a block diagram showing an example of the configuration of a playback apparatus 181 according to the second embodiment, to which the present invention is applied.

In the playback apparatus 181 in FIG. 40, portions corresponding to those in the case of the playback apparatus 1 described by using FIG. 1 are denoted by identical reference numerals, and their descriptions are omitted, if necessary. In other words, the playback apparatus 181 in FIG. 40 is basically similar in configuration to the playback apparatus 1 described by using FIG. 1 except that a controller 191 is provided instead of the controller 21 and a decoder 192 is provided instead of the decoder 26. The playback apparatus 181 also reads data recorded on an optical disc having a file structure, which is described later by using FIG. 42, and decodes an AV stream or text data for playback.

The controller 191 controls the entire operation of the playback apparatus 181 by executing a prepared control program, or controls an operation of played back data stored in the optical disc 11 and the local storage 24 by controlling the optical disc drive 22 to read a MovieObject (whose details are described later) which is recorded on an optical disc 193 and which includes a plurality of commands and executing the commands after loading the commands in the memory 23.

For example, when the optical disc 193 is loaded, the controller 191 can display a predetermined menu screen on an external display apparatus.

Under the control of the controller 191, the decoder 192 decodes an AV stream or text data supplied from the optical disc drive 22 or the local storage 24, and outputs obtained video and audio signals to the external display apparatus. ON the basis of a signal decoded by the decoder 192, the display apparatus performs, for example, output (video display and audio output) of content recorded on the optical disc 193.

Figure 41:
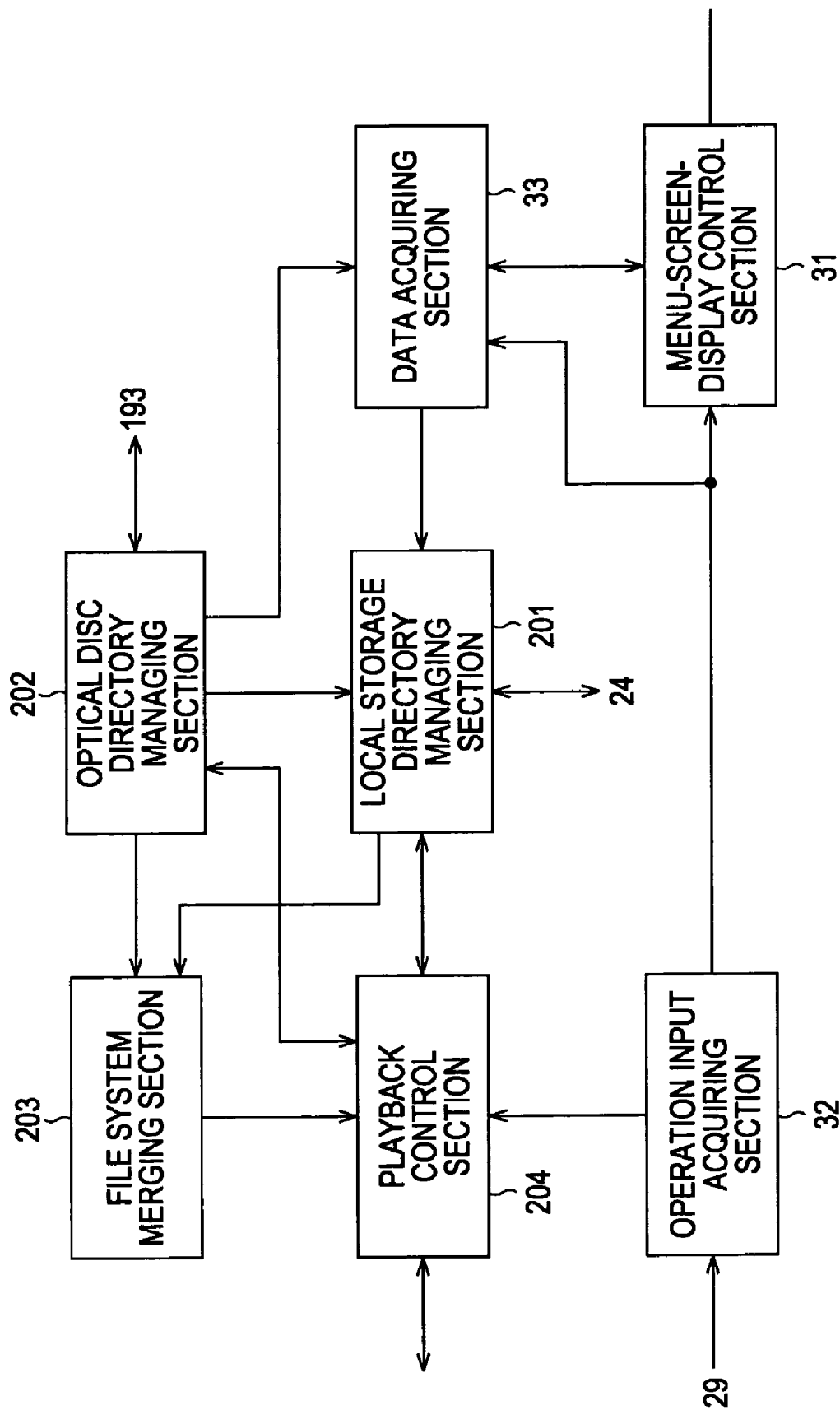
FIG. 41 is a functional block diagram illustrating functions of the controller in FIG. 40.

FIG. 41 is a block diagram showing an example of the configuration of the controller 191 in FIG. 40.

Each function in FIG. 41 is realized such that the prepared control program is executed by the controller 191, or the commands included the MovieObject recorded on the optical disc 193 are executed by the controller 191.

In the functional configuration block diagram shown in FIG. 41, portions corresponding to those in the case described by using FIG. 6 are denoted by identical reference numerals and their descriptions are omitted, if necessary. In other words, a functional configuration of the controller 191 shown in FIG. 41 id basically identical to that of the controller 21 described by using FIG. 6 except that a local storage directory managing section 201 is provided instead of the local storage directory managing section 34, an optical disc directory managing section 202 is provided instead of the optical disc directory managing section 35, a file system merging section 203 is provided instead of the file system merging section 36, and a playback control section 204 is provided instead of the playback control section 37.

The optical disc directory managing section 202 manages a directory of the local storage 24 and controls data writing to the local storage 24 and data reading form the local storage 24. For example, under the control of the local storage directory managing section 201, a PlayList read from the local storage 24 is output to the memory 23, and AV-stream audio data and video data and text data of a text subtitle file which are read from the local storage 24 are output to the decoder 192. In addition, as is described later, when a second virtual file system, which is described later, is generated such that a file system merging section 203 merges a file system of the decoder 192 and a file system of the local storage 24, the local storage directory managing section 201 outputs information the file system of the local storage 24 to the file system merging section 203.

In addition, when an update file specified by the user is downloaded and acquired from the server 3 by the data acquiring section 33 and the acquired update file corresponds to an already existing PlayList, the local storage directory managing section 201 executes a procedure for updating data already recorded in the local storage 24 by referring to the acquired update file.

The optical disc directory managing section 202 manages the directory of the optical disc 193 and controls reading of each data item from the optical disc 193. On the optical disc 193, an author_id (or the Studio_id in the first embodiment) and author_id (or the Content_id in the first embodiment) that are secure identification information whose rewriting cannot be performed are written as electronic data or in the form of physical pits. Under the control of the optical disc directory managing section 202, an author_id and author_id read from the optical disc 193 are output to the local storage directory managing section 201. In addition, under the control of the optical disc directory managing section 202, a PlayList read from the optical disc 193 is output to the memory 23, and AV-stream audio data and video data and text data of the text subtitle file read from the optical disc 193 are output to the decoder 192. The optical disc directory managing section 202 also outputs information concerning the file system of the optical disc 193 to the file system merging section 203 when the second virtual file system, which is described later, is generated such that the file system merging section 203 merges the file system of the optical disc 193 and the file system of the local storage 24.

The file system merging section 203 generates one virtual file system by merging the file system of the optical disc 193 which is supplied from the optical disc directory managing section 202 and the file system of the local storage 24 which is supplied from the local storage directory managing section 201. The file system merging section 203 outputs, to the playback control section 204, the virtual file system generated by merging two file systems. In the second embodiment, the virtual file system generated by the file system merging section 203 is hereinafter referred to as the second virtual file system.

The playback control section 204 controls content playback by executing a command included in the MovieObject specified by the second virtual file system which is supplied from the file system merging section 203. Specifically, by referring to the PlayList supplied and stored in the memory 23, the playback control section 204 controls the local storage directory managing section 201 or the optical disc directory managing section 202 to read AV-stream audio data and video data, and, the text data of the text subtitle file which are recorded on the optical disc 193 or in the local storage 24. The playback control section 204 also controls the decoder 192 in FIG. 40 to decode (play back) AV-stream audio data and video data, and, the text data of the text subtitle file which are recorded on the optical disc 193 or in the local storage 24.

Also in the second embodiment, an example of an application format of the optical disc 193, which is loaded into the playback apparatus 181 to which the present invention is applied, is basically similar to that in the case of the optical disc 11 described by using FIGS. 2 and 3. Accordingly, its description is omitted.

Also the second embodiment has an operation and advantage similar to those in the above-described first embodiment in that the playback apparatus 181 to which the present invention is applied can play back the content recorded on the optical disc 193 and the content recorded in the local storage 24 in a form in which both are associated with each other. Therefore, for example, when an AV stream of Clip1 which is recorded on the optical disc 193 and which is referred to by a PlayItem of the PlayList is used to display video of movie content and play back corresponding audio, and subtitle-related information 1 of Clip2 which is referred to by a Sub-PlayItem of the PlayList is a text subtitle file for displaying English subtitles in conjunction with displayed video, by downloading (using the removable medium 28 to acquire) a text subtitle file in a desired language which corresponds to the movie recorded on the optical disc 193 from the server 3 to the playback apparatus 181 through the network 2, the user can play back the content recorded on the optical disc 193 and the content recorded in the local storage 24 in a form in which both are associated with each other.

In other words, when the user directs downloading of an Arabic text subtitle file corresponding to a PlayList recorded beforehand on the optical disc 193, the playback apparatus 181 accesses the server 3 through the network 2, and a file prepared in the server 3 is downloaded as one regarded as updating the content recorded on the optical disc 193. The playback apparatus 181 can associate the content recorded on the optical disc 193 and the content recorded in the local storage 24 with each other, and can play back a Clip AV stream and a text subtitle stream in a synchronized manner.

Figure 42:
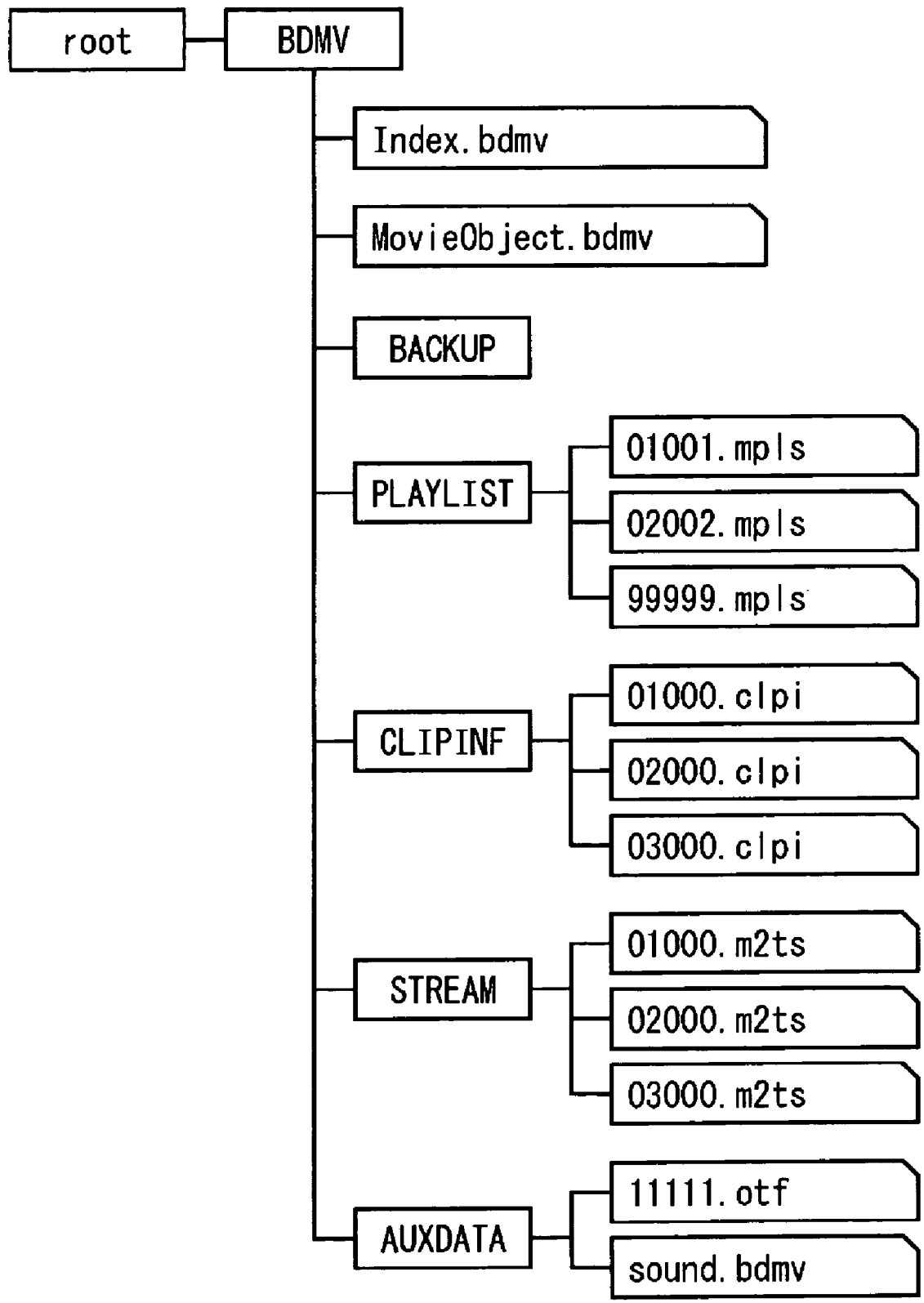
FIG. 42 is an illustration of an example of a file system of the optical disc in FIG. 40.

FIG. 42 is an illustration of an example of the file system of the optical disc 193. As shown in FIG. 42, the file system of the optical disc 193 has a directory structure.

Below a "root" of the optical disc 193, a directory bearing the name "BDMV" is provided and, in this directory, a file bearing the name "Index.bdmv" and a file bearing the name "MovieObject.bdmv" are stored. These files are hereinafter referred to as an Index file and a MovieObject file, respectively, if necessary. In addition, each file is referred to in a form in which the word "file" is added to a "file name", and each directory is referred to in a form in which the word "directory" is added to a "directory name", if necessary.

The Index file includes information concerning a menu for playing back the optical disc 193. On the basis of the Index file, the playback apparatus 181 displays, on the display apparatus, a playback menu screen including items such as playback of all the content on the optical disc 193, playback of only a particular chapter, repeated playback, and display of an initial menu. In the Index file, a MovieObject to be executed when each item is selected is set, and, when an item is selected on the playback menu screen by the user, the playback apparatus 181 executes commands of the MovieObject set in the file.

The MovieObject file includes a MovieObject. The MovieObject includes a command for controlling playback of a PlayList recorded on the optical disc 193. For example, by selectively executing one of MovieObjects recorded on the optical disc 193, the playback apparatus 181 can play back content recorded on the optical disc 193.

The BDMV directory also includes a directory (BACKUP directory) bearing the name "BACKUP", a directory (PLAYLIST directory) bearing the name "PLAYLIST", a directory (CLIPINF directory) bearing the name "CLIPINF", a directory (STREAM directory) bearing the name "STREAM", and a directory (AUXDATA directory) bearing the name "AUXDATA".

In the BACKUP directory, files and data for backing up files and data recorded on the optical disc 193 are recorded.

The PLAYLIST directory stores PlayList files. Each PlayList file is given a name in which the extension ".mpls" is added to a five-digit numeral file name, as shown in FIG. 42.

The CLIPINF directory stores Clip Information files. Each Clip Information file is given a name in which the extension ".clpi" is added to a five-digit numeral file name, as shown in FIG. 42.

The STREAM directory stores Clip AV stream files and substream files. Each stream file is given a name in which the extension ".m2ts" is added to a five-digit numeral file name, as shown in FIG. 42.

The AUXDATA directory includes files of data which is not included in the Clip AV stream files and the substream files, which is referred to by the Clip AV stream files and the substream files, and which is used independently from the Clip AV stream files and the substream files. In the example in FIG. 42, the AUXDATA directory stores a subtitle font file bearing the name "11111.otf" and an effect sound file bearing the name "sound.bdmv".

In addition, on the optical disc 193, the identifier author_id (or the Studio_id in the first embodiment) assigned to each title author for identifying a title author as a content maker of the optical disc 193 such as a production company or movie distributor, and the identifier disc_id (the Content_id in the first embodiment) assigned for the type of the optical disc 193, which is produced by the title author represented by the author_id are written as secure electronic data that cannot be rewritten by the user or the like or in the form of physical pits.

In addition, in the second embodiment of the present invention, new PlayList and Clip Information files defining a SubPath and a SubPlayItem which specify a text subtitle file storing subtitle data and a font file necessary for rendering are downloaded, whereby synchronization between the Clip AV stream and the text subtitles can be realized. As shown in FIG. 43, a set of archive files downloaded essentially includes a PlayList file, a Clip Information file, a text subtitle stream file, and a font file.

Next, an archive of data to be additionally distributed in the second embodiment of the present invention is shown in FIG. 44.

As shown in FIG. 44, new archive files to be distributed to the user have a meta-data-added structure for file addition and updating procedure in the playback apparatus 181.

An eight-bit compression_type field specifies a compression type of data in the field FileArchive( ). When zero is specified in the eight bits of the compression_type, the data in the FileArchive( ) is in non-compression form. An eight-bit encryption_type field specifies a scramble type (encryption type) of the data in the FileArchive( ). When zero is specified in the eight-bit encryption_type field, the data in the FileArchive( ) is in non-scramble form (plain form). Regarding the order of scramble and compression on the data in the FileArchive( ), compression is firstly performed and scrambling is performed thereafter.

An 8-by-5-bit PlayList_file_name field specifies a file name for the subsequent PlayList file. An encoding type for the file name complies with the ISO/IEC646 standard. A 32-bit PlayList_file_size field specifies the size, in units of bytes, of the subsequent PlayList file. Zero must not be specified in the PlayList_file_size field.

A PlayList_file stores the PlayList file as a byte sequence.

A 16-bit number_of_Files field specifies a total number of files. Zero must not be specified in the number_of_Files field. In addition the total number of files specified in the number_of_Files field must coincide with a total number of SubClip_entry fields defined in a SubPlayItem in the last PlayList_file.

The meta-data includes an author_id, a disc_id, a title_id, a version, an operation_type, a display_name, and a permission.

The author_id is an eight-bit field specifying an identifier for identifying a title author. The title_id is an eight-bit field specifying an identifier for identifying a title. The disc_id is an eight-bit field specifying an identifier for identifying a disc. The version is an eight-bit field specifying version information for history management of files in the archive.

The operation_type is an eight-bit field specifying an updating method for files in the archive. Specific examples of a value that can be specified in the operation_type and the file updating method are described later.

The display_name is an 8-by-128-bit field specifying a name displayed in a GUI correspondingly to this file. The controller 191 described by using FIG. 1 can display a predetermined menu screen on the external display apparatus. For example, when the predetermined menu screen is displayed on the external display apparatus in order for the user to perform a file selecting operation, it is difficult to select a desired file since the user cannot identify a file content when what is displayed on the menu screen is a file name defined in the archive. Accordingly, the display_name field has information which is used for display on the menu screen and which represents a name for the user to easily identify a file content. The data encoding type stored in the display_name field complies with the ISO/IEC 10646-1 standard.

The permission represents an attribute of a file including the meta-data, and is specifically an eight-bit field specifying permission information concerning whether, for the user, a corresponding file may have a visible attribute, or whether the file may have an invisible attribute. A value that can be specified in the permission field is described later.

A clip_information_file_name is a 8-by-5-bit field specifying a file name for the subsequent Clip Information file. An encoding type for the file name in the clip_information_file_name complies with the ISO/IEC646 standard.

A clip_information_file_size is a 32-bit field specifying the size, in units of bytes, of the subsequent Clip Information file. Zero must not be specified in the clip_information_file_size field.

A clip_information_file stores the Clip Information as a byte sequence.

A text_subtitle_file_name is an 8-by-5-bit field specifying a file name for the subsequent text subtitle stream file. An encoding type for the file name in the text_subtitle_file_name complies with the ISO/IEC646 standard.

A text_subtitle_file_size is a 32-bit field specifying the size, in units of bytes, of the subsequent text subtitle stream file. Zero must not be specified in the text_subtitle_file_size field.

A text_subtitle_file has the text subtitle stream file as a byte sequence. The syntax of the subtitle_file in which the text subtitle stream is stored is described later by using FIG. 54. The structure of a container file in which the text subtitle stream is stored is described later by using FIG. 58.

A font_file_name is an 8-by-5-bit field specifying a file name for the subsequent font file. An encoding type for the file name in the font_file_name complies with the ISO/IEC646 standard.

A font_file_size is a 32-bit field specifying the size, in units of bytes, of the subsequent font file. Zero must not be specified in the font_file_size field.

A font_file has the font file as a byte sequence.

Figure 45:
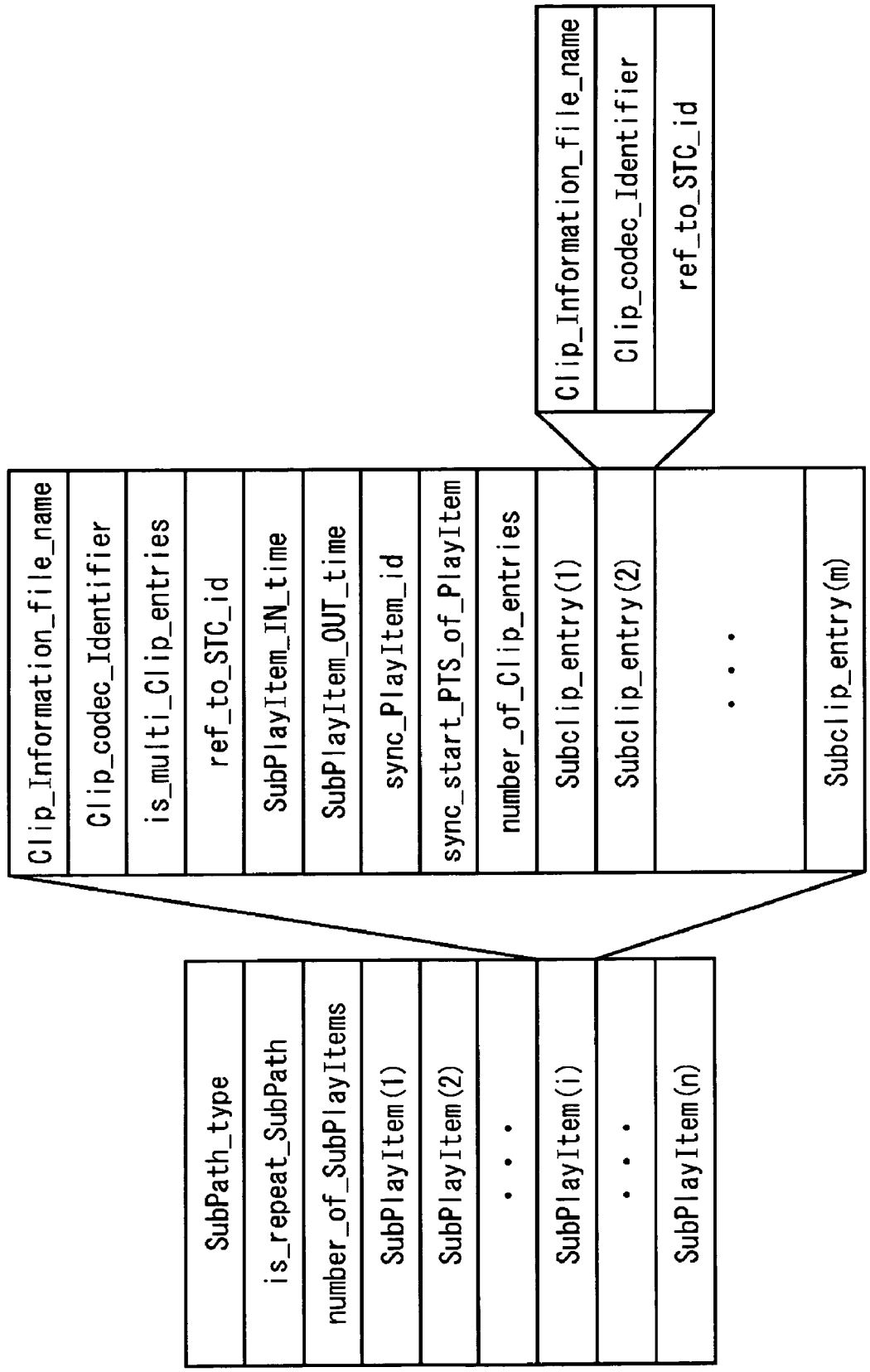
FIG. 45 is an illustration of the configuration of SubPath.

A PlayList included in the additionally distributed update file includes a MainPath and a SubPath. FIG. 45 is an illustration of a data structure of the SubPath. At first, a data structure of a highest layer of the SubPath shown on the left side of FIG. 45.

A SubPath_type represents an application type of the SubPath. The SubPath_type is used to represent a type such as indicating whether the SubPath is audio, bitmap subtitles, or text subtitles. An is_repeat_SubPath represents a playback method for the SubPath and indicates whether playback of the SubPath is repeatedly performed during playback of the MainPath, or whether playback of the SubPath is performed only once. A number_of_SubPlayItems represents the number of SubPlayItems (the number of entries) included in the SubPath. After that, SubPlayItems whose number is the number of SubPlayItems included in the SubPath are included.

Next, a data structure of the SubPlayItem shown in the center of FIG. 45 is described.

A Clip_Information_file_name represents a file name of a Clip Information file included in a sub-Clip that is referred to by a SubPlayItem. A Clip_codec_identifier represents a codec type of the sub-Clip that is referred to by the SubPlayItem. An is_multi_Clip_entries is a flag indicating whether this SubPlayItem refers to a plurality of sub-Clips. A ref_to_STC_id represents information concerning STC (System Time Clock) discontinuous points (system time-base discontinuous points).

A SubPlayItem_IN_time and a SubPlayItem_OUT_time represent a playback interval of a substream included in the sub-Clip that is referred to by the SubPlayItem. A sync_PlayItem_id and a sync_start_PTS_of_PlayItem are used to specify a time at which the SubPlayItem starts playback on a time base of the Main Path. Specifically, on a time base of a PlayItem having a PlayItem_id whose value is equal to the value of the sync_PlayItem_id, at a time specified by the sync_start_PTS_of_PlayItem, playback of the SubPlayItem is started.

A number_of_Clip_entries represents the number of sub-clips that are referred to by the SubPlayItem. After that, SubClip_entry fields whose number is the number represented by the number_of_Clip_entries are included.

Next, a data structure of the SubClip_entry shown on the right side of FIG. 45 is described.

A Clip_Information file name represents a file name of the Clip Information file included in the sub-Clip that is referred to by the SubPlayItem. A Clip_codec_identifier represents a codec type of the sub Clip that is referred to by the SubPlayItem. A ref_to_STC_id represents information concerning STC discontinuous points (system time base discontinuous points).

Next, a list of values that can be specified in the operation_type included in the meta-data in FIG. 44 is shown in FIG. 46.

As shown in FIG. 46, when the eight-bit operation_type field has 0x01, the in-archive file updating method is exchange of PlayLists. In other words, when an update file in which the eight-bit operation_type field has 0x01 is downloaded, in the second virtual file system generated by performing merging using this update file, PlayLists recorded in the local storage 24 after being downloaded, are referred to in an unchanged state, and PlayLists on the optical disc 193 are not referred to at all.

In addition, when the eight-bit operation_type field has 0x02, a SubPath element is extracted form the downloaded file, and file systems are merged for updating (the second virtual file system is generated) so that the extracted SubPath element is added to a SubPath element recorded on the optical disc 193.

Figure 47:
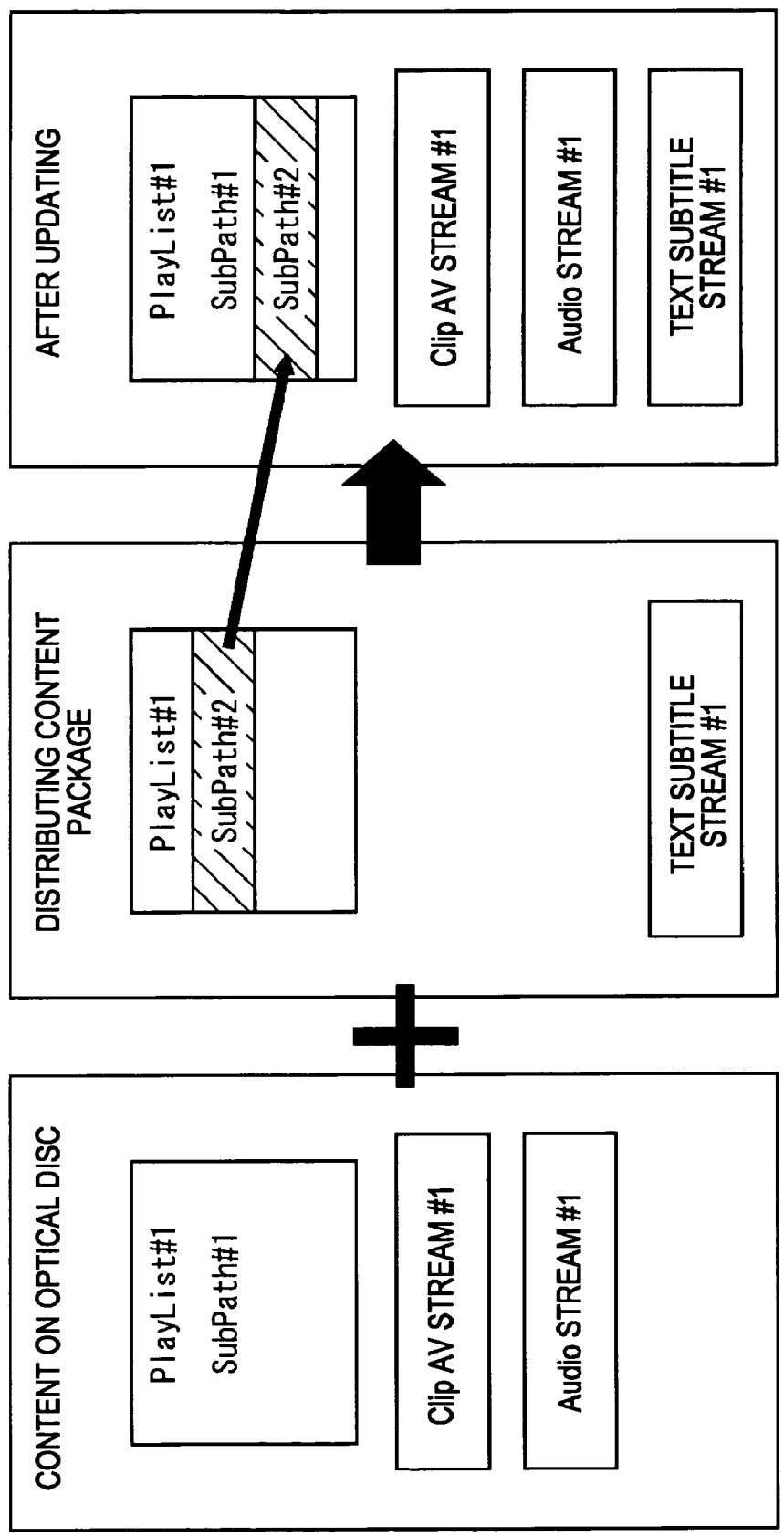
FIG. 47 is an illustration of file updating when 0x02 is written in an eight-bit field of operation_type.

For example, in a case in which the eight-bit operation_type field has 0x02, as shown in FIG. 47, a PlayList#1 file including SubPath #1, a Clip AV stream #1 file, and, for example, an Audio stream #1 file corresponding to subchannel audio are recorded on the optical disc 193, and a content package downloaded from the server 3 includes a PlayList#1 file including SubPath #2 and a text subtitle stream #1, and the file system is updated so as to have a state in which, after SubPath #2 of PlayList #1 in the content package is extracted, the extracted SubPath #2 is added to the PlayList #1 file as an updating file read from the optical disc 193.

Figure 48:
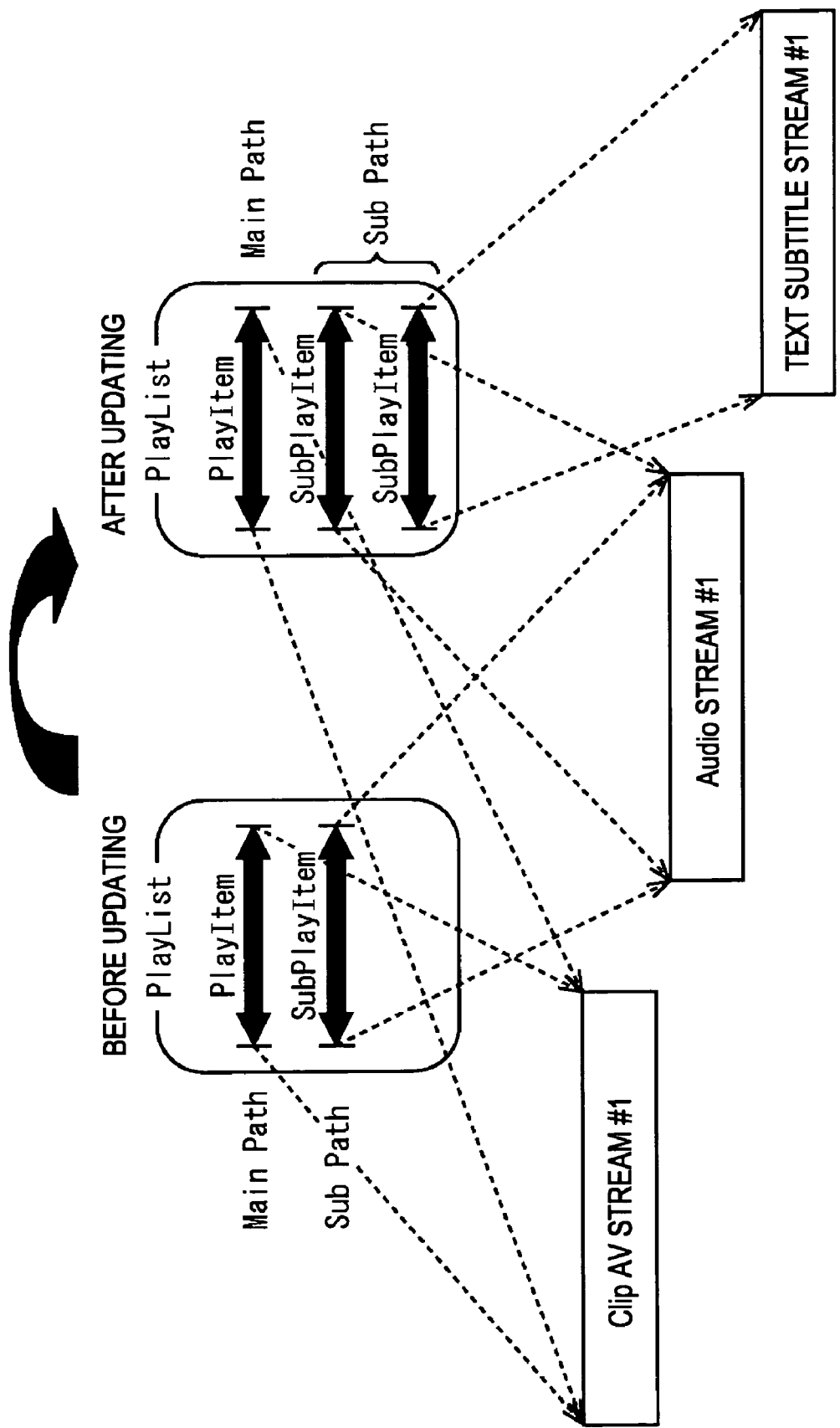
FIG. 48 is an illustration of file updating when 0x02 is written in an eight-bit field of operation_type.

In other words, as shown in FIG. 48, regarding an un-updated PlayList on the optical disc 193 including a Main Path including a PlayItem and Sub Path including a SubPlayItem, Clip AV stream #1 that is referred to by the PlayItem, and Audio stream #1 that is played back as subchannel audio data in synchronization with Clip AV stream 1 can be played back. For the content recorded on the optical disc 193, regarding the PlayList updated (i.e., after the file systems are merged for updating), the second SubPlayItem which is played back in synchronization with Clip AV stream #1 and in which a playback interval can be independently set is added to the Sub Path. Thus, not only Audio stream #1 which is referred to by Clip AV stream #1 referred to by the PlayItem and is referred to by the first SubPlayItem, and which is subchannel audio data played back in synchronization with Clip AV stream #1, but also text subtitle stream #1 in which a playback interval can be set independently from Audio stream #1 can be played back.

In addition, when the eight-bit operation_type field has 0x03, the file systems are merged for updating (the second virtual file system is generated) so that, after a SubPlayItem element is extracted from the downloaded file, the extracted SubPlayItem element is added to a SubPlayItem element recorded on the optical disc 193.

Figure 49:
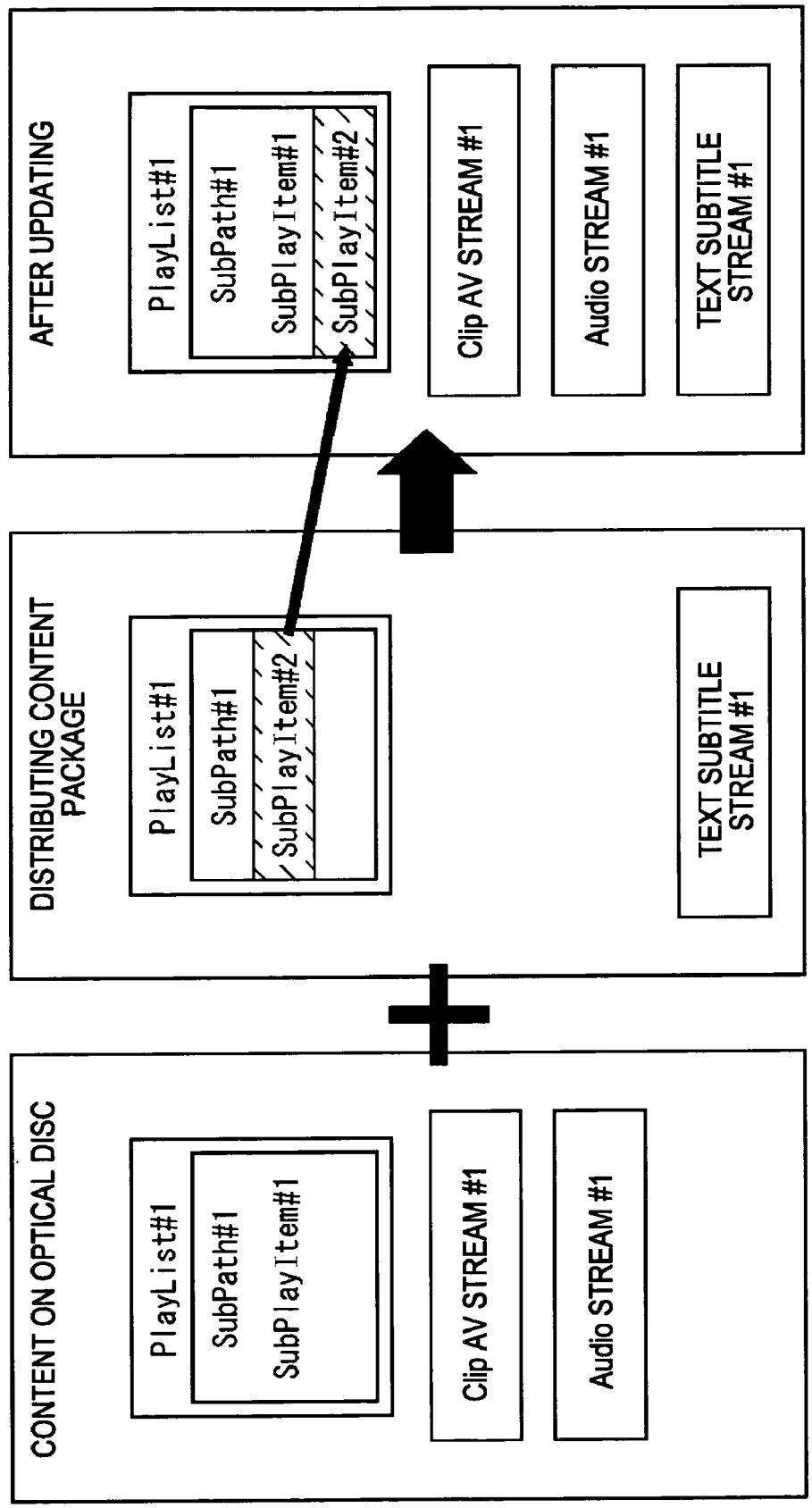
FIG. 49 is an illustration of file updating when 0x03 is written in an eight-bit field of operation_type.

For example, in a case in which the eight-bit operation_type field has 0x03, as shown in FIG. 49, a PlayList#1 file including SubPath#1 including SubPlayItem#1, a Clip AV stream #1 file, and, for example, an Audio stream #1 file corresponding to subchannel audio, are recorded on the optical disc 193, and the content package downloaded from the server 3 includes a PlayList#1 file including SubPath#1 including SubPlayItem#2 and a text subtitle stream #2 file, the file system is updated so as to have a state in which, after SubPlayItem#2 included in SubPath#1 of PlayList#1 in the content package is extracted, the extracted SubPlayItem#2 is added to SubPath#1 of the PlayList# file read as an updating file from the optical disc 193.

Figure 50:
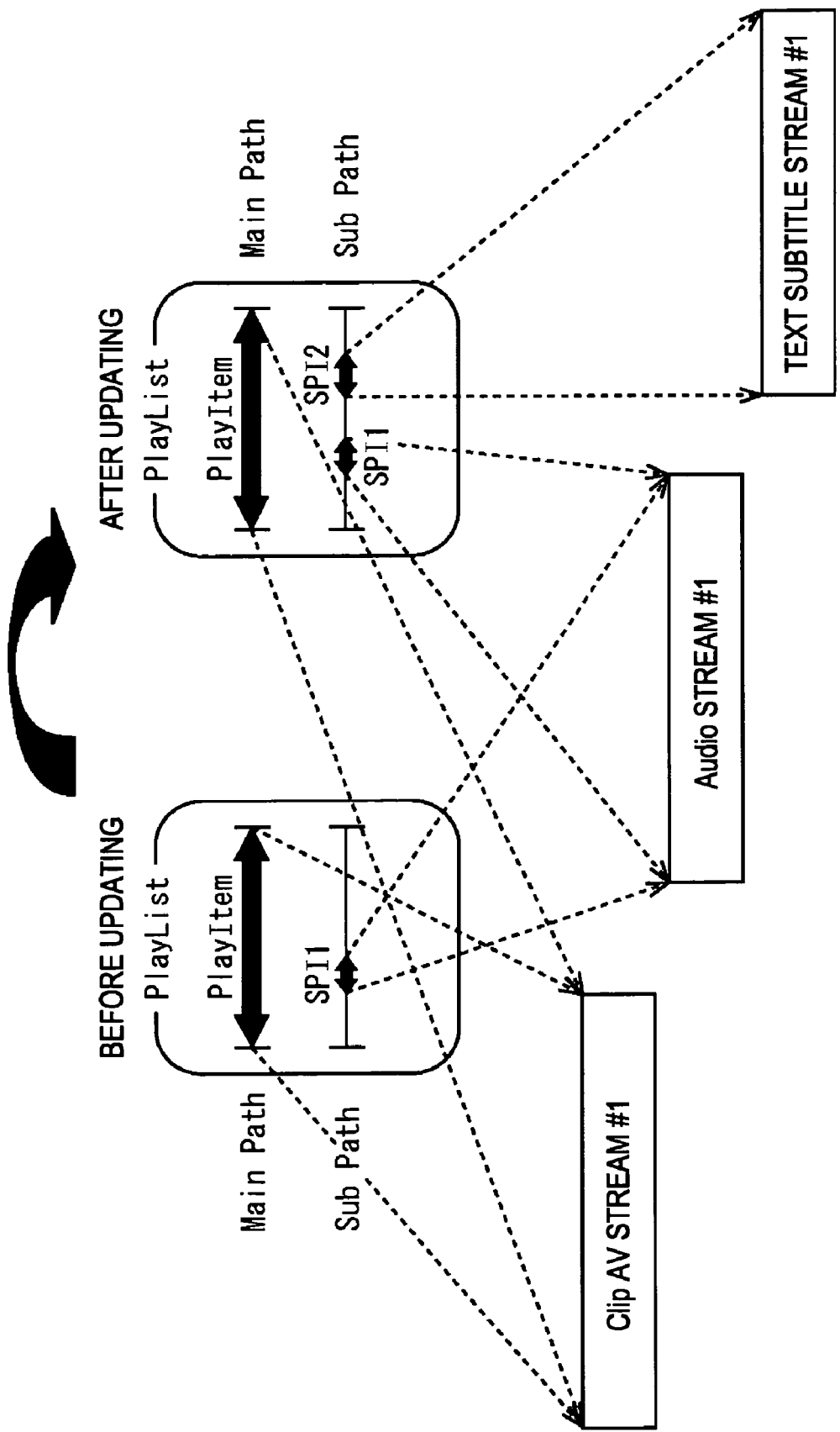
FIG. 50 is an illustration is an illustration of file updating when 0x03 is written in an eight-bit field of operation_type.

In other words, as shown in FIG. 50, regarding an un-updated PlayList including a MainPath including a PlayItem and Sub Path including SubPlayItem#1 (indicated by SPI1 in FIG. 50), Clip AV stream #1 that is referred to by the PlayItem, and Audio stream #1 that is played back in a predetermined first interval as subchannel audio data in synchronization with Clip AV stream 1 can be played back. For the content recorded on the optical disc 193, regarding the PlayList updated (i.e., after the file systems are merged for updating), Clip AV stream #1 that is referred to by the PlayItem, and Audio stream #1 which is referred to by SubPlayItem#1 and which is played back as subchannel audio data in a predetermined first interval in synchronization with Clip AV stream 1 are played back, and, in addition, SubPlayItem#2 (indicated by SPI2 in FIG. 50) included in a SubPath identical to that of SubPlayItem#1 is added. Thus, text subtitle stream #1 can be played back in a predetermined second interval in synchronization with Clip AV stream #1.

When the eight-bit operation_type field has 0x04, the file systems are merged for updating (the second virtual file system is generated) so that, after a SubClip_entry element is extracted from the downloaded file, the extracted SubClip_entry is added to a SubClip_entry element recorded on the optical disc 193.

Figure 51:
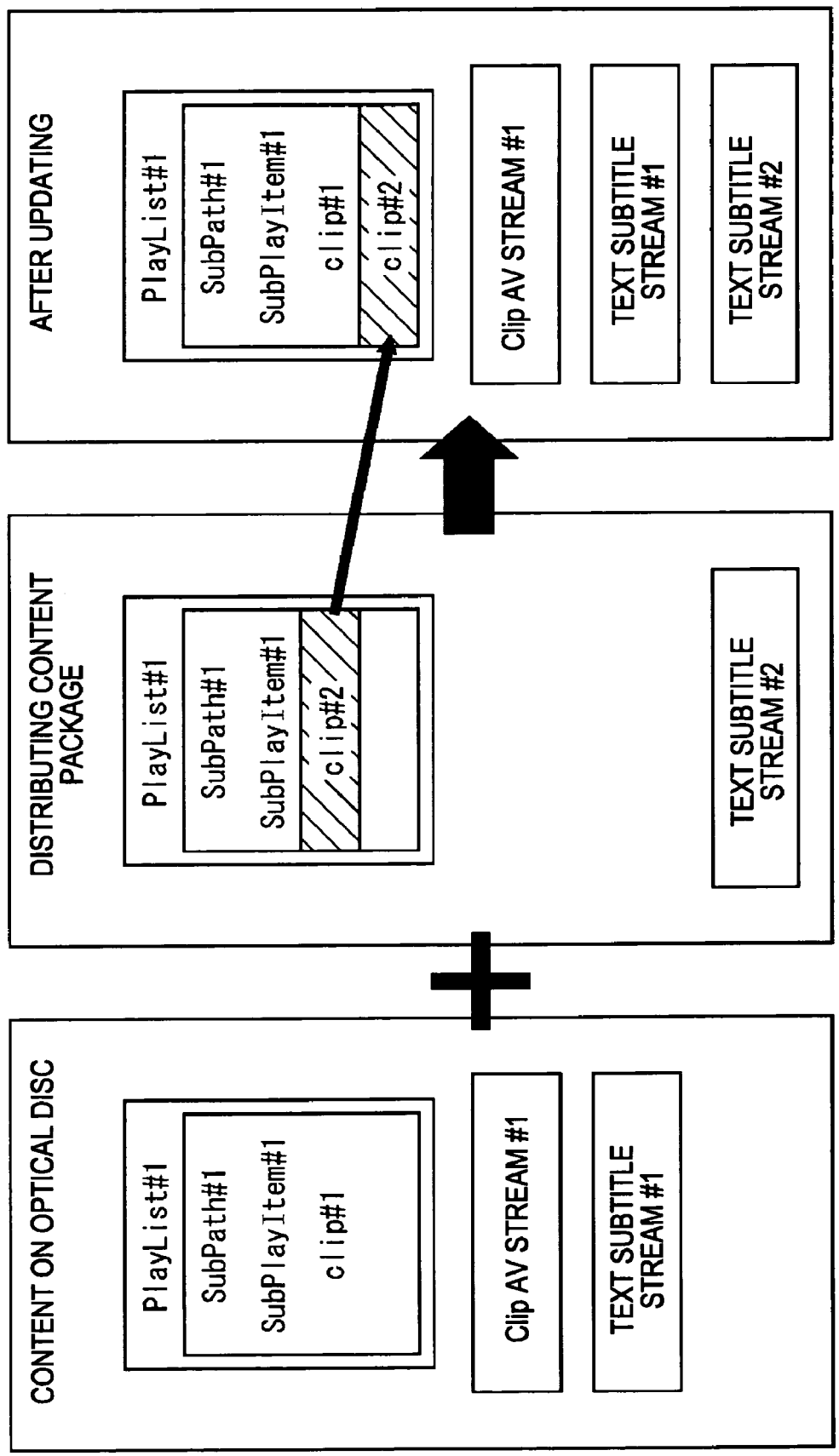
FIG. 51 is an illustration is an illustration of file updating when 0x04 is written in an eight-bit field of operation_type.

For example, in a case in which the eight-bit operation_type field has 0x04, as shown in FIG. 51, a PlayList#1 file including SubPath#1 including SubPlayItem#1 with which Clip#1 is associated, and a Clip AV stream #1 file, and, for example, text subtitle stream #1 corresponding to subtitles in a first language are recorded on the optical disc 193, and the content package downloaded from the server 3 includes a PlayList#1 file including SubPath#1 including SubPlayItem#1 with which Clip#2 is associated, and a text subtitle stream #2 file corresponding to subtitles in a second language, the file system is updated so as to have a state in which, after Clip#2 of SubPlayItem#1 included in the SubPath#1 of the PlayList#1 file in the content package is extracted, the extracted Clip#2 is added to SubPlayItem#1 included in SubPath#1 of the PlayList#1 read as an updating file from the optical disc 193.

Figure 52:
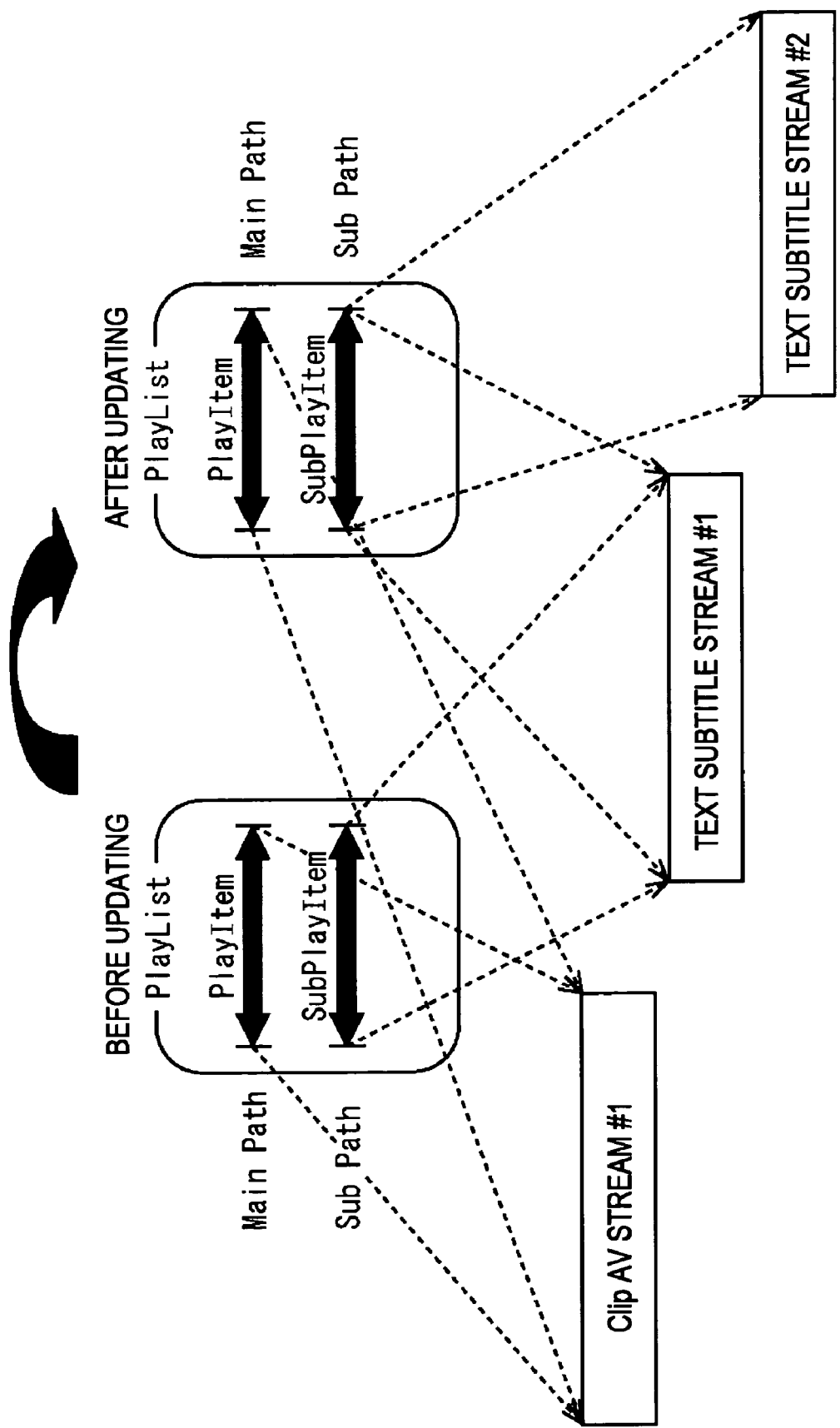
FIG. 52 is an illustration is an illustration of file updating when 0x04 is written in an eight-bit field of operation_type.

In other words, as shown in FIG. 52, regarding an un-updated PlayList that includes a MainPath including a PlayItem and a SubPath including a SubPlayItem, a Clip AV stream #1 that is referred to by the PlayItem, and text subtitle stream #1 which is referred to by SubPlayItem#1 and which synchronizes with Clip AV stream #1 and corresponds to subtitles in a first language can be played back. For the content recorded on the optical disc 193, regarding a PlayList updated (i.e., after the file systems are merged for updating), Clip AV stream #1 that is referred to by the PlayItem, and text subtitle stream #1 which is referred to by the SubPlayItem, which is played back in synchronization with Clip AV stream #1, and which corresponds to the subtitles in the first language are played back, and, in addition, Clip#2 is further added to the SubPlayItem included in the SubPath. Thus, text subtitle stream #2 which synchronized with Clip AV stream #1, which is referred to by the SubPlayItem, and which corresponds to a second language can be further played back.

A list of values that can be specified in the permission included in the meta-data in FIG. 44 is shown in FIG. 53.

As shown in FIG. 53, when the eight-bit field of the permission has 0x00, the attribute of a file including the meta-data is an invisible attribute for the user. When the eight-bit field of the permission has 0x01, the attribute of the file including the meta-data is a visible attribute for the user. When the eight-bit field of the permission has 0x03, the attribute of the file including the meta-data is an overwriting inhibition attribute.

In addition, as described by using FIG. 44, the subtitle_file field has the text subtitle stream as a byte sequence. The text subtitle file complies with the syntax shown in FIG. 54.

The syntax of the text subtitle file in the second embodiment basically has many portions identical to those in the case of the second embodiment described by using FIG. 12. Compared with the case described by using FIG. 12, in the syntax, shown in FIG. 54, of the text subtitle file in the second embodiment, version information included in the meta-data is omitted, portions before start_PTS and end_PTS are partitioned by eight padding bits (a reserved field) for adjusting data boundaries, and subtitle_data that is information specifying subtitle data is stored as a byte sequence.

Specifically, a markup_type is eight-bit information specifying a markup type. A subtitle_count is 32-bit information specifying a total number of items of subtitle data. (the subtitle_count is not a total number of line feed codes) A reserved field has eight padding bits for adjusting data boundaries. A start_PTS is 33-bit information for specification by using a PTS (Presentation Time Stamp) on a time base in which a start time in a PlayList is zero. An end_PTS is 33-bit information for specification by using a PTS on a time base in which a start time in a PlayList is zero. A value measured at 90 kHz is used as a PTS. In the start_PTS and the end_PTS, values measured at 90 kHz are used as PTSs.

A subtitle_data_length is 32-bit information specifying the number (not the number of subtitle characters) of bytes of the subtitle_data. A subtitle_data field is information specifying subtitle data and is stored as a byte sequence.

In addition, also in the second embodiment, the subtitle data includes a "character object" which indicates subtitle characters themselves and "attribute data (attribute)". Regarding attribute data of subtitle data, there are two attribute setting methods, control-character-based attribute setting and markup-based inline attribute setting.

The control-character-based attribute setting is similar to that in the case described by using FIGS. 13 and 14. In addition, regarding the markup-based inline attribute setting, the markup type includes two cases, a case of markup in a TLV (Type-Length-Value) encoding format, and a case of markup based on elements and attributes of a tagged language. Similarly to the case described by using FIG. 15, when the markup type identifier has 0x00, the markup type is defined as the TLV encoding format, and, when the markup type identifier has 0x01, the markup type is defined as a tagged language.

At first, a case in which attribute specification in the TLV encoding format is performed is described. In the case of the attribute specification in the TLV encoding format, the subtitle data character encoding complies with the specification of the character_code_id in the SubPlayItem.

A data structure of the subtitle_data( ) in the case of attribute specification in the TLV encoding format is described.

An eight-bit escape_code specifies the escape code 0x1B indicating that an attribute is subsequently written, as described by using FIG. 17. An eight-bit data_type field specifies an attribute type. A 16-bit data_value_length field specifies the number of bytes of the subsequent attribute data. A data_value specifies a byte sequence of the attribute data or character object.

Attributes that can be specified as the data_type is shown in FIG. 56.

When the eight-bit data_type field of the subtitle_data( ) has 0x01, the type of the attribute represents a setting of a subtitle character string specifying a character string used as subtitle data. The subtitle data must be encoded in an encoding method specified in the character_code_id of the SubPlayItem( ).

When the eight-bit data_type field of the subtitle_data( ) has 0x02, the attribute type represents a setting of a CLUT (Color Look Up Table) which is a conversion table between index data and model color data. The CLUT is a conversion table stored in the subtitle graphics plane processor 93, which is described later by using FIG. 63. A data structure of the data_value when the attribute type in the data_type of the subtitle_data( ) represents CLUT setting is similar to that in the case described by using FIG. 19. When the eight-bit data_type field of the subtitle_data( ) has 0x03, the attribute type represents specification of an origin of a region. A data structure of the data_value when the attribute type in the data_type of the subtitle_data( ) represents specification of the origin of the region is similar to that in the case described by using FIG. 20. When the eight-bit data_type field of the subtitle_data( ) has 0x04, the attribute type represents specification of a line space.

When the eight-bit data_type field of the subtitle-data( ) has 0x05, the attribute type represents specification of a rendering direction. When the attribute type in the data_type of the subtitle_data( ) represents specification of the rendering direction, a code in the data_value is similar to that in the case described by using FIG. 21. When the eight-bit data_type field of the subtitle_data( ) has 0x06, the attribute type represents specification of a font color. A default font color may be set to "0". When the eight-bit data_type field of the subtitle_data( ) has 0x07, the attribute type represents specification of a background color. Areas that are covered by the specified background color have units of regions. For a default background color, no specification (transparency) is possible.

When the eight-bit data_type field of the subtitle_data( ) has 0x08, the attribute type represents specification of a font style. When the attribute type in the data_type of the subtitle_data( ) represents specification of the font style, the data_value has one of the codes described by using FIG. 22 to specify the font style. A default font style may be "standard". When the eight-bit data_type field of the subtitle_data( ) has 0x09, the attribute type represents specification of a font size. When the attribute type in the data_type of the subtitle_data( ) represents specification of the font size, a value which represents the font size and which is not less than 8 and not greater than 72 is specified in the data_value. A default value specifying the font size may be "32". When the eight-bit data_type field of the subtitle_data( ) has 0x0A, the attribute type represents specification of a font rotational angle. When the attribute type in the data_type of the subtitle_data( ) represents specification of the font rotational angle, a value which corresponds to the font rotational angle and which is not less than 0 and not greater than 360 is specified. Regarding the rotational direction, for example, anticlockwise rotation is forward, and the rotational direction may be represented by "zero" by default.

When the eight-bit data_type field of the subtitle_data( ) has 0x0B, the attribute type represents specification of a bookmark start position. The bookmark is information that is given by a supplier of a text subtitle file so that, when the same character is displayed a plurality of times, rendering can be omitted. A data structure of the data_value when the attribute type in the data_type of the subtitle_data( ) represents specification of the bookmark start position is similar to that in the case described by using FIG. 23. When the eight-bit data_type field of the subtitle_data( ) has 0x0C, the attribute type represents a bookmark end position. A data structure of the data_value when the attribute type in the data_type of the subtitle_data( ) represents specification of the bookmark end position is similar to that in the case described by using FIG. 24. When the eight-bit data_type field of the subtitle_data( ) has 0x0D, the attribute type represents specification of repetition of a bookmarked character object sequence. A data structure when the attribute type in the data_type of the subtitle_data( ) represents specification of the repetition of a bookmarked character object sequence is similar to that in the case described by using FIG. 25.

Next, a case of attribute specification in a tagged language is described. In the case of the attribute specification in the tagged language, the subtitle data character encoding type is ISO/IEC646 encoding, ignoring the specification of the character_code_id in the SubPlayItem. A data structure of the subtitle_data( ) in the case of the attribute specification in the tagged language is similar to that in the case described by using FIG. 26. A TaggedAttr format complies with a predetermined format, as described by using FIG. 27. A char_data field specifies a character object byte sequence. Regarding the byte sequence, ISO/IEC646 encoding is performed in BASE64 encoding format. In this case, the symbols "<" and ">" escape on the basis of "0x1B".

Next, elements of attribute specification in the tagged language and attribute type are described with reference to FIG. 57.

The CLUT setting is written as <CLUT size=y=cb=cr=t=>. The attribute "size" specifies a CLUT size. The attributes "y", "cb", "cr", and "t" specify index columns of the CLUT in the subtitle graphics plane processor 93, which is described later by using FIG. 63.

The region origin specification is written as <region x=y=>, and the attributes "x" and "y" specify coordinates (x, y) of the region origin.

The line space specification is written as <linespace d=>, and the attribute "d" specifies a line space in units of pixels. A default line space may be a "font height".

The rendering direction specification is written as <textflow d=>, and the attribute "d" specifies a direction in which character object drawing is performed. A default rendering direction may be set "from left to right".

The font color specification is written as <fontcolor c=>, and the attribute "c" specifies an index for the CLUT in the subtitle graphics plane processor 93, which is described later by using FIG. 63. A default index corresponding to the font color may be "0". The end of the font color specification is written as </fontcolor>.

The background color specification is written as <backgroundcolor c=>, and the attribute "c" specifies an index for the CLUT in the subtitle graphics plane processor 93, which is described later by using FIG. 63. Areas that are covered by the background color have units of regions, and, for a default background color, no specification (transparency) is possible.

The font style specification is written as <fontstyle s=>, and the attribute "s" specifies a font style such as a bold, italic, or standard. A default font style may be the "standard". The end of the font style is written as </fontstyle>.

The font size specification is written as <fontsize s=>, and the attribute "s" specifies a value which corresponds to the font size and which is not less than 8 and not greater than 72. The value representing the font size may be set to "32" by default. The end of the font size specification is written as </fontsize>.

The font rotational angle is written as <fontrotate a=>, and the attribute "a" specifies a value which corresponds to the font rotational angle and which is not less than 0 and not greater than 360. Regarding the rotational direction, for example, anticlockwise rotation is forward, and a default value corresponding to the font rotational angle may be set to "zero". The end of the font rotational angle is written as </fontrotate>.

The bookmark specification is written as <mark id=>, and the attribute "id" specifies a value that can uniquely identify a bookmark and which is not less than 0 and not greater than 255. Accordingly, a bookmark is given to the subtitle data in the scope of this element. A maximum of 256 bookmarks can be specified. The end of subtitle text to be bookmarked is written as </mark>.

The character object sequence repetition specification is written as <repeat id=c=>. The attribute "id" specifies a value that can uniquely identify a bookmark and which is not less than 0 and not greater than 255, and the attribute "c" specifies the number of times repetition is performed. Accordingly, subtitle data to which a bookmark corresponding to an attribute value in the attribute "id" is repeatedly performed the number of times set in the attribute "c".

On the basis of settings of the attributes, the text data of the text subtitle file whose attributes are specified in the above manner is displayed as described by using FIG. 29, so that the rendering direction is specified from left to right and downward line feeding is performed at a set line feed position. As described by using FIG. 30, the text data is displayed so that the rendering direction is specified from right to left and downward line feeding is performed at a set line feed position, and is displayed as described by using FIG. 31 so that the rendering direction is specified from up to down and left-direction line feeding is performed at a set line feed position.

In addition, for example, when fade-in or fade-out is specified for displayed subtitles, by changing a T value in the subtitle graphics plane processor 93, which is described later by using FIG. 63, character object sequence repetition may be specified while changing the character transparency.

Next, the container file in which the text subtitle stream is stored is described.

The container file in which the text subtitle stream is stored is a different file format that is not multiplexed with the Clip AV stream. The format of the container file is a BDAV MPEG-2 transport stream. A PES (Packetized Elementary Stream) packet in which the text subtitle stream is stored complies with the Private Stream 2 format shown in FIG. 58.

In FIG. 58, a packet_start_code_prefix is a 24-bit field that is a packet start code identifying a packet start, and the value 0x000001 is set therein. A stream_id is an eight-bit field defining a stream type and number, and the value 0xBF is set therein. A PES_packet_length is a 16-bit field specifying the number of bytes of the subsequent byte sequence. A PES_packet_data_byte specifies a text subtitle stream file as a byte sequence.

In the container file in which the text subtitle stream is stored, a PAT packet, a PMT packet, and an SIT packet are each designed to appear only once, whereby the container file is prevented from having a PCR (Program Clock Reference) packet.

Figure 59:
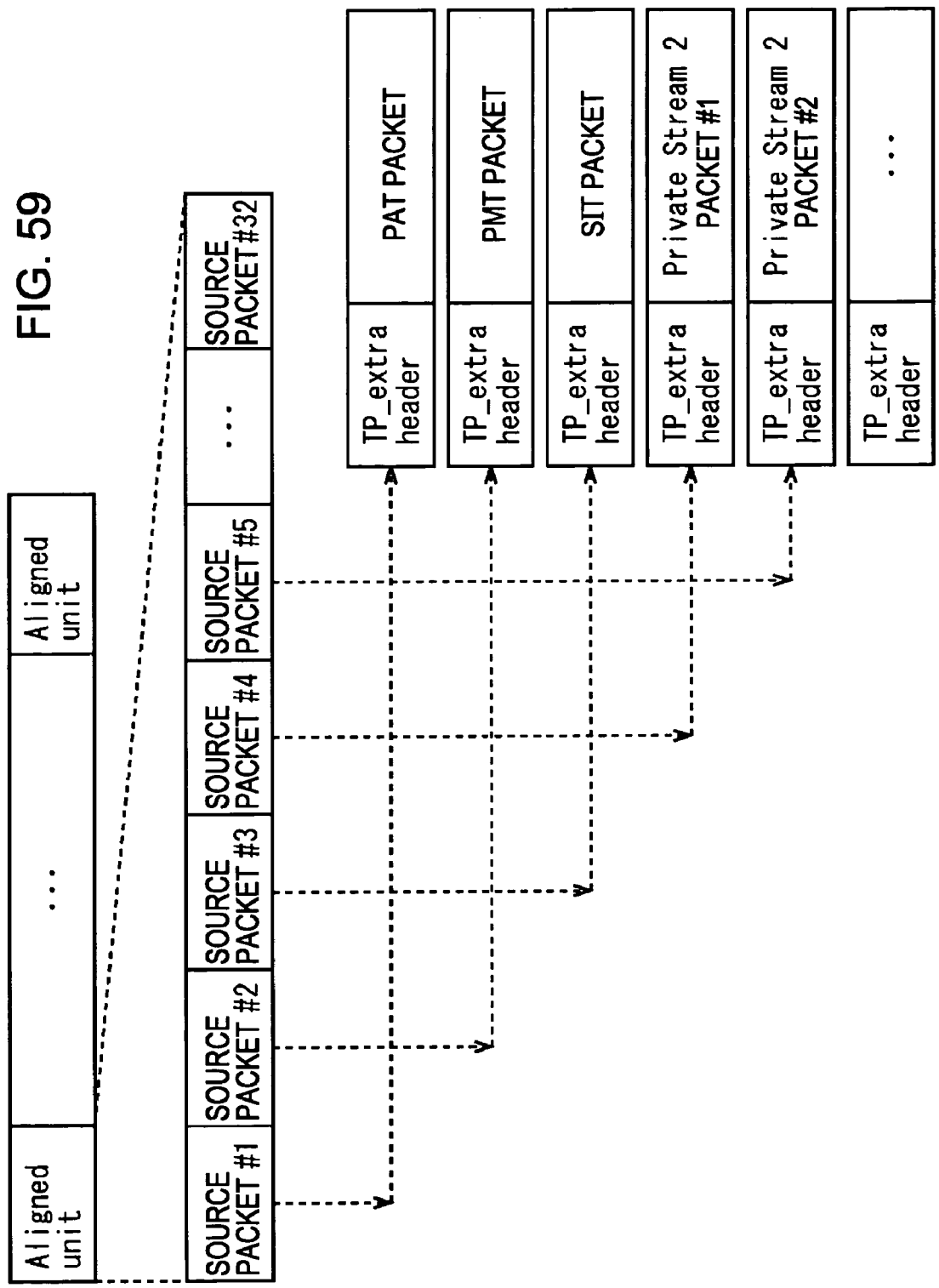
FIG. 59 is an illustration of an example of the configuration of a BDAV MPEG-2 transport stream storing a text subtitle stream.

Accordingly, the BDAV MPEG-2 transport stream packet in which the text subtitle stream is stored has, for example, the configuration shown in FIG. 59.

In the BDAV MPEG-2 transport stream shown in FIG. 59 in which the text subtitle stream is stored, in each Aligned Unit, source packet #1 includes a PAT packet, source packet #2 include a PMT packet, source packet #3 includes an SIT packet, and source packets #4 to #32 include packets #1 to #29 in which text subtitle stream files are stored in the Private Stream 2 format described by using FIG. 58.

As described above, in the second embodiment, the above-described updating data is acquired in a manner such as downloading from the server 3, and is recorded in the local storage 24. A data structure of the data stored in the local storage 24 is shown in FIG. 60.

When the root directory of the local storage 24 does not have thereunder any author_id directory in which an updating data file is recorded, an author_id directory that is identical in name to the author_id for the updating file is created under the root directory of the local storage 24. A disc_id directory that is identical in name to a disc_id for the updating file is created under the root directory of the local storage 24.

Similarly to layers lower than the BDMV directory of the optical disc 193 described by using FIG. 42, below the created disc_id, a PLAYLIST directory stores PlayList files, a CLIP-INF directory stores ClipInformation files, a STREAM directory store text subtitle stream files, and an AUXDATA directory stores a font file. In the example in FIG. 60, each of the names of the author_id directory and the disc_id is "1". In other words, below the directory shown in FIG. 60, updating files in which both the author_id and the disc_id are 1's are recorded.

Figure 60:
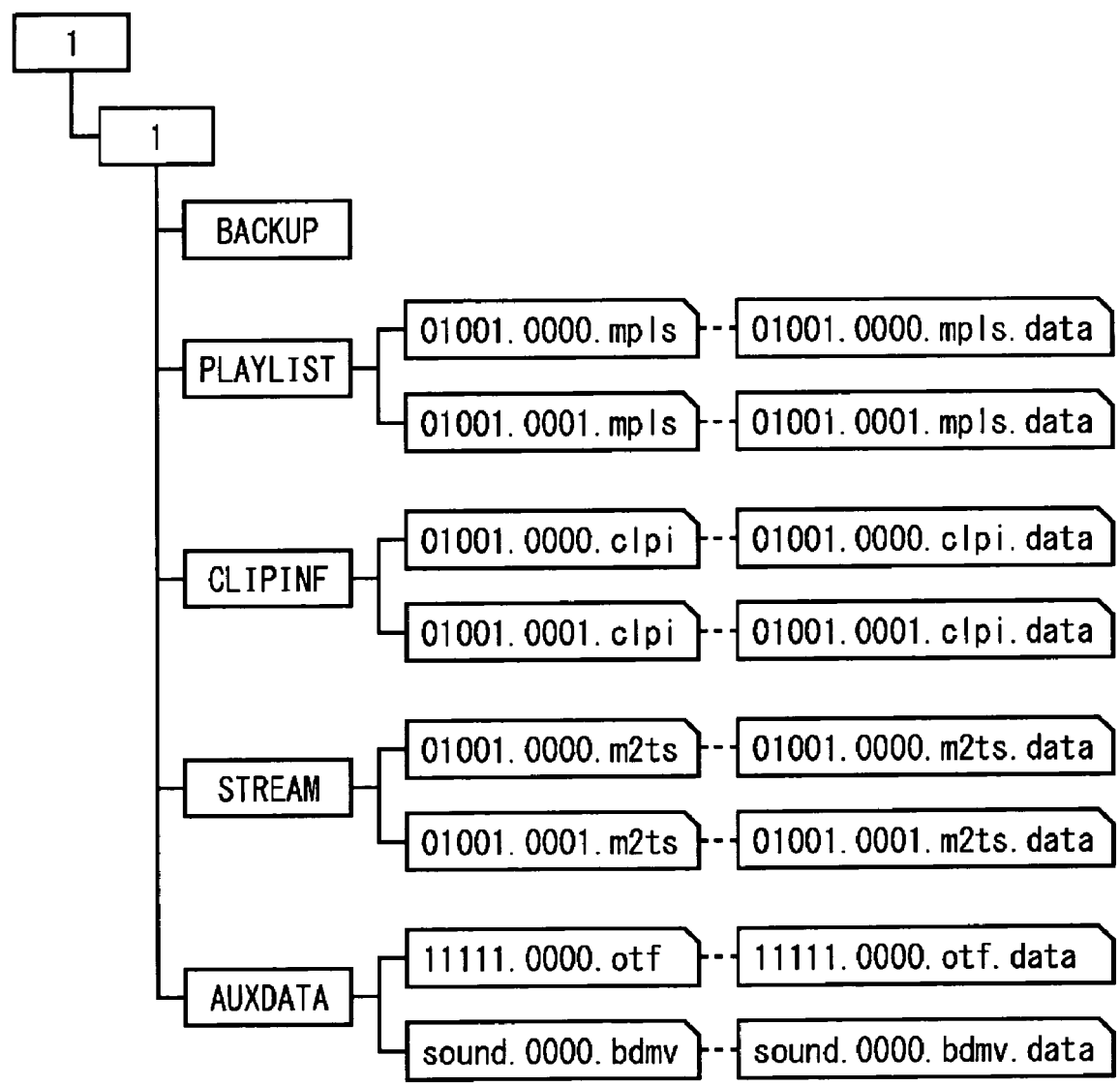
FIG. 60 is an illustration of a data structure of data stored in a local storage 24.

As shown in FIG. 60, the name of each updating data file recorded in the local storage 24 is such that "." (period) and a four-digit number are inserted between a file name and an extension. The four-digit number represents a version number, begins from 0000, and is incremented by one whenever a new version updating file is recorded. For example, in a case in which an updating file for a PlayList named "01001.mpls" is recorded in the PLAYLIST directory, when a file whose file name is "01001.**.mpls (** represents a version number)" is not recorded in the PLAYLIST directory, in other words, when an updating file for a PlayList named "01001.mpls" does not exist, the updating file is recorded having the name "01001.0000.mpls", and, when a file named "01001.0000.mpls" has already been recorded in the PLAYLIST directory, an updating file is recorded having the name "01001.0001.mpls".

The updating data downloaded from the server 3 includes meta-data. The meta-data is recorded, in the same directory for an updating file to which the meta-data corresponds, having a file name in which the extension ".data" is added to an updating file name.

The data files recorded on the optical disc 193, which are described by using FIG. 42, and the data files stored in the local storage 24, which are described by using FIG. 60 are merged to generate the second virtual file system.

Figure 61:
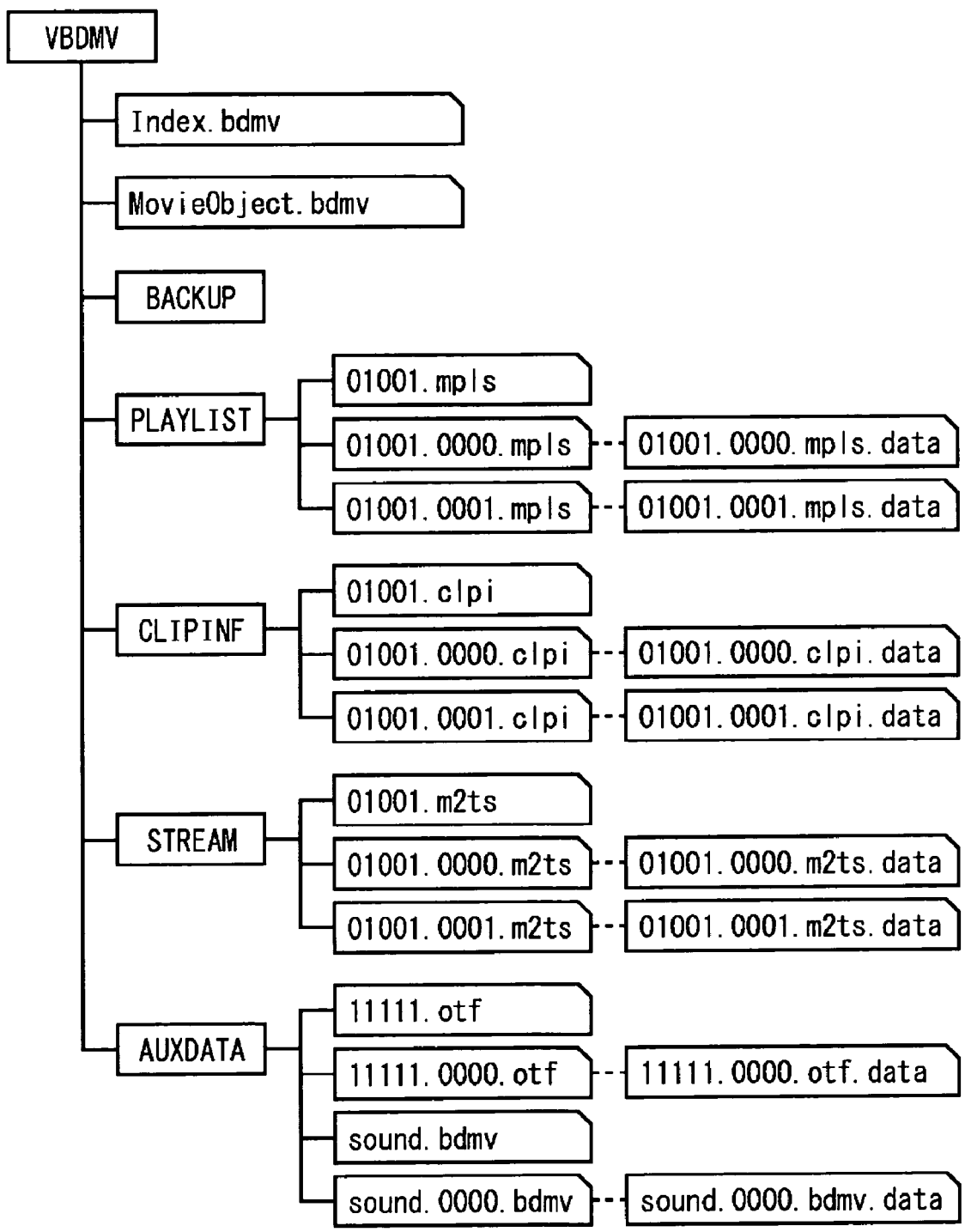
FIG. 61 is an illustration of a data structure of a second virtual file system.

A data structure of the second virtual file system is shown in FIG. 61.

In the second virtual file system, data files recorded on the optical disc 193 and recorded in the local storage 24 which have identical author_id and disc_id are merged, whereby, after a directory bearing the name "VBDMV" is prepared, a file bearing the name "Index.bdmv" in the "BDMV" directory on the optical disc 193, which is described by using FIG. 42, a file bearing the name "MovieObject.bdmv" are stored in the prepared directory, and BACKUP, PLAYLIST, CLIPINF, STREAM, and AUXDATA directories are created and data files are stored in corresponding directories so that an identical configuration is established in the layers below the BDMV directory.

Among the data files in the BACKUP, PLAYLIST, CLIP-INF, STREAM, and AUXDATA directories in the second virtual file system, meta-data files are respectively associated with data files actually stored in the local storage 24.

As described above, in the second virtual file system, data merging is performed so that the content recorded on the optical disc and the content recorded in the local storage can be played back, with both associated with each other.

In addition, similarly to the case described by using FIG. 2, also in the second embodiment, the PlayList can include, in addition to the Main Path specified by the PlayItem, information of the Sub Path specified by using the Sub Play Item shown in FIG. 3. By defining the SubPlayItem, an independent data stream that is not multiplexed with the Clip (for example, an MPEG-2 transport stream) specified by the PlayItem can be played back in synchronization with an AV stream.

Figure 62:
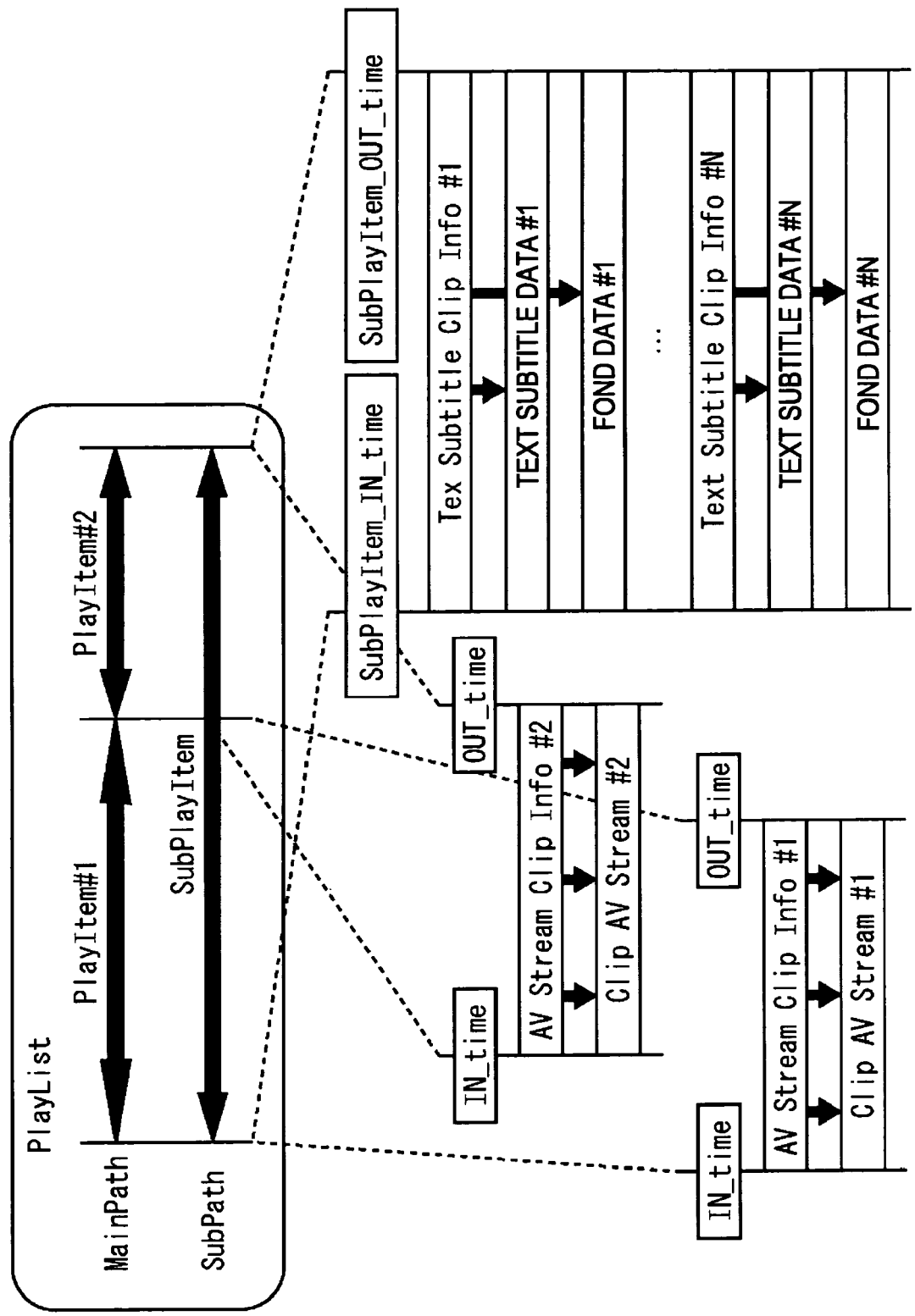
FIG. 62 is an illustration of PlayList, Main Path, and Sub path.

In other words, as shown in FIG. 62, by preparing, correspondingly to the Clip AV stream of the MainPath specified by the PlayItem, a SubPath including a SubPlayItem that specifies subtitle-related information including a text subtitle file and a font file necessary for rendering and a playback interval of the subtitle-related information, subtitles corresponding to the data in the text subtitle file can be displayed in synchronization with playback of the Clip AV stream.

By acquiring a SubPath for the text subtitle stream and a SubPlayItem, the user can play back the Clip AV stream set in the MainPath and the text subtitle stream while establishing synchronization between both streams. One SubPlayItem can specify a plurality of text subtitle streams.

In addition, in the playback apparatus 181 of the present invention, in order to perform synchronization playback, also in SubPath playback, the STC (System Time Clock) that is referred to in the MainPath playback can be referred to. In addition, in SubPath playback, the decoder 192 can preload the entirety or part of the text subtitle stream.

Furthermore, the playback apparatus 181 of the present invention preloads the entirety of the text subtitle stream in the SubPath playback or creates an EP_map, which is described later, concerning the text subtitle file, whereby high speed random accessing of the text subtitle file can be realized.

Figure 63:
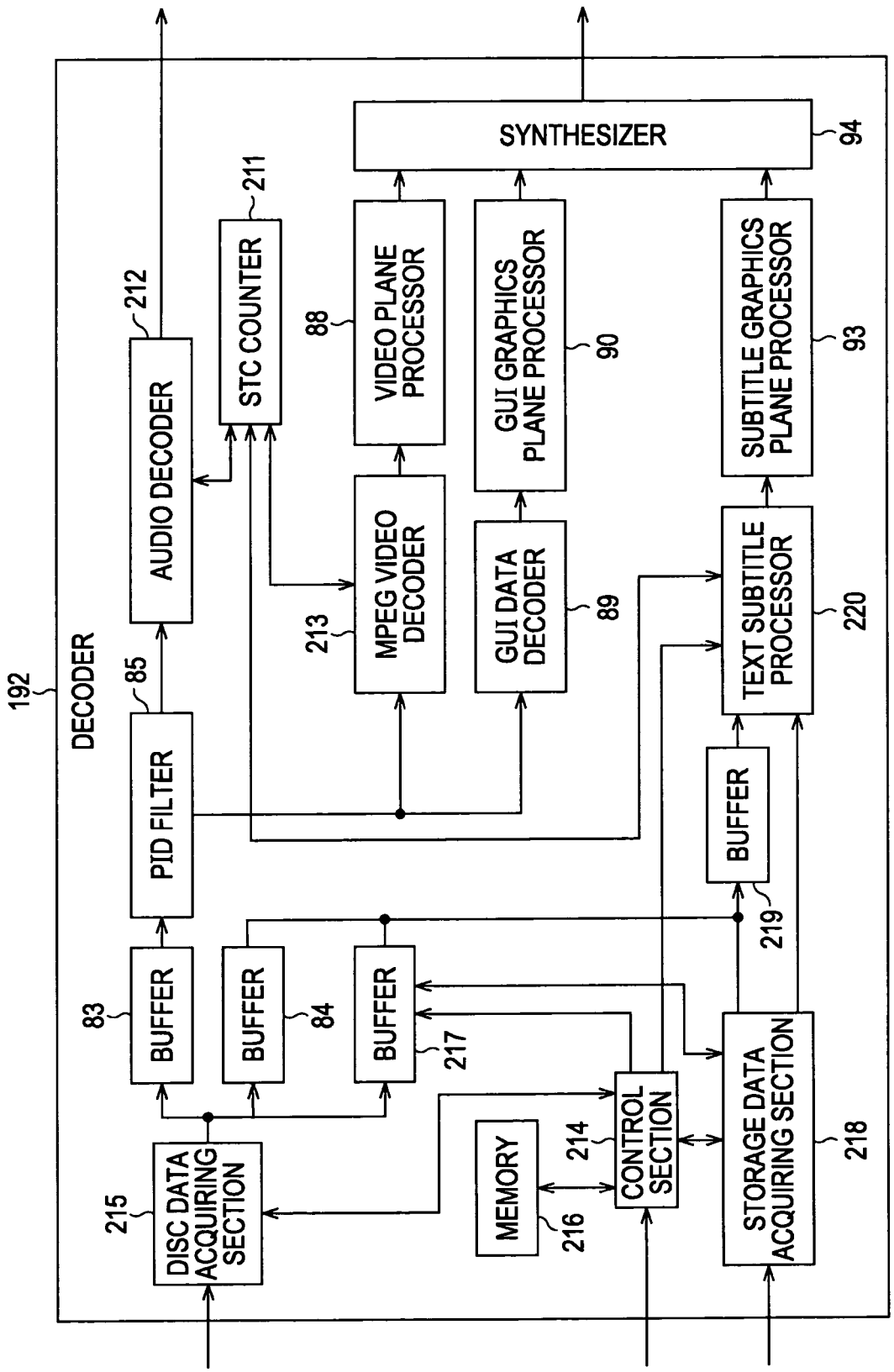
FIG. 63 is a block diagram showing the configuration of a decoder in the playback apparatus in FIG. 1.

FIG. 63 is a block diagram showing the configuration of the decoder 192 in the playback apparatus 181 to which the present invention is applied, the decoder 192 capable of referring to the STC for synchronization playback, preloading the entirety or part of the text subtitle stream, and, in addition, executing random accessing of the text subtitle file.

In the decoder 192 in FIG. 63, portions corresponding to those in the case described in FIG. 33 are denoted by identical reference numerals, and their descriptions are omitted, if necessary. SubPath, the decoder 192 is basically identical in configuration to the decoder 26 described by using FIG. 33 except that an STC counter 211, a memory 216, a buffer 217, and a buffer 219 are further provided, an audio decoder 212 is provided instead of the audio decoder 86, an MPEG video decoder 213 is provided instead of the MPEG video decoder 87, a control section 214 is provided instead of the control section 81, a disc data acquiring section 215 is provided instead of the disc data acquiring section 82, a storage data acquiring section 218 is provided instead of the storage data acquiring section 91, and a text subtitle processor 220 is provided instead of the text subtitle processor 92.

The STC counter 211 counts STCs. The audio decoder 212 calculates a PTS (Program Time Stamp) by referring to a counted value of the STC counter 211, decodes the audio stream in accordance with the calculated PTs, and outputs data of the decoded audio stream. The MPEG video decoder 213 calculate a PTS by referring to the counted value of the STC counter 211, decodes the video stream in accordance with the calculated PTS, and outputs video data obtained by decoding to the video plane processor 88.

Under the control of the playback control section 204, the control section 214 controls processing of each portion of the decoder 192. For example, by controlling the disc data acquiring section 215 or the storage data acquiring section 218 to preload and buffer the entirety of the text subtitle stream in the buffer 217, random accessing of the text subtitle stream is controlled. On the basis of information such as a SubPlayItem_IN_time and SubPlayItem_OUT_time supplied from the disc data acquiring section 215 or the storage data acquiring section 218, an EP_map corresponding to the text subtitle stream is generated and stored in the memory 216, and the stored EP_map is referred to, whereby random accessing of the text subtitle stream can be controlled. In addition, in order to play back the Clip AV stream specified by the MainPath and the text subtitle stream specified by the SubPath while establishing synchronization between both streams, the control section 214 reports, to the text subtitle processor 220, information such as a gap in decoding of the Clip AV stream by the audio decoder 212 and the MPEG video decoder 213, the gap occurring due to PlayItem switching under a nonseamless connecting condition in the MainPath.

Under the control of the control section 214, the disc data acquiring section 215 acquires, in the data read from the optical disc 193, data supplied to the decoder 192, supplies the buffer 83 with a multiplexed stream such as an AV stream specified by a PlayItem, and supplies the buffer 84 with data of the text subtitle file or font file specified by a SubPlayItem. The decoder 192 can also preload the entirety or part of the text subtitle stream. When the entirety of the text subtitle stream recorded on the optical disc 193 is preloaded, the disc data acquiring section 215 reads and supplies all corresponding text subtitle files to the buffer 217. When part of the text subtitle stream recorded on the optical disc 193 is preloaded, the disc data acquiring section 215 acquires information such as a SubPlayItem_IN_time and SubPlayItem_OUT_time corresponding to the text subtitle stream recorded on the optical disc 193, and supplies the acquired information to the control section 214.

The memory 216 stores the EP_map which is generated by the control section 214 and which corresponds to the text subtitle stream. The buffer 217 stores the entirely preloaded text subtitle stream supplied from the disc data acquiring section 215 or the storage data acquiring section 218.

The storage data acquiring section 218 acquires the data (i.e., data of the text subtitle file or font file) supplied to the decoder 192 from the data read from the local storage 24. When the entire preloading is performed, the storage data acquiring section 218 supplies the acquired data to the buffer 217. When the preloading is not performed, or the partial preloading is performed, the storage data acquiring section 218 temporarily stores the acquired data in an internal buffer for transport streams, which is not shown, and supplies the acquired data to the buffer 219. When the text subtitle stream recorded in the local storage 24 is partially preloaded, the storage data acquiring section 218 acquires information such as a SubPlayItem_IN_time and SubPlayItem_OUT_time corresponding to the text subtitle stream recorded in the local storage 24, and supplies the acquired information to the control section 214.

The buffer 219 temporarily buffers data of the text subtitle stream data and font file data supplied to the text subtitle processor 220. When being supplied with the text subtitle stream data and the font file data, the text subtitle processor 220 decodes the supplied text subtitle stream on the basis of the counted value of the STC counter 211 and the information, such as the gap in decoding of the Clip AV stream, supplied from the control section 214 so that the text subtitle stream can be played back in synchronization with the Clip AV stream.

As described above, the decoder 192 in the playback apparatus 181 to which the present invention is applied can preload the entirety or part of the text subtitle stream, and can execute high speed random accessing of the text subtitle stream.

The entire preloading is a technique in which the disc data acquiring section 215 or the storage data acquiring section 218 is controlled to acquire the entire text subtitle stream required for playback and preload the acquired stream in the buffer 217 at a time. The partial preloading is a technique in which the disc data acquiring section 215 or the storage data acquiring section 218 is controlled to preload only a part of the text subtitle stream. Transport stream data of the partially preloaded text subtitle stream is loaded into the buffer 219 in units of source packets (the stream loaded into the buffer 219 is a TextSubtitle elementary stream) at a transfer rate corresponding to a leak rate value of the buffer 84, which servers as a transport stream buffer, or an internal buffer, which is not shown, of the storage data acquiring section 218.

Next, a case in which random accessing of the text subtitle stream is performed during playback of the Clip AV stream is described.

For the Clip AV stream, an EP_map is referred to in order to find a source packet number from an arbitrary PTS value in the PlayItem. The EP_map is described by using FIG. 64.

The EP_map is a table having pairs of time stamps (PTS_EP_start) of entry points in a Clip and source packet numbers (SPN_EP_start) at which decoding of a stream in a Clip AV stream file is to be started, and is defined in the Clip Information file. In other words, a time stamp (PTS_EP_start) of an entry point is specified, whereby the playback apparatus 181 can detect a source packet number (SPN_EP_start) of a source packet (whose decoding is to be started) to be subject to random accessing. That is, by referring to the EP_map in the Clip AV stream, the playback apparatus 181 can handle random accessing of the Clip AV stream, fast forward playback, or fast reverse playback. A source packet number is incremented by one in order of source packets in the AV stream file, and a source packet number at the beginning of the file is zero.

However, the text subtitle stream does not have any EP_map differently from the Clip AV stream on the basis of the standard.

Accordingly, the control section 214 controls the disc data acquiring section 215 or the storage data acquiring section 218 to preload and buffer the entirety of the text subtitle stream in the buffer 217, and, for the PTS value T on a global time base in the playback apparatus 181, the control section 214 finds nonnegative integer i that satisfies the following expressions (1) and (2), whereby random accessing of a data location storing subtitle data corresponding to the PTS value T can be controlled.

$$\text{start\_PTS}(i) \leq T \quad (1)$$

$$T \leq \text{end\_PTS}(i) \quad (2)$$

In addition, similarly to a Clip AV stream of audio/video, the text subtitle stream has a time-series data property. Thus, the relationship represented by the following expression (3) always holds.

$$\text{end\_PTS}(i) \leq \text{start\_PTS}(i+1) \quad (3)$$

Therefore, for the arbitrary PTS value T, by using, for example, B-Tree indexing or the like, as a high speed algorithm for finding nonnegative integer i that satisfies the conditions represented by expressions (1) and (2), the control section 214 can control random accessing of the subtitle data. Obviously, the control section 214 may find, for the arbitrary PTS value T, nonnegative integer i that satisfies the conditions represented by expressions (1) and (2) by using an algorithm other than B-Tree indexing.

In addition, when the text subtitle stream is partially preloaded, the control section 214 may control only sequential accessing without permitting random accessing. Also, during PlayList playback, when the control section 214 is supplied from the disc data acquiring section 215 with information such as the SubPlayItem_IN_time and SubPlayItem_OUT_time corresponding to the text subtitle stream recorded on the optical disc 193, or the control section 214 is supplied from the storage data acquiring section 218 with information such as the SubPlayItem_IN_time and SubPlayItem_OUT_time corresponding to the text subtitle stream recorded in the local storage 24, by generating beforehand an EP_map of the text subtitle stream which is similar to the EP_map described by using FIG. 64, storing the EP_map in the memory 216, and referring to the EP_map of the text subtitle stream stored in the memory 216, the control section 214 can control random accessing.

Figure 65:
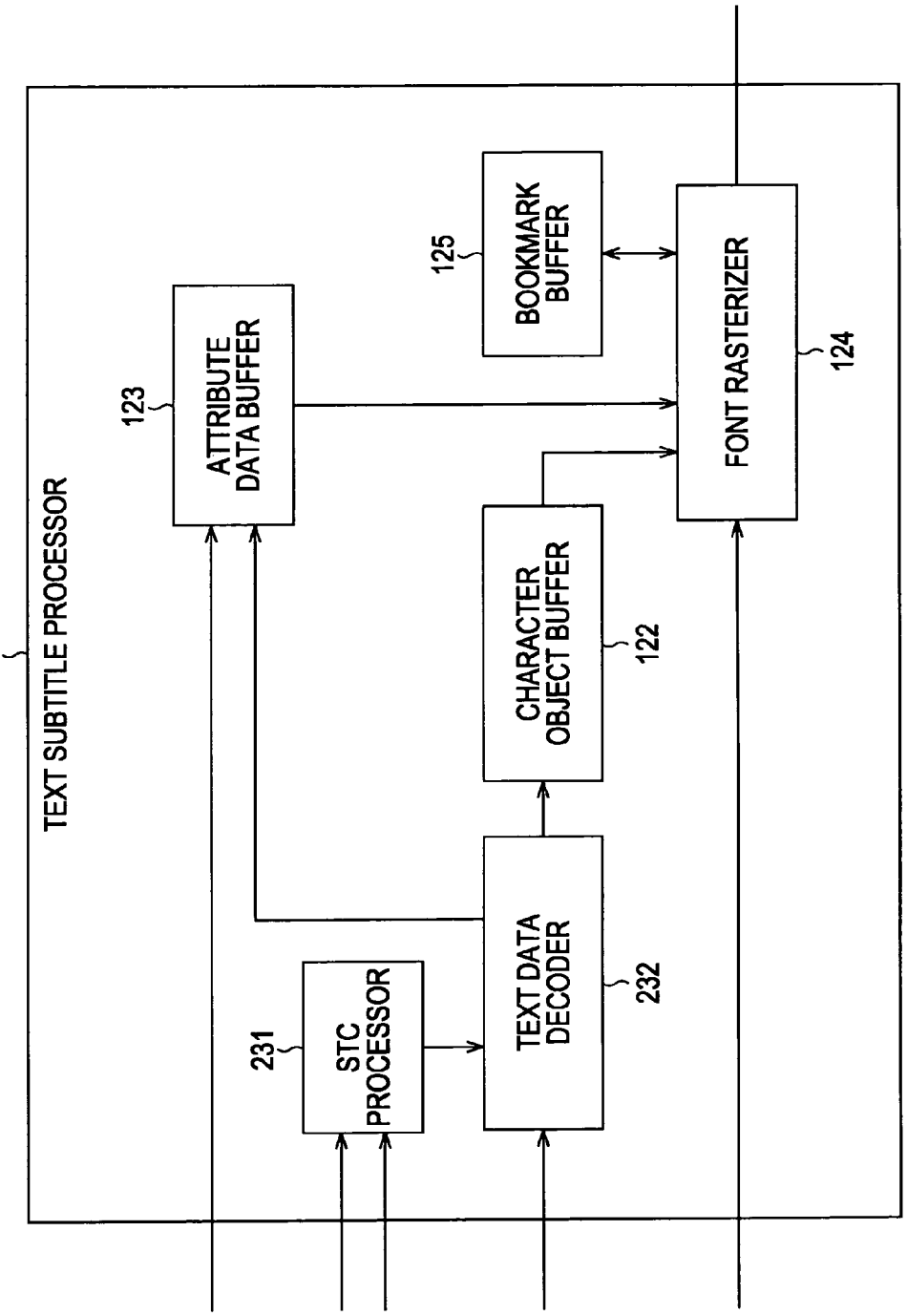
FIG. 65 is a block diagram showing the configuration of the text subtitle processor in FIG. 63.

FIG. 65 is a block diagram showing the configuration of the text subtitle processor 220 in FIG. 63.

In the text subtitle processor 220 in FIG. 65, portions corresponding to those in the case described by using FIG. 34 are denoted by identical reference numerals, and their descriptions are omitted, if necessary. Specifically, the text subtitle processor 220 is basically identical in configuration to the synthesizer 94 described by using FIG. 32 except that an STC processor 231 is newly provided which calculates a PTS serving as a reference for the operation of the text data decoder 232 so as to acquire the counted value of the STC counter 211 and information such as the gap in decoding of the Clip AV stream supplied from the control section 214 and to play back the text subtitle stream in synchronization with the Clip AV stream, and that a text data decoder 232 that decodes the supplied text subtitle stream on the basis of the PTS calculated by the STC processor 231 on the basis of the STC is provided instead of the text data decoder 121.

In the decoding of the text data by the text data decoder 232, by referring to the STC that is referred to by the Clip AV stream in the MainPath, synchronization between the Clip AV stream and the text subtitle stream can be achieved. However, since the Clip AV stream can store a plurality of STCs in a PlayList, referring of the text data decoder 232 to the STC that is referred to by the Clip AV stream in the MainPath causes complexity of playback control of the text subtitle stream. In addition, the text subtitle stream has no PCR packet, as described above.

Accordingly, the text subtitle processor 220, which decodes the text subtitle stream, assumes a global time base consistent in the playback apparatus 181 on the basis of the STC that is referred to when the AV stream in the Main Path is played back. The STC processor 231 calculates a time stamp on the basis of the time base and supplies the calculated time stamp to the text data decoder 232. The text data decoder 232 executes decoding by using the supplied time stamp as a reference.

Figure 66:
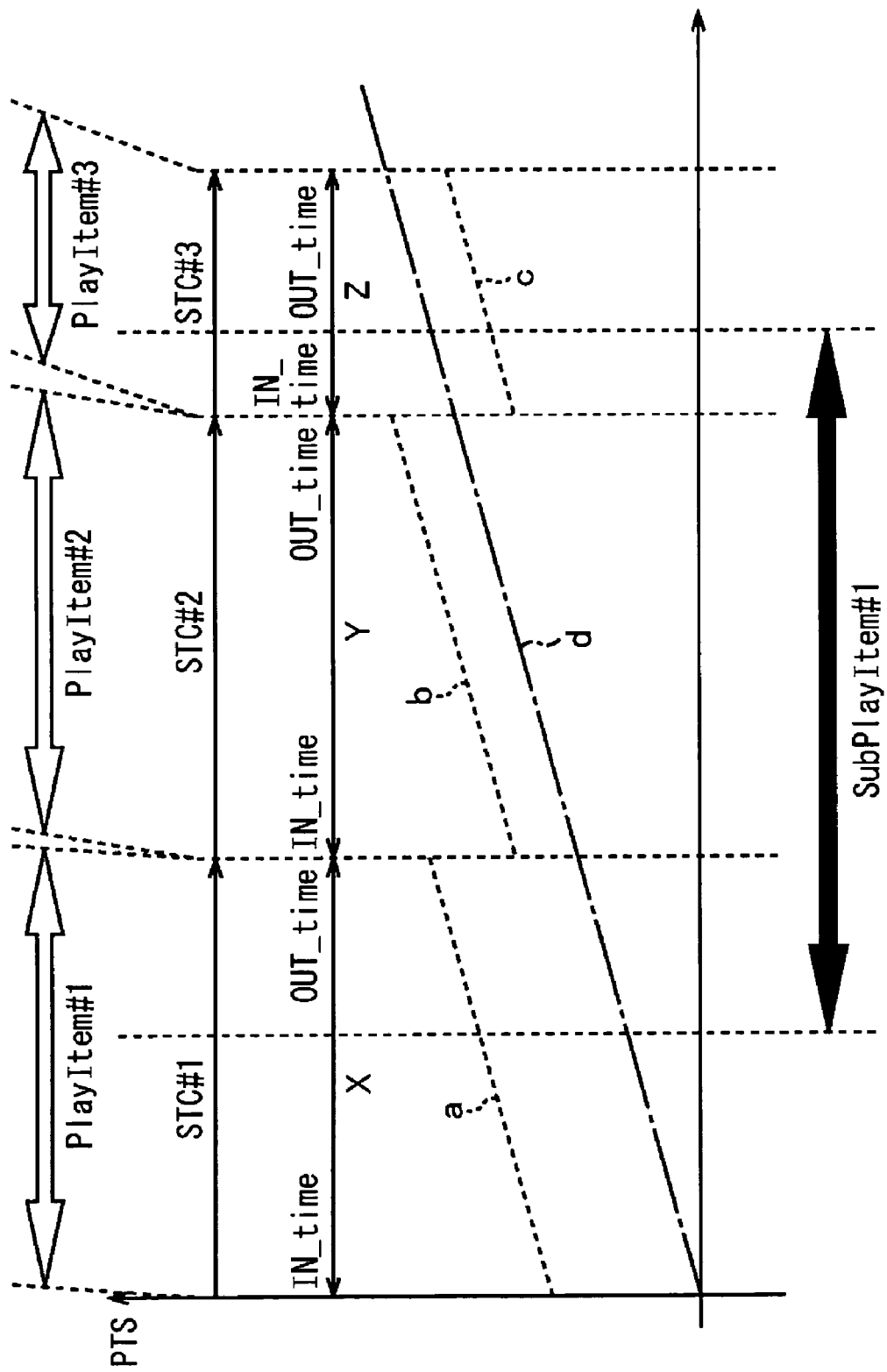
FIG. 66 is an illustration of reference to STC.

In other words, as shown in FIG. 66, in the Clip AV stream, each PlayItem in one PlayList refers to an STC. Accordingly, by integrating the counted value of the STC counter 211, the STC processor 231 forms a global time base in the PlayList, and calculates a PTS serving as a reference for the operation of the text data decoder 232.

Figure 67:
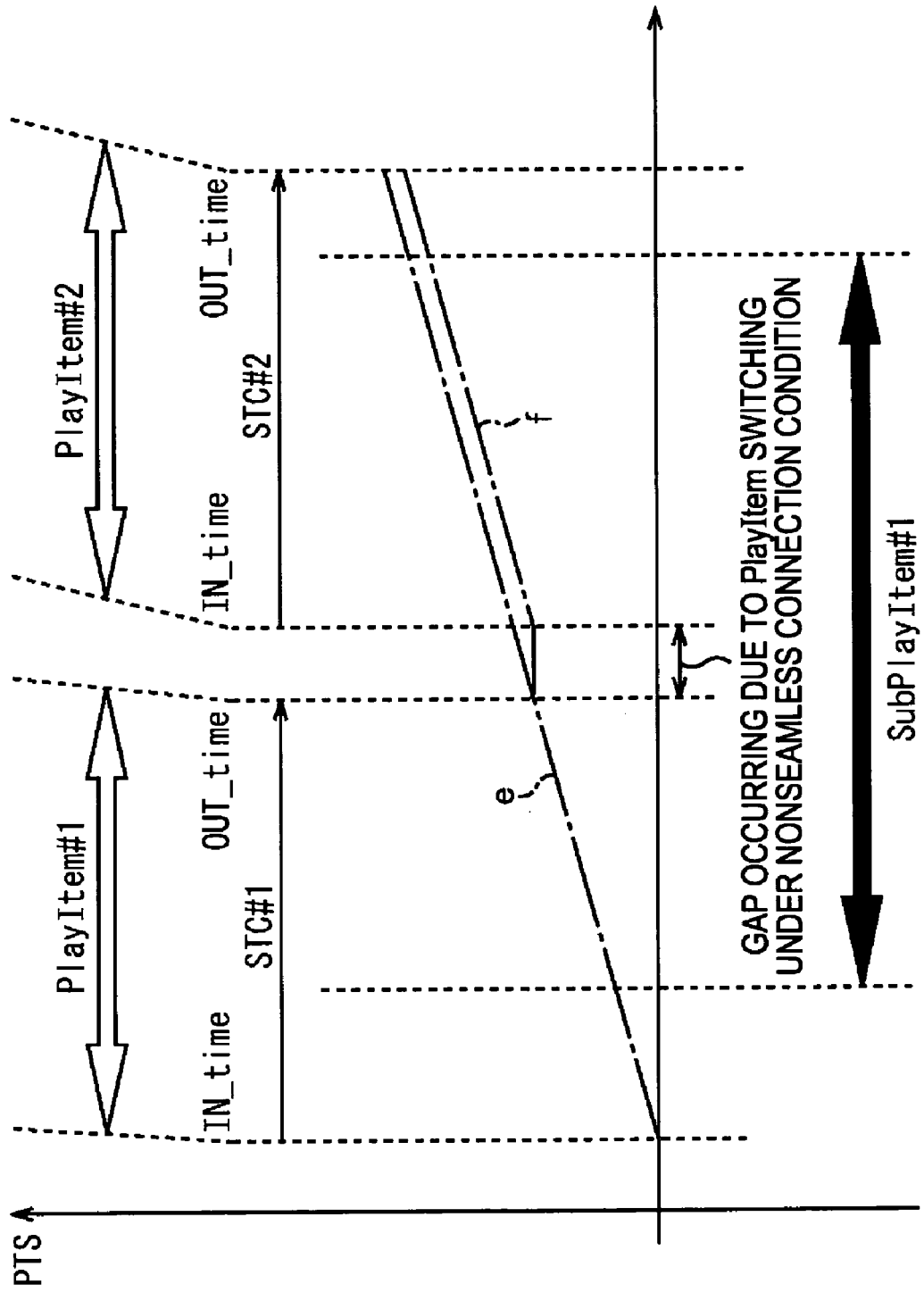
FIG. 67 is an illustration of reference to STC.

At this time, as shown in FIG. 67, the STC processor 231 needs to integrate the counted value of the STC counter 211 while considering the gap occurring due to PlayItem switching in a nonseamless connection condition. Accordingly, the STC processor 231 acquires the information, such as the gap in decoding of the Clip AV stream, supplied from the control section 214, and calculates a PTS serving as a reference for the operation of the text data decoder 232 by executing integrating the counted value of the STC counter 211 while considering the gap occurring due to the PlayItem switching.

As described by using FIGS. 66 and 67, the text data decoder 232 decodes an elementary stream of supplied text subtitles on the basis of a PTS calculated by integrating the counted value of the STC counter 211 which is referred to by the Clip AV stream in the Main Path while considering the gap occurring due to the PlayItem switching.

Next, downloading process 2 that is a process of the controller 191 in the playback apparatus 181 that downloads the update file from the server 3 is described with reference to the flowchart in FIG. 68.

This process is executed when the user commands acquisition of updating data regardless of whether or not the optical disc 193 is loaded into the playback apparatus 181.

In step S201, by controlling an Internet interface 24 to access the server 3 via the Internet 2, the data acquiring section 33 of the controller 191 requests the server 3 to transmit data corresponding to an updating menu screen.

In step S202, by controlling the Internet interface 24, the data acquiring section 33 receives the data corresponding to the updating menu screen from the server 3 via the Internet 2. The data acquiring section 33 supplies the menu-screen-display control section 31 with the data corresponding to the updating menu screen which is received by the Internet interface 24 after being transmitted from the server 3.

In step S203, the menu-screen-display control section 31 controls the display apparatus to display the updating menu screen. Proceeding to step S204, on the basis of a signal supplied from the operation input acquiring section 32, the menu-screen-display control section 31 determines whether or not an updating detail has been selected by a user's operation on a button on the menu screen.

In step S204, the menu-screen-display control section 31 waits until it determines that the updating detail has been selected. If it is determined that the updating detail has been selected, the process proceeds to step S205. Information representing the updating detail selected by the user is output from the menu-screen-display control section 31 to the data acquiring section 33.

In step S205, by controlling the Internet interface 24 to transmit the information of the updating detail to the server 3, the data acquiring section 33 request the server 3 to download an update file specified by the user.

In step S206, by controlling the Internet interface 24, the data acquiring section 33 allows the server 3 to download PlayList, ClipInformation, text subtitle stream, and font files prepared as updating files, and reports, to the local storage directory managing section 201, that the files have been downloaded.

In step S207, on the basis of an author_id and disc_id included in meta-data of the downloaded updating data files, the local storage directory managing section 201 creates a directory identified by the IDs in the local storage 24. This creates, for example, a file system having the structure described by using FIG. 60 in the local storage 24.

In step S208, the local storage directory managing section 201 loads and stores the files downloaded from the server 3 in the directory created in step S209.

In this process, update files are downloaded from the server 3 and are recorded in the local storage 24. Thus, for example, the user, who purchases the optical disc 193, on which content, such as a movie, is recorded, can acquire and record the files required for displaying subtitles in a language that is not recorded beforehand on the optical disc 193. Accordingly, the content can be viewed and listened to while displaying subtitles in a language desired by the user in synchronization with an AV stream recorded on the optical disc 193.

In addition, the update file downloading as described above may be performed for a fee and without a fee.

Next, playback process 2 whose control is executed by the controller 191 is described with reference to the flowchart in FIG. 36.

When the optical disc 193 is loaded and playback of the recorded content is directed in a state in which the update files downloaded as described above are recorded in the local storage 24, in step S221, the optical disc directory managing section 202 reads, from the optical disc 193, an author_id and disc_id recorded by the user so as not to be rewritten, and outputs the read author_id and disc_id to the local storage directory managing section 201.

In step S222, on the basis of the author_id and disc_id supplied from the optical disc directory managing section 202, the local storage directory managing section 201 searches for a file system in the local storage 24 which corresponds to a file system of the optical disc 193, and supplies the file system to the file system merging section 203. As described above, the file system corresponding to the file system of the optical disc 193 is stored in the local storage 24 in a directory identified by the author_id and disc_id (FIG. 60).

Figure 70:
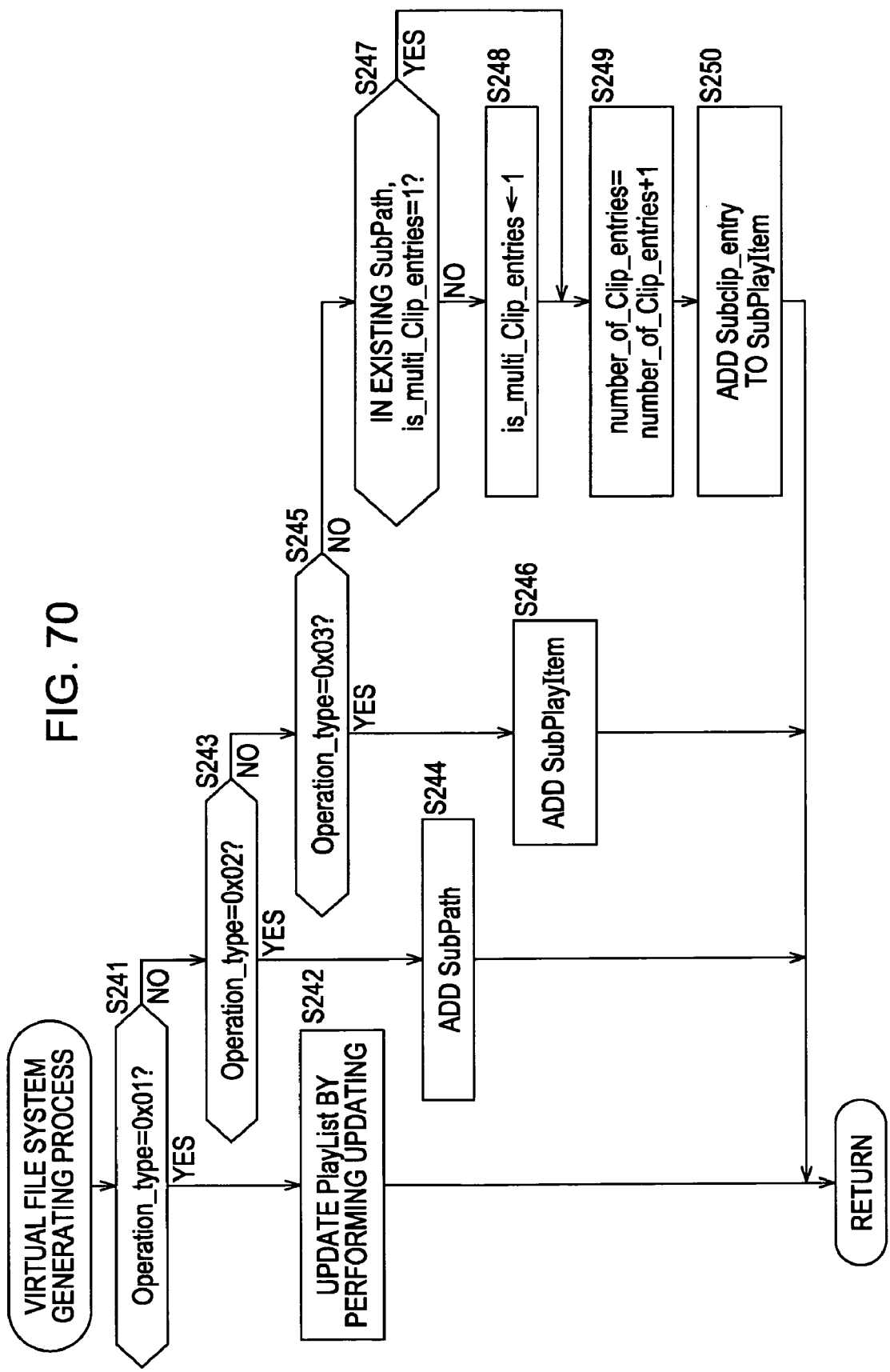
FIG. 70 is a flowchart illustrating a virtual file system generating process.

At this time, the file system of the optical disc 193 is output from the optical disc directory managing section 202 to the file system merging section 203, and the file system of the optical disc 193 and the file system of the local storage 24 are merged as described with reference to FIG. 61. In step S223, a virtual file system generating process, which is described by using FIG. 70, is executed to generate the second virtual file system. The generated second virtual file system is output to the playback control section 204 and is used for AV stream playback.

In step S224, the playback control section 204 specifies a MovieObject from the generated second virtual file system and executes a playback command included in the MovieObject. In step S225, the playback control section 204 acquires a PlayList and SubPlayItem specified as a playback interval by the playback command included in the MovieObject. In step S226, the playback control section 204 controls the local storage directory managing section 201 and the optical disc directory managing section 202 to read files (such as an AV file, a text subtitle file, and a font file) that are referred to by the acquired PlayList and SubPlayItem, and to supplies the read files to the decoder 192.

Figure 74:
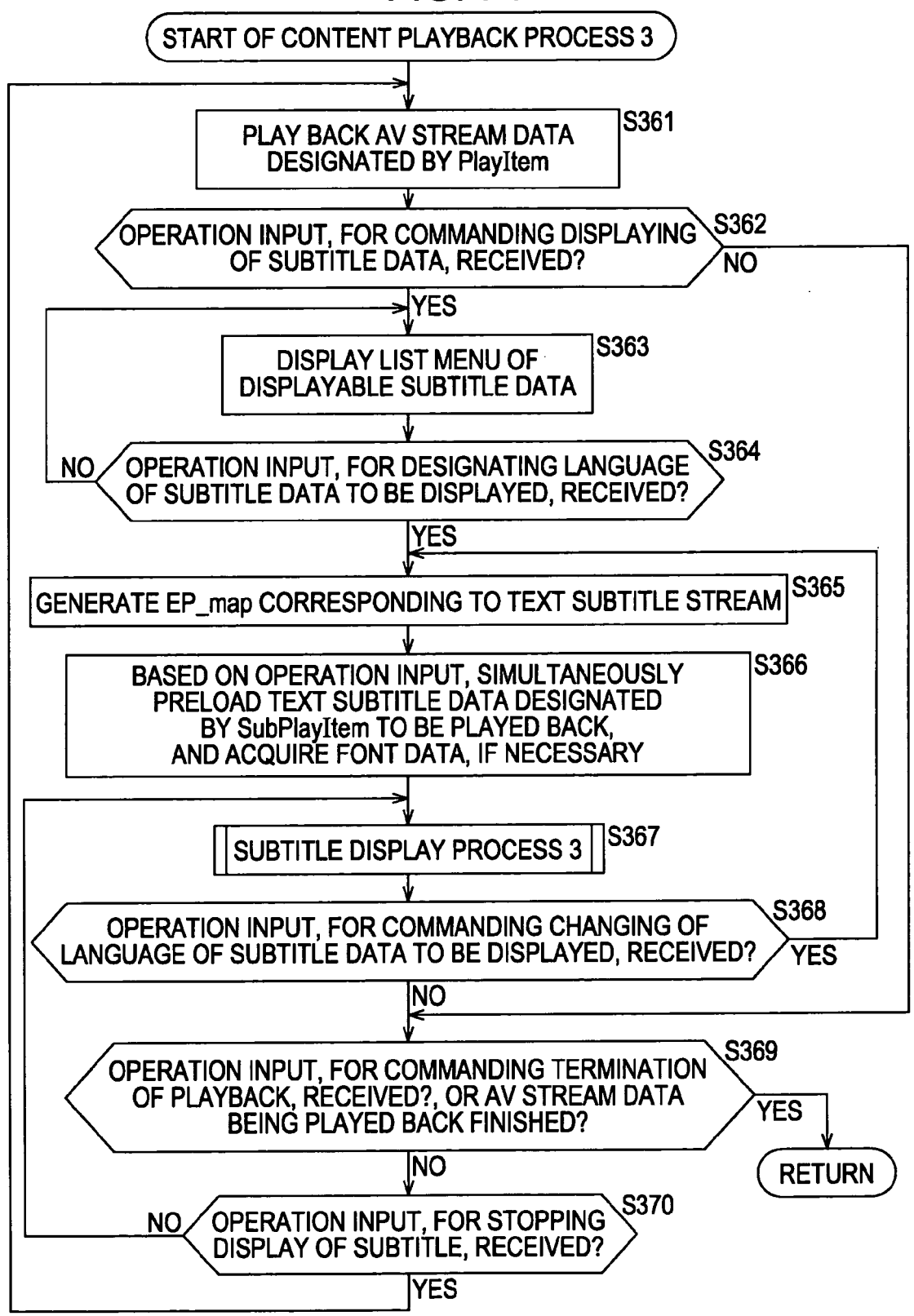
FIG. 74 is a flowchart illustrating content playback process 3.

In step S227, content playback process 2, which is described later by using FIG. 71, or content playback process 3, which is described later by using FIG. 74, is executed, whereby the read files, such as the AV stream file and the text subtitle stream file, are decoded and video and audio, or subtitles are output from the display apparatus before the process finishes.

As described above, the second virtual file system is generated and used in content playback, whereby, for example, data of the text subtitle file that is referred to by the SubPlayItem is read and played back simultaneously with the AV stream.

Figure 69:
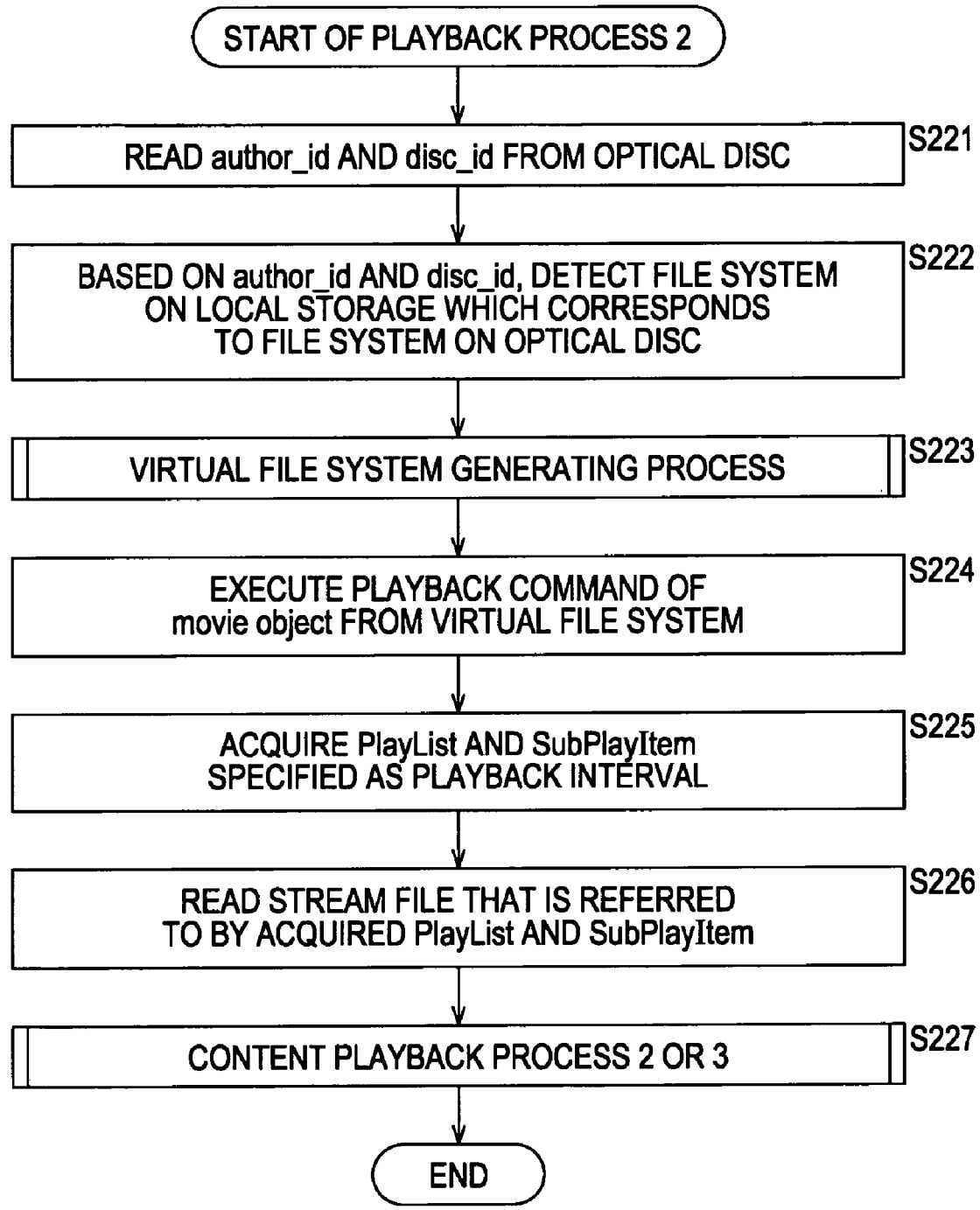
FIG. 69 is a flowchart illustrating playback process 2.

Next, the virtual file system generating process executed in step S223 in FIG. 69 is described with reference to the flowchart in FIG. 70.

The file system merging section 203 generates the second virtual file system by merging the file system of the optical disc 193 and the file system of the local storage 24, as described with reference to FIG. 61.

In step S241, the file system merging section 203 determines whether or not the value of the operation_type of an update file to be processed, that is, meta-data in the file system detected in step S222 in FIG. 69, is 0x01. If, in step S241, it is determined that the value of the operation_type of the meta-data is not 0x01, the process proceeds to step S243, which is described later.

If, in step S241, it is determined that the value of the operation_type of the meta-data is 0x01, in step S242, the file system merging section 203 generates the second virtual file system, which is updated by replacing the PlayList of the optical disc 193 by the PlayList of the update file. After that, the process returns to step S223 in FIG. 69 and proceeds to S224. In other words, if, in step S241, it is determined that the value of the operation_type of the meta-data is 0x01, the PlayList recorded in the local storage 24 after being downloaded is referred to in an unchanged state, and the PlayList of the optical disc 193 is not referred to at all.

If, in step S241, it is determined that the value of the operation_type of the meta-data is not 0x01, in step S243, the file system merging section 203 determines whether or not the operation_type of the update file to be processed, that is, the meta-data in the file system detected in step S222 in FIG. 69, is 0x02. If, in step S243, it is determined that the operation_type of the meta-data is not 0x02, the process proceeds to step S225.

If, in step S243, it is determined that the operation_type of the meta-data is 0x02, in step S244, the file system merging section 203 generates the second file system, which is updated by adding a SubPath of the update file to the PlayList file of the optical disc 193. The process returns to step S223 in FIG. 69 and proceeds to step S224. In other words, if, in step S243, it is determined that the operation_type of the metadata of the update file is 0x02, as described by using FIGS. 47 and 48, file systems are merged and updated such that the SubPath element is extracted from the downloaded file and the extracted SubPath element is added to a SubPath element recorded on the optical disc 193.

If, in step S243, it is determined that the operation_type of the meta-data is not 0x02, in step S245, the file system merging section 203 determines whether or not the value of the operation_type of the update file to be processed, that is, the meta-data in the file system detected in step S222 in FIG. 69. If, in step S245, it is determined that the value of the operation_type of the meta-data is not 0x03, the process proceeds to step S227.

If, in step S245, it is determined that the operation_type of the meta-data of the meta-data is 0x03, in step S246, the file system merging section 203 generates the second file system, which is updated by adding the SubPlayItem of the update file to the PlayList file of the optical disc 193. The process returns to step S223 in FIG. 69 and proceeds to step S224. In other words, if it is determined that the value of the operation_type of the meta-data of the update file is 0x03, the file systems are merged and updated such that, as described by using FIGS. 49 and 50, a SubPlayItem element is extracted from the downloaded file and the extracted SubPlayItem is added to a SubPlayItem recorded on the optical disc 193.

If, in step S245, it is determined that the value of the operation_type of the meta-data is not 0x03, that is, when the value of the operation_type is 0x04, in step S247, the file system merging section 203 determines whether or not the value of an is_multi_Clip_entries field in a SubPlayItem to which a SubClip_entry is added is one.

If, in step S247, it is determined that the value of the is_multi_Clip_entries is not one, that is, if the SubPlayItem to which the SubClip_entry is added refers to only one SubClip_entry, in step S248, the file system merging section 203 sets, to one, the value of the SubPlayItem to which the SubClip_entry is added in a PlayList file as an updating file.

If, in step S247, it is determined that the value of the is_multi_Clip_entries is one, or after processing in step S248 finishes, in step S249, the file system merging section 203 increases, by one, the present value of a number_of_Clip_entries field (FIG. 45) in the SubPlayItem to which the SubClip_entry is added. In other words, a set number of sub Clips that are referred to by the SubPlayItem to which the SubClip_entry is added is increased by one.

In step S250, the file system merging section 203 generates the second virtual file system, which is updated by adding a SubClip_entry of the update file to a SubPlayItem of the PlayList file of the optical disc 193. The process returns to step S223 in FIG. 69 and proceeds to step S224. In other words, if it is determined that the value of the operation_type of the meta-data of the update file is 0x04, after the values of the is_multi_Clip_entries and number_of_Clip_entries of the SubPlayItem described by using FIG. 45 are corrected, if necessary, file systems are merged and updated such that, as described by using FIGS. 51 and 52, the SubClip_entry element is extracted from the downloaded file and the extracted SubClip_entry is added to the SubClip_entry recorded on the optical disc 193.

In this process, a method determined on the basis of the operation_type of the meta-data is used to merge the data recorded on the optical disc 193 and the data recorded in the local storage 24, whereby the second virtual file system is generated so that the user views the data recorded on the optical disc 193 as if it were updated by data of the update file recorded in the local storage 24.

As described above, loading of the text subtitle data for content playback includes two types of methods, entire preloading and partial preloading. When partial preloading is executed, in order to enable random accessing of the text subtitle data, it is necessary to create an EP_map corresponding to the text subtitle data.

Figure 68:
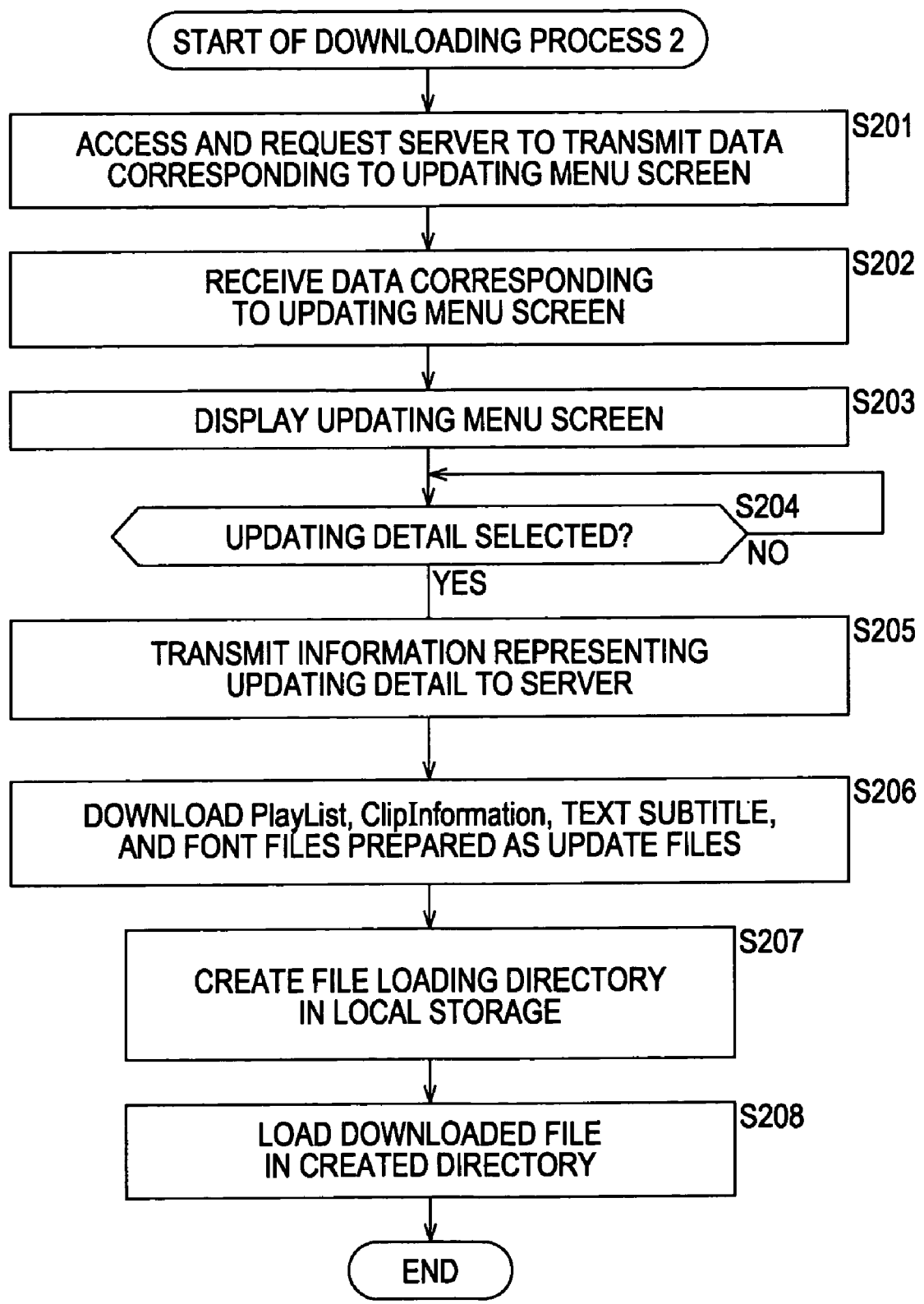
FIG. 68 is a flowchart illustrating downloading process 2.

Next, content playback process 2 that is executed in step S227 in FIG. 68 is described with reference to the flowchart in FIG. 71. In content playback process 2, entire preloading of the text subtitle data enables random accessing of the text subtitle data.

In step S261, the playback control section 204 controls the decoder 192 to play back AV stream data specified by a PlayItem of the second virtual file system generated by the process described by using FIG. 70.

In steps S262 to S264, processing that is basically similar to that in steps S62 to S64 in FIG. 37 is executed. Specifically, it is determined whether or not an operation input for commanding display of subtitle data has been received. If it is determined that operation input for commanding display of subtitle data has been received, a signal corresponding to the operation input from the user is supplied to the menu-screen-display control section 31 and a menu of displayable subtitle data list is displayed. After that, it is determined whether or not an operation input for specifying a language for subtitle data to be displayed has been received. If, in step S264, it is determined that the operation input for specifying the language for subtitle data to be displayed has not been received, the process returns to step S263 and repeatedly perform the subsequent steps.

If, in step S264, it is determined that the operation input for specifying the language for subtitle data to be displayed has been received, in step S265, the operation input acquiring section 32 supplies the playback control section 204 with a signal corresponding to the operation input from the user. The playback control section 204 controls the local storage directory managing section 201 to supply the storage data acquiring section 218 with data to be referred to by the SubPlayItem specified on the basis of the operation input from the user, that is, text subtitle data. In addition, under the control of the control section 214, the text subtitle data is entirely preloaded into the buffer 217, font data corresponding to a font specified by the user is read and supplied to the storage data acquiring section 218 in the decoder 192, if necessary.

Figure 72:
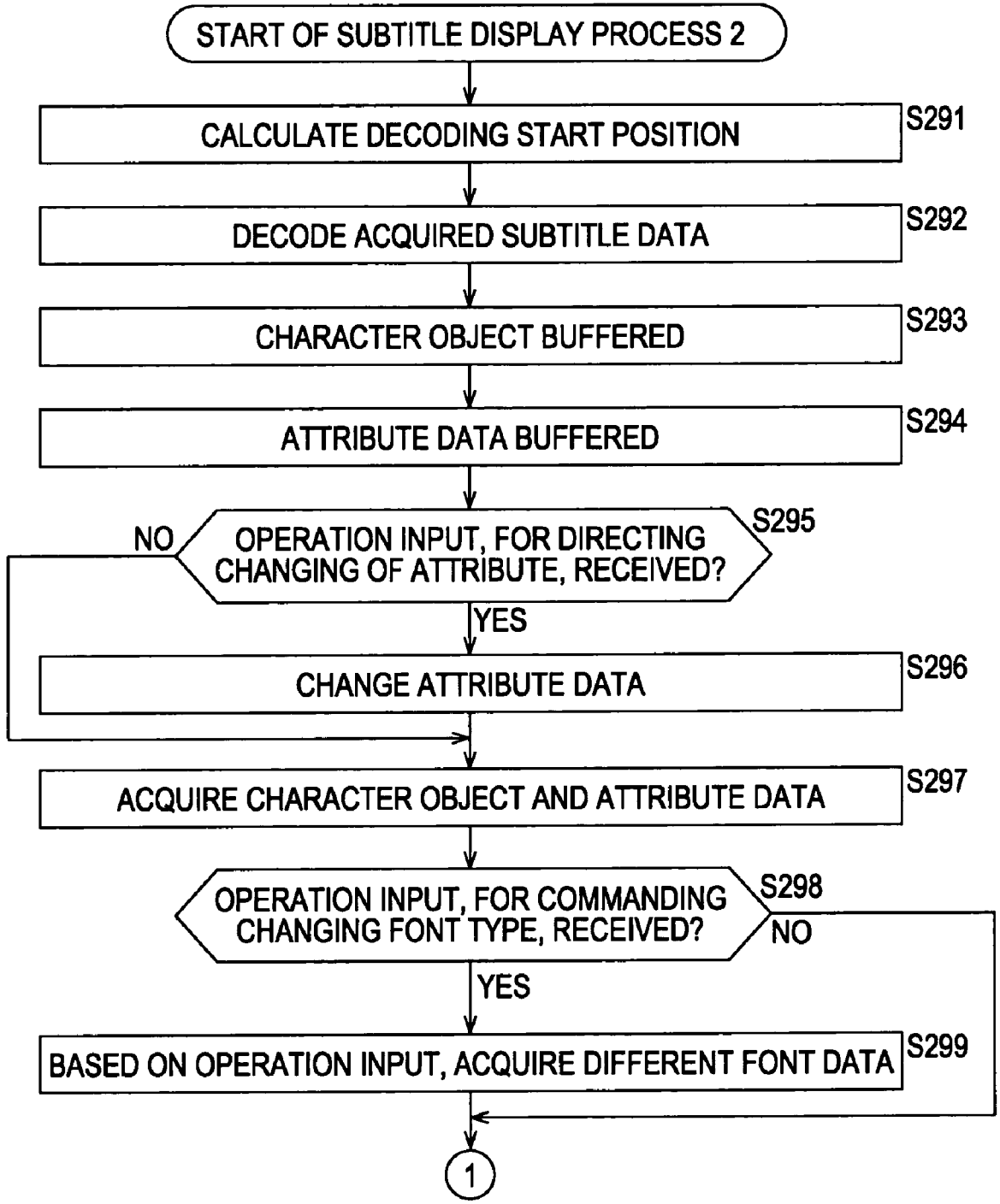
FIG. 72 is a flowchart illustrating subtitle display process 2.
Figure 73:
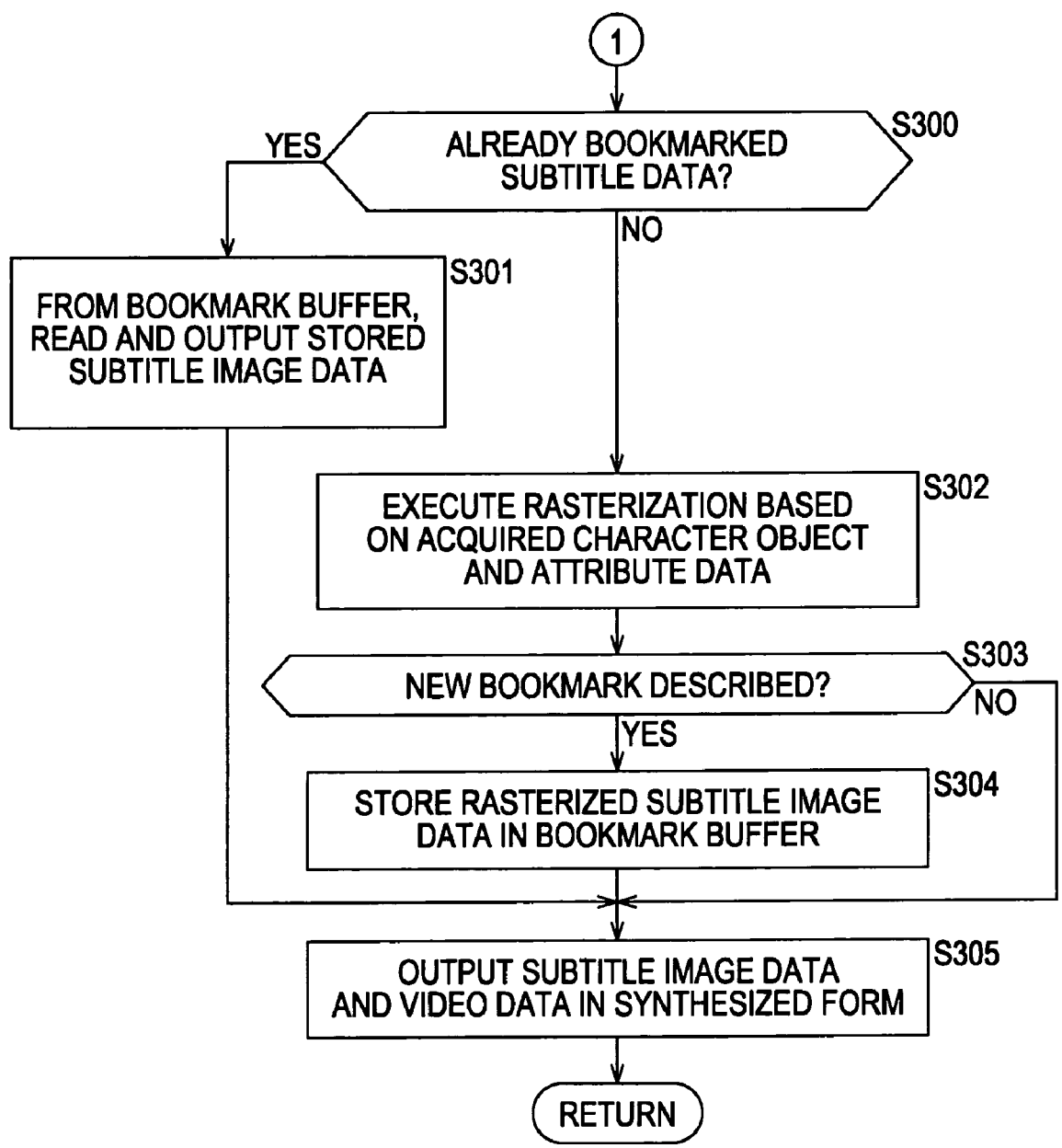
FIG. 73 is a flowchart illustrating subtitle display process 2.

In step S266, subtitle display process, which is described later by using FIGS. 72 and 73, is executed.

In steps S267 to S269, processing that is basically similar to that in steps S67 to S69 is executed. Specifically, it is determined whether or not an operation input from commanding change of the language for the subtitle data to be displayed has been received. If it is determined that the operation input for commanding change of the language for the subtitle data to be displayed has been received, the process returns to step S265 and repeatedly performs the subsequent steps. In addition, if, in step S262, it is determined that the operation input for commanding display of subtitle data has not been received, or if, in step S267, it is determined that the operation input for commanding display of subtitle data has not been received, in step S268, it is determined whether or not the operation input for commanding termination of content has been received, or whether or not AV stream data being played back has finished. If it is determined that the operation input for commanding termination of content has not been received and the AV stream data being played back has not finished, in step S269, it is determined whether or not an operation input for stopping display the subtitles has been received. If it is determined that the operation input for stopping display the subtitles has not been received, the process returns to step S266 and the subsequent steps are repeatedly performed. If it is determined that the operation input for stopping display the subtitles has been received, the process returns to step S261 and the subsequent steps are repeatedly performed.

In addition, if, in step S268, it is determined that the operation input for commanding termination of content playback has been received or that the AV stream data being played back has finished, the process returns to step S227 in FIG. 68 before finishing.

In this process, in text subtitle files stored in the local storage 24 after being downloaded from the server 3, data corresponding to a language desired by the user can be random-accessed and is displayed in synchronization with video and audio of the content recorded on the optical disc 193, and, on the basis of an operation input from the user, a text subtitle file to be read is changed in order to change the language for the displayed subtitles.

Figure 71:
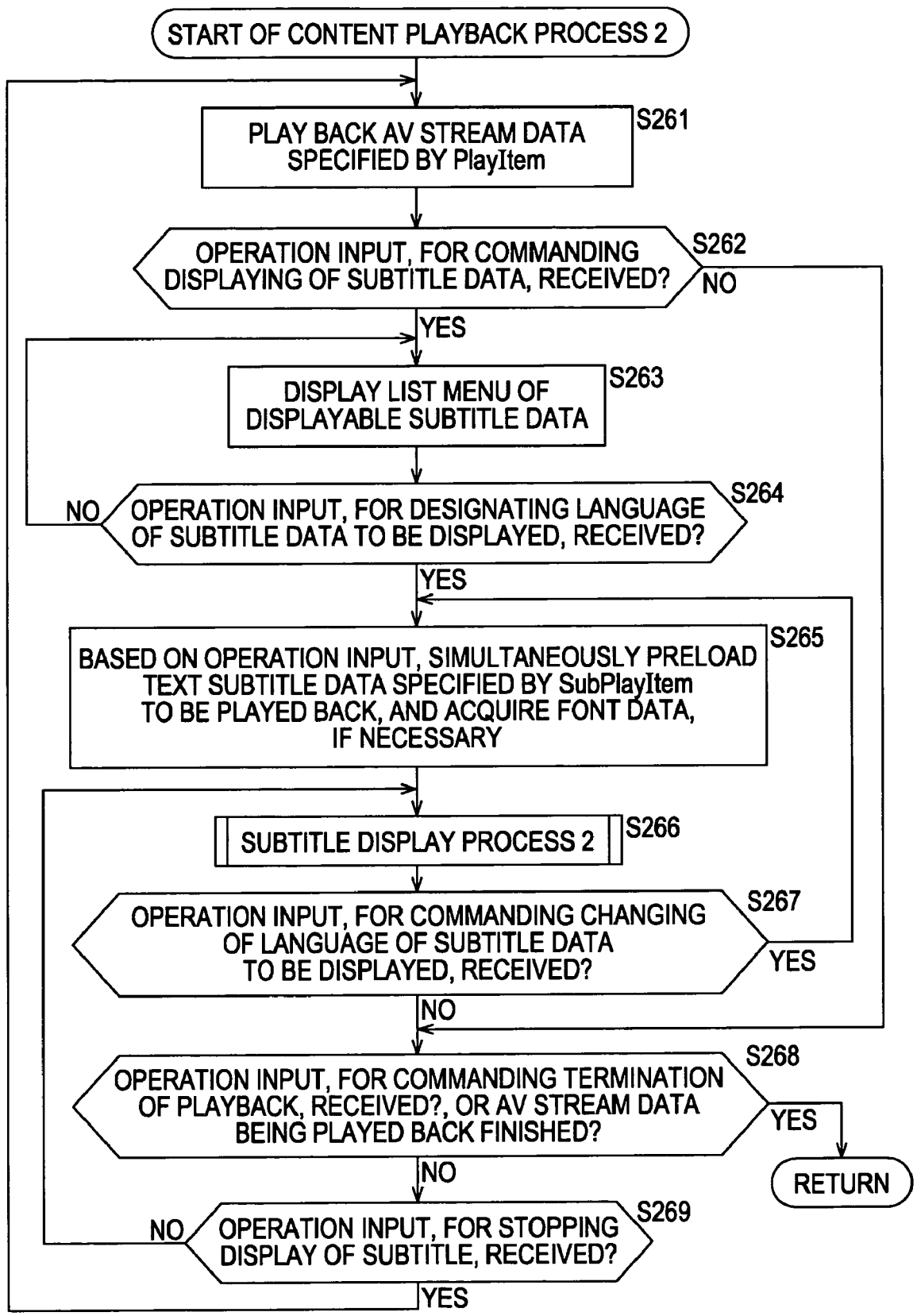
FIG. 71 is a flowchart illustrating content playback process 2.

Next, subtitle display process 2 that is executed in step S266 in FIG. 71 is described with reference to the flowcharts in FIGS. 72 and 73.

In step S291, the control section 214 in the decoder 192 calculates a decoding start position in random accessing. On the basis of the result of calculating the decoding start position, the control section 214 supplies the text subtitle processor 220 with the data buffered in the buffer 217, that is, the text subtitle data.

In step S292, the text data decoder 232 of the text subtitle processor 220 in the decoder 192 decodes the supplied text subtitle data on the basis of the PTS calculated in processing by the STC processor 231 on the basis of the information such as a count of the same STC counter as the Clip AV stream refers to and the gap in decoding of the Clip AV stream supplied from the control section 214 while considering the gap occurring due to PlayItem switching.

Figure 38:
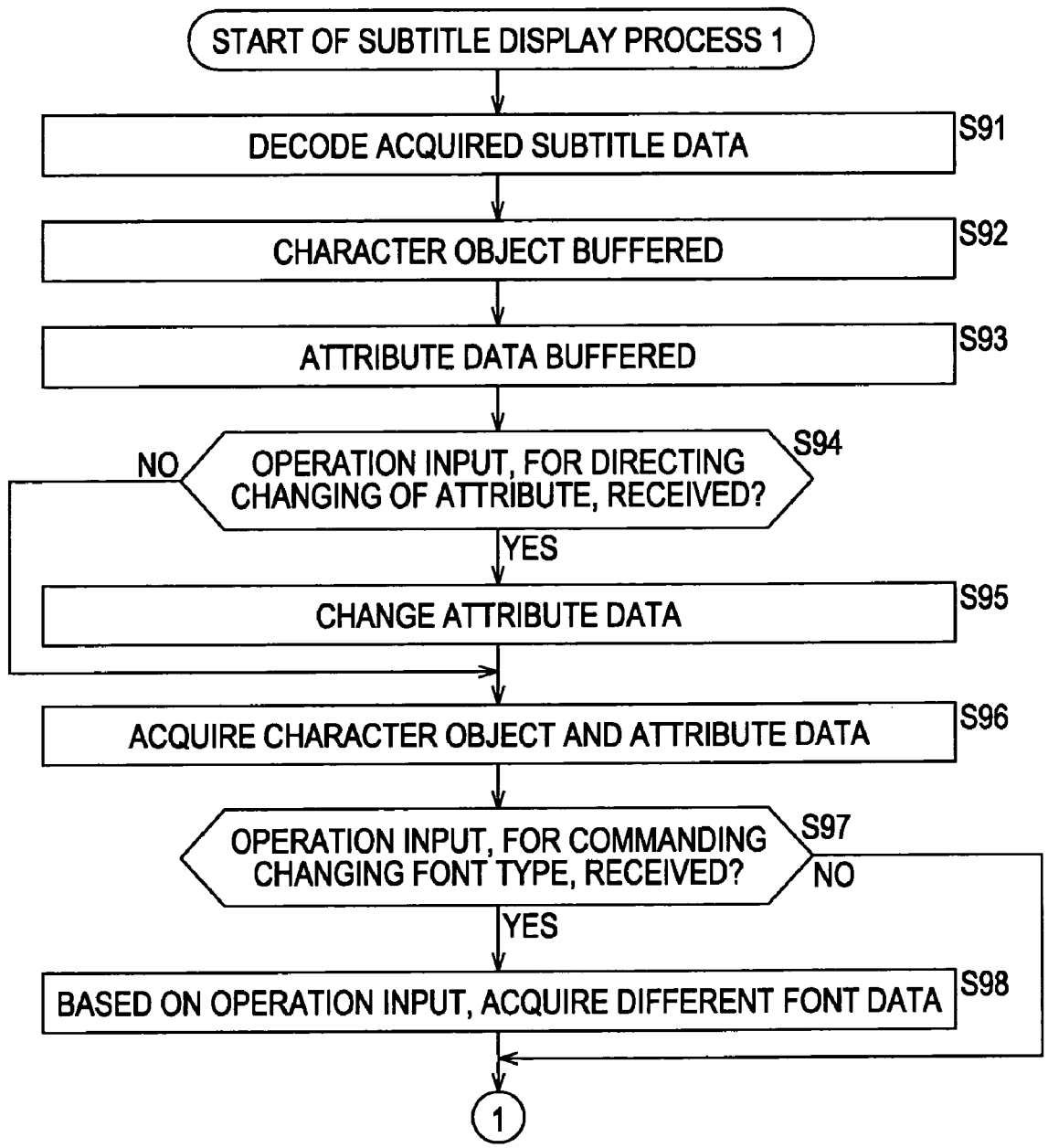
FIG. 38 is a flowchart illustrating subtitle display process 1.
Figure 39:
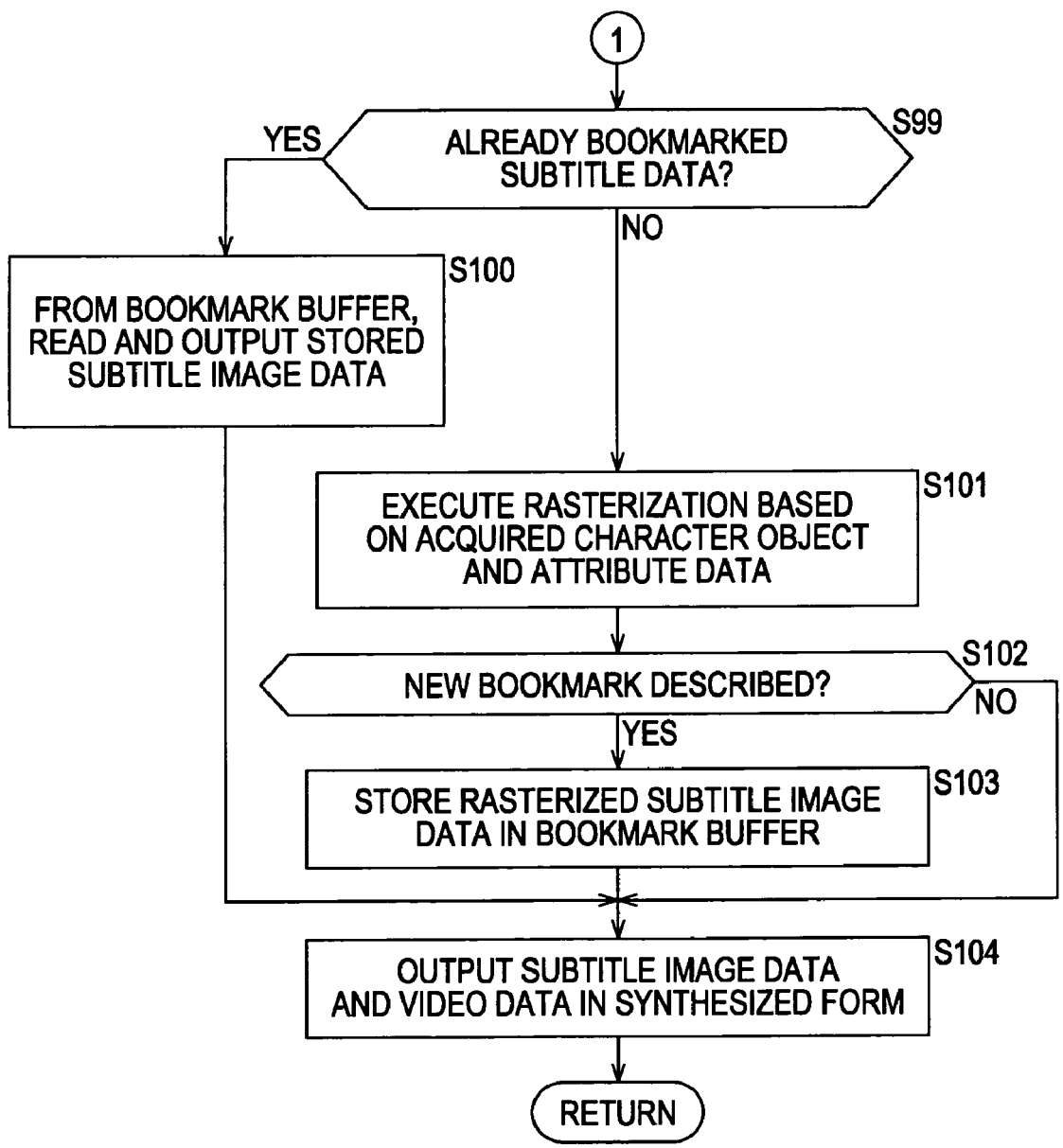
FIG. 39 is a flowchart illustrating subtitle display process 1.

In steps S293 to S305, processing that is basically similar to that executed in steps S92 to S104 in FIGS. 38 and 39 is executed. Specifically, the text data decoder 232 of the text subtitle processor 220 supplies and buffers the character object included in the decoded text subtitle data in the character object buffer 122 of the text subtitle processor 220, and the text data decoder 232 supplies and buffers the attribute data included in the decoded text subtitle data in the attribute data buffer 123.

The control section 214 determines whether or not a signal representing, for example, an operation input for commanding change of a subtitle attribute, such as a font size, has been received from the playback control section 204 (the controller 191). If it is determined that the signal representing the operation input for commanding change of the subtitle attribute has been received, the attribute data stored in the attribute data buffer 123 is changed.

If, in step S295, it is determined that the signal representing the operation input for commanding change of the subtitle attribute has not been received, or after processing in step S296 finishes, the character object and the attribute data are acquired from the character object buffer 122 and the attribute data buffer 123, and it is determined whether or not an input signal representing an operation input for commanding change of a font type has been received from the playback control section 204 (the controller 191). If it is determined that the input signal representing the operation input for commanding change of the font type has been received, in processing by the local storage directory managing section 201 (the controller 191), which is controlled by the playback control section 204, on the basis of the operation input, from the local storage 24, different font data is read and acquired.

If, in step S298, it is determined that the input signal for commanding the change of the font type has not been received, or after processing in step S299 finishes, by referring to the acquired attribute and the bookmark buffer 125, it is determined whether or not subtitle data to be rasterized has been bookmarked and is already buffered in the bookmark buffer 125. If it is determined that the subtitle data to be rasterized has been bookmarked and is buffered, the font rasterizer 124 reads stored subtitle image data (rasterization data) to be bookmarked from the bookmark buffer 125 and outputs the read data.

If it is determined that the subtitle data has not been bookmarked, the subtitle data is rasterized on the basis of the acquired character object and attribute data and is output to the subtitle graphics plane processor 93, and a subtitle graphics plane is generated and supplied to the synthesizer 94. It is determined whether or not the attribute data bears a new bookmark. If it is determined that the attribute data bears the bookmark, the rasterized subtitle image data is stored in the bookmark buffer 125.

The synthesizer 94 combines the supplied subtitle image data with the video data and outputs the combined data. The process returns to step S266 in FIG. 71 and proceeds to step S267.

This process controls reading of the data of the entirely preloaded text subtitle file and font file so that subtitle data in the language desired by the user can be displayed in a font desired by the user, whereby the buffered attribute data is changed and rasterized, if necessary.

Next, content playback process 3 that is executed in step S227 in FIG. 68 is described with reference to the flowchart in FIG. 74. In content playback process 3, by performing partial preloading of the text subtitle data and generating an EP_map corresponding to the text subtitle stream, the text subtitle data can be random-accessed.

In step S361, the playback control section 204 controls the decoder 192 to play back the AV stream data specified by a present invention in the second virtual file system generated in the process described by using FIG. 70.

In steps S362 to S364, processing that is basically similar to that in steps S62 to S64 in FIG. 37 is executed. Specifically, it is determined whether or not an operation input for commanding display of subtitle data has been received. If it is determined that the operation input for commanding display of subtitle data has been received, a signal corresponding to the operation input from the user is supplied to the menu-screen-display control section 31, and a menu of displayable subtitle data list is displayed. It is determined whether or not an operation input for specifying a language for subtitle data to be displayed has been received. If, in step S364, it is determined that the operation input for specifying the language for the subtitle data to be displayed has not been received, the process returns to step S363 and the subsequent steps are repeatedly performed.

Figure 64:
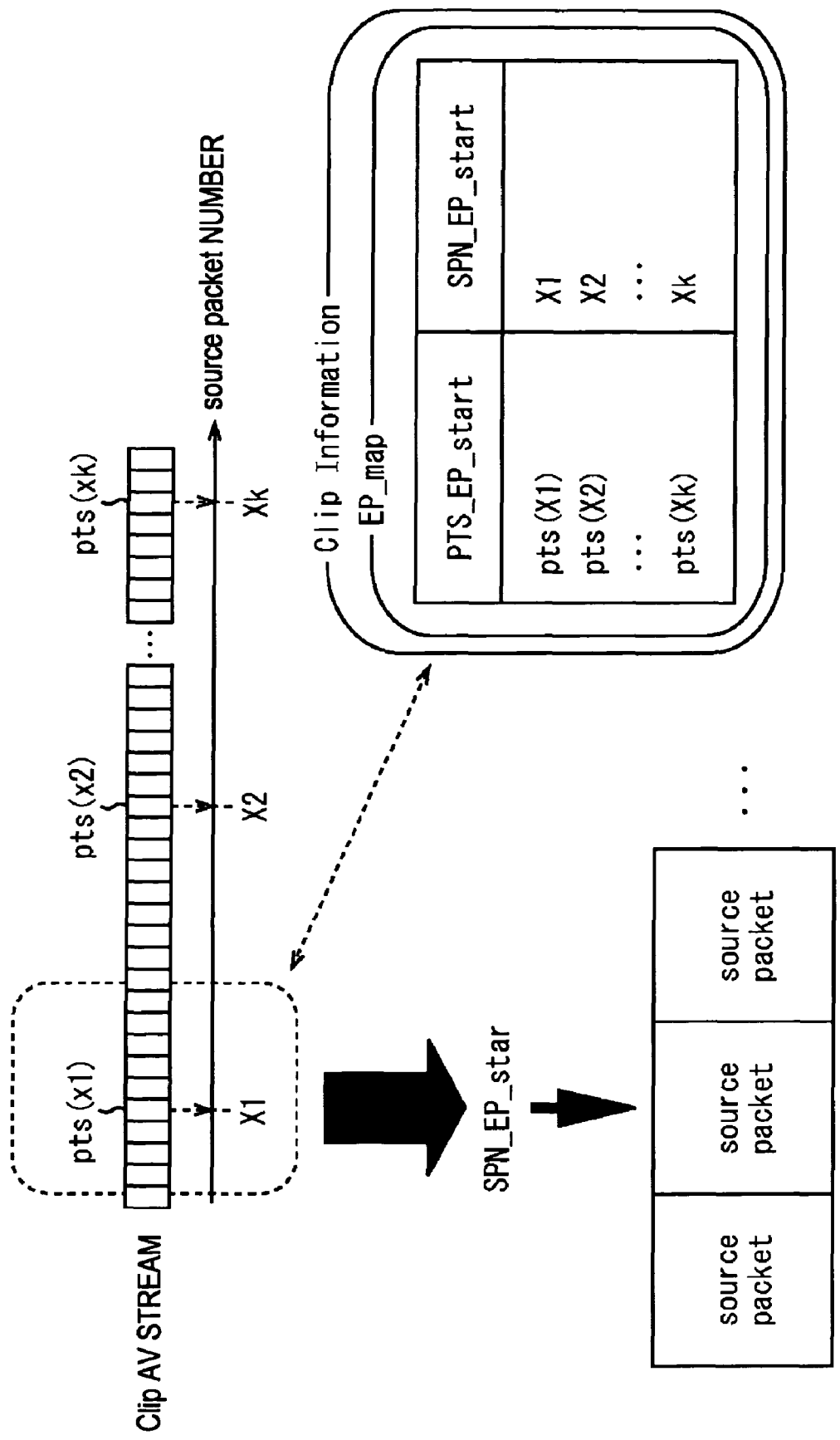
FIG. 64 is an illustration of EP_map.

If, in step S364, it is determined that the operation input for specifying the language for the subtitle data to be displayed has been received, in step S365, by receiving, from the disc data acquiring section 215, information such as a SubPlayItem_IN_time and SubPlayItem_OUT_time corresponding to a text subtitle stream recorded on the optical disc 193, or receiving, from the storage data acquiring section 218, information such as a SubPlayItem_IN_time and SubPlayItem_OUT_time corresponding to a text subtitle stream recorded in the local storage 24, the control section 214 of the decoder 192 generates and stores, in the memory 216, an EP_map of the text subtitle stream which is similar to the EP_map described by using FIG. 64.

In step S366, the operation input acquiring section 32 supplies the playback control section 204 with a signal corresponding to the operation input from the user. The playback control section 204 controls the local storage directory managing section 201 to supply the storage data acquiring section 218 of the decoder 192 with data that is referred to by a SubPlayItem specified on the basis of the operation input from the user, that is, text subtitle data. Under the control of the control section 214, the text subtitle data is buffered in the buffer 84, or is buffered in an internal buffer of the storage data acquiring section 218. In addition, fond data corresponding to the font specified by the user is read and supplied to the storage data acquiring section 218 of the decoder 192, if necessary.

Figure 75:
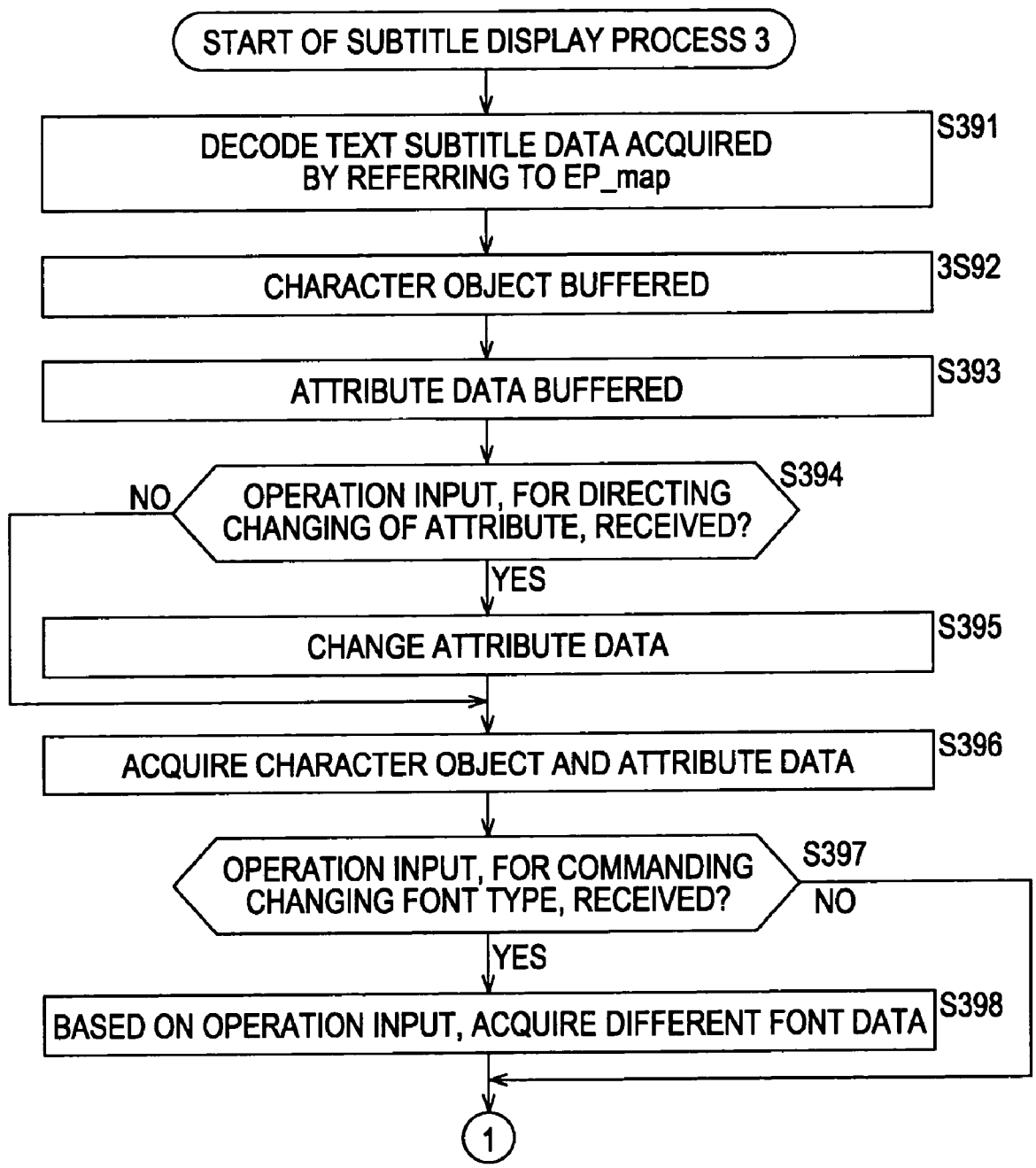
FIG. 75 is a flowchart illustrating subtitle display process 3.
Figure 76:
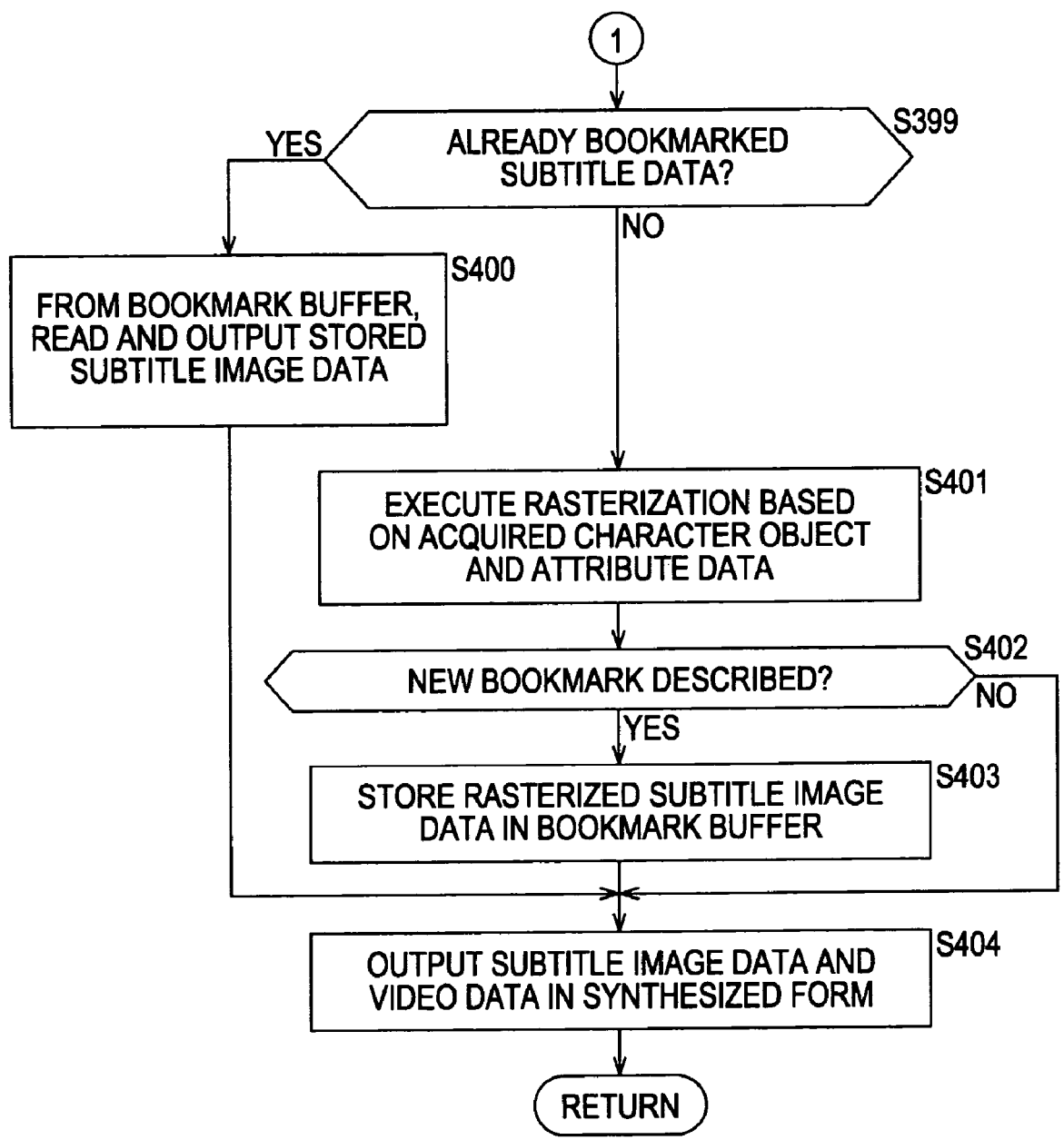
FIG. 76 is a flowchart illustrating subtitle display process 3.

In step S376, the decoder 192 executes content playback process 3, which is described later by using FIGS. 75 and 76.

In steps S368 to S370, processing that is basically similar to that in steps S67 to S69 in FIG. 37 is executed. Specifically, it is determined whether or not an operation input from commanding change of the language for the subtitle data to be displayed has been received. If it is determined that the operation input for commanding change of the language for the subtitle data to be displayed has been received, the process returns to step S365 and the subsequent steps are repeatedly performed. If, in step S362, it is determined that the operation input for commanding change of the language for the subtitle data has not been received, or if, in step S368, it is determined that the operation input for commanding display of subtitle data has not been received, in step S369, it is determined whether an operation input for commanding termination of content playback has been received, or whether or not AV stream data being played back has finished. If it is determined that operation input for commanding termination of content playback has not been received and the AV stream data being played back has not finished, in step S370, it is determined whether or not an operation input for stopping display the subtitles has been received. If it is determined that the operation input for stopping display the subtitles has not been received, the process returns to step S367 and the subsequent steps are repeatedly performed. If it is determined that the operation input for stopping display the subtitles has been received, the process returns to step S361 and the subsequent steps are repeatedly performed.

In addition, if, in step S369, it is determined that the operation input for commanding termination of content playback has been received or that the AV stream data being played back has finished, the process returns to step S227 in FIG. 68 before finishing.

In this process, an EP_map corresponding to the text subtitle stream stored in the local storage 24 after being downloaded from the server 3, and data corresponding to the subtitles in the language desired by the user can be random-accessed is displayed in synchronization with video and audio of the content recorded on the optical disc 193. In addition, on the basis of the operation input from the user, the text subtitle file to be read is changed in order to change the language for the displayed subtitles.

Next, subtitle display process 3 that is executed in step S376 in FIG. 74 is described with reference to the flowcharts in FIGS. 75 and 76.

In step S391, by referring to the EP_map stored in the memory 216 after being generated in step S365 in FIG. 74, the control section 214 of the decoder 192 supplies, to the text subtitle processor 220, the data, buffered in the internal buffer of the storage data acquiring section 218, that is, the text subtitle data, through the buffer 219, and controls the text subtitle processor 220 to decode the text subtitle data. The text data decoder 232 of the text subtitle processor 220 in the decoder 192 decodes the supplied text subtitle data on the basis of the PTS calculated in processing by the STC processor 231 on the basis of the information such as a count of the same STC counter as the Clip AV stream refers to and the gap in decoding of the Clip AV stream supplied from the control section 214 while considering the gap occurring due to PlayItem switching.

In steps S392 to S404, processing that is basically similar to that executed in steps S92 to S104 in FIGS. 38 and 39 is executed. Specifically, the text data decoder 232 of the text subtitle processor 220 supplies and buffers the character object included in the decoded text subtitle data in the character object buffer 122 of the text subtitle processor 220, and the text data decoder 232 supplies and buffers the attribute data included in the decoded text subtitle data in the attribute data buffer 123.

The control section 214 determines whether or not a signal representing, for example, an operation input for commanding change of a subtitle attribute, such as a font size, has been received from the playback control section 204 (the controller 191). If it is determined that the signal representing the operation input for commanding change of the subtitle attribute has been received, the attribute data stored in the attribute data buffer 123 is changed.

If, in step S394, it is determined that the signal representing the operation input for commanding change of the subtitle attribute has not been received, or after processing in step S395 finishes, the character object and the attribute data are acquired from the character object buffer 122 and the attribute data buffer 123, and it is determined whether or not an input signal representing an operation input for commanding change of a font type has been received from the playback control section 204 (the controller 191). If it is determined that the input signal representing the operation input for commanding change of the font type has been received, in processing by the local storage directory managing section 201 (the controller 191), which is controlled by the playback control section 204, on the basis of the operation input, from the local storage 24, different font data is read and acquired.

If, in step S397, it is determined that the input signal for commanding the change of the font type has not been received, or after processing in step S398 finishes, by referring to the acquired attribute and the bookmark buffer 125, it is determined whether or not subtitle data to be rasterized has been bookmarked and is already buffered in the bookmark buffer 125. If it is determined that the subtitle data to be rasterized has been bookmarked and is buffered, the font rasterizer 124 reads stored subtitle image data (rasterization data) to be bookmarked from the bookmark buffer 125 and outputs the read data.

If it is determined that the subtitle data has not been bookmarked, the subtitle data is rasterized on the basis of the acquired character object and attribute data and is output to the subtitle graphics plane processor 93, and a subtitle graphics plane is generated and supplied to the synthesizer 94. It is determined whether or not the attribute data bears a new bookmark. If it is determined that the attribute data bears the bookmark, the rasterized subtitle image data is stored in the bookmark buffer 125.

The synthesizer 94 combines the supplied subtitle image data with the video data and outputs the combined data. The process returns to step S367 in FIG. 74 and proceeds to step S368.

This process controls reading of the data of the entirely preloaded text subtitle file and font file so that subtitle data in the language desired by the user can be displayed in a font desired by the user, whereby the buffered attribute data is changed and rasterized, if necessary.

As described above, also in the second embodiment of the present invention, content recorded on an optical disc and content recorded in a local storage after being downloaded can be played back in a form in which both are associated with each other. In addition, a second virtual file system for playing back the content recorded on an optical disc and the content recorded in the local storage in the form in which both are associated with each other is generated on the basis of a value, sped in an operation_type included in meta-data in archive data recorded in the local storage after being downloaded.

In addition, in the second embodiment of the present invention, content recorded in the local storage after being downloaded may be either entirely preload or partially preloaded. By applying the present invention, the content recorded on the optical disc and the content recorded in the local storage can be played back in synchronization, with an STC used as a reference.

The above-described consecutive processes may be executed by software. The software is installed from a program storage medium to a computer in which a program of the software is built into dedicated hardware or to, for example, a multipurpose personal computer or the like that can execute various types of functions by installing various types of programs.

As shown in FIG. 1 or FIG. 40, this program storage medium is formed not only by the removable medium 28, such as a magnetic disk (including a flexible disk), an optical disc (including a CD-ROM (Compact Disk-Read Only Memory or a DVD (Digital Versatile Disk), a magneto-optical disc (including an MD (Mini-Disk)™), or a semiconductor memory which is distributed separately from a computer in order to provide a program to a user and which has a program recorded thereon, but also by the memory 23, such as a ROM or RAM having a program recorded therein and being provided to a user in a state with it built into an apparatus beforehand, and the local storage 24 such as a hard disk.

In addition, in this specification, steps constituting a program recorded in a program storage medium obviously include processing steps that are executed in a time-series manner in order give, and, in addition, processing steps that are executed in parallel or separately even if the processing steps are not always executed in a time-series manner.

In this specification, the system represents the entirety of a set of a plurality of apparatuses.

The invention claimed is:

1. A playback apparatus for playing back an AV stream recorded on a removable recording medium and generating subtitle data for displaying subtitles corresponding to the AV stream, the playback apparatus comprising:
reading control means for controlling reading of first information including a character object and attribute data for displaying the subtitles from the recording medium or a storage unit within the playback apparatus;
first decoding means for decoding the AV stream whose reading is controlled by the reading control means;
second decoding means for decoding the first information whose reading is controlled by the reading control means;
counting means for obtaining a count value serving as a reference for processing timing for decoding of the AV stream by the first decoding means;
calculation means for calculating a reference for processing timing for decoding of the first information by the second decoding means on the basis of the count value obtained by the counting means;
character object storing means for storing the character object included in the first information decoded by the second decoding means;
attribute data storing means for storing the attribute data included in the first information decoded by the second decoding means; and
conversion means for acquiring font data and converting the character object stored in the character object storing means into the subtitle data by using the attribute data stored in the attribute data storing means and the font data.

2. The playback apparatus according to claim 1, further comprising operation input acquiring means for acquiring a user's operation input,
wherein, on the basis of the user's operation input acquired by the operation input acquiring means, the reading control means controls the reading of the first information stored in the recording medium or the storage unit within the playback apparatus.

3. The playback apparatus according to claim 1, further comprising:
operation input acquiring means for acquiring a user's operation input; and
attribute-data-change control means for controlling change of the attribute data stored in the attribute data storing means on the basis of the user's operation input acquired by the operation input acquiring means,
wherein the conversion means converts the character object into the subtitle data on the basis of the attribute data whose change is controlled by the attribute-data-change control means.

4. The playback apparatus according to claim 1, further comprising operation input acquiring means for acquiring a user's operation input,
wherein the conversion means changes the acquired font data on the basis of the user's operation input acquired by the operation input acquiring means.

5. The playback apparatus according to claim 1, further comprising operation input acquiring means for acquiring a user's operation input,
wherein the reading control means performs:
further controlling reading of second information which is stored in the storage unit and which is information for controlling the reading of the AV stream and the first information, and the AV stream recorded in the recording medium;
controlling reading of the second information on the basis of the user's operation input acquired by the operation input acquiring means; and
controlling reading of the AV stream and the first information on the basis of the read second information.

6. The playback apparatus according to claim 1, further comprising output means for combining the subtitle data generated by conversion by the conversion means and video data included in the AV stream decoded by the first decoding means, and outputting the combined data.

7. The playback apparatus according to claim 1, further comprising communication means for exchanging information with a predetermined information processing apparatus via a network,
wherein the first information, which is received by the communication means, is stored in the storage unit within the playback apparatus.

8. The playback apparatus according to claim 7, further comprising virtual-file-system generating means which, on the basis of a file system of a first group of data stored in the recording medium and a file system of a second group of data stored in the storage unit within the playback apparatus, generates a virtual file system including at least part of each of the first group of data and the second group of data.

9. The playback apparatus according to claim 8, wherein:
the first information stored in the storage unit within the playback apparatus includes second information concerning the generation of the virtual file system;
the reading control means further controls reading of the second information stored in the storage unit within the playback apparatus; and
the virtual-file-system generating means generates the virtual file system on the basis of the second information whose reading is controlled by the reading control means.

10. The playback apparatus according to claim 1, further comprising storage means for storing the first information whose reading is controlled by the reading control means,
wherein the storage means stores the first information, in which reading of the entirety of the first information is collectively controlled by the reading control means.

11. The playback apparatus according to claim 1, further comprising table information generating means for generating table information representing relationships between information of decoding start points of the first information whose reading is controlled by the reading control means and time stamps at the decoding start points,
wherein the reading control means controls the reading of the first information by referring to the table information generated by the table information generating means.

12. A playback method for a playback apparatus for playing back an AV stream recorded in a removable recording medium and generating subtitle data for displaying subtitles corresponding to the AV stream, the playback method including:
controlling reading of first information including a character object and attribute data for displaying the subtitles from the recording medium or a storage unit within the playback apparatus;
decoding the AV stream whose reading is controlled by the controlling;
decoding the first information whose reading is controlled by the controlling;
obtaining a count value serving as a reference for processing timing for decoding the AV stream;
calculating a reference for processing timing for decoding the first information on the basis of the obtained count value;
storing the character object included in the decoded first information;
storing the attribute data included in the decoded first information; and
acquiring font data and using the stored attribute data and the stored font data to convert the stored character object into the subtitle data.

13. A program storage medium storing a computer-readable program for allowing a computer to execute a process for playing back an AV stream recorded in a removable recording medium and generating subtitle data for displaying subtitles corresponding to the AV stream, the computer-readable program including:
controlling reading of first information including a character object and attribute data for displaying the subtitles from the recording medium or a storage unit within the playback apparatus;
decoding the AV stream whose reading is controlled by the controlling;
decoding the first information whose reading is controlled by the controlling;
obtaining a count value serving as a reference for processing timing for decoding the AV stream;
calculating a reference for processing timing for decoding the first information on the basis of the obtained count value;
storing the character object included in the decoded first information;
storing the attribute data included in the decoded first information; and
acquiring font data and using the stored attribute data and the stored font data to convert the stored character object into the subtitle data.

* * * * *